(12) United States Patent
Nishi et al.

(10) Patent No.: US 7,750,897 B2
(45) Date of Patent: Jul. 6, 2010

(54) VIDEO PROCESSING APPARATUS, VIDEO PROCESSING METHOD, AND COMPUTER PROGRAM

(75) Inventors: Toru Nishi, Tokyo (JP); Kazuhiko Ueda, Kanagawa (JP); Mitsuyasu Asano, Tokyo (JP); Kazuki Yokoyama, Kanagawa (JP); Tetsuji Inada, Tokyo (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 10/884,063

(22) Filed: Jul. 1, 2004

(65) Prior Publication Data

US 2005/0030302 A1 Feb. 10, 2005

(30) Foreign Application Priority Data

Jul. 4, 2003 (JP) ............................. 2003-270965
Apr. 28, 2004 (JP) ............................. 2004-133189

(51) Int. Cl.
*G06F 3/038* (2006.01)
(52) U.S. Cl. ...................... 345/204; 345/690; 345/214
(58) Field of Classification Search .................. 345/60, 345/63, 204–205, 690–691, 694, 55–56, 345/87, 90, 214
See application file for complete search history.

(56) References Cited

U.S. PATENT DOCUMENTS

| | | | | |
|---|---|---|---|---|
| 5,387,947 A | * | 2/1995 | Shin ........................... | 348/699 |
| 5,404,178 A | * | 4/1995 | Kondo et al. ................. | 348/618 |
| 5,907,316 A | * | 5/1999 | Mikoshiba et al. .......... | 345/596 |
| 6,310,588 B1 | * | 10/2001 | Kawahara et al. ............. | 345/63 |
| 6,344,839 B1 | * | 2/2002 | Denda et al. ................... | 345/60 |
| 6,414,657 B1 | * | 7/2002 | Kasahara et al. .............. | 345/63 |
| 6,442,203 B1 | * | 8/2002 | Demos .................. | 375/240.16 |
| 6,822,625 B2 | * | 11/2004 | Tomizawa et al. ............. | 345/20 |
| 6,989,845 B1 | * | 1/2006 | Okamoto et al. ............ | 345/691 |
| 7,319,496 B2 | * | 1/2008 | Uchida et al. ............... | 348/625 |
| 2003/0006949 A1 | * | 1/2003 | Sekiya et al. .................. | 345/87 |
| 2005/0190164 A1 | * | 9/2005 | Velthoven et al. ........... | 345/204 |
| 2005/0232356 A1 | * | 10/2005 | Gomi et al. ............. | 375/240.16 |
| 2006/0291741 A1 | * | 12/2006 | Gomi et al. ................. | 382/266 |

FOREIGN PATENT DOCUMENTS

JP 2001-083926 3/2001

OTHER PUBLICATIONS

European Search Report mailed Dec. 1, 2008 in European Patent Application No. 04253988.

* cited by examiner

*Primary Examiner*—Alexander Eisen
*Assistant Examiner*—Jason M Mandeville
(74) *Attorney, Agent, or Firm*—Finnegan, Henderson, Farabow, Garrett & Dunner, L.L.P.

(57) ABSTRACT

A holding type display such as a liquid-crystal display for controlling motion blur is disclosed. A step edge detector detects an edge portion of a moving step edge in video data in an input frame or an input field. A corrector corrects a pixel value of a pixel at the edge portion of the step edge detected by the step edge detector, based on a spatial amount of motion of the corresponding pixel supplied by a motion detector.

19 Claims, 28 Drawing Sheets

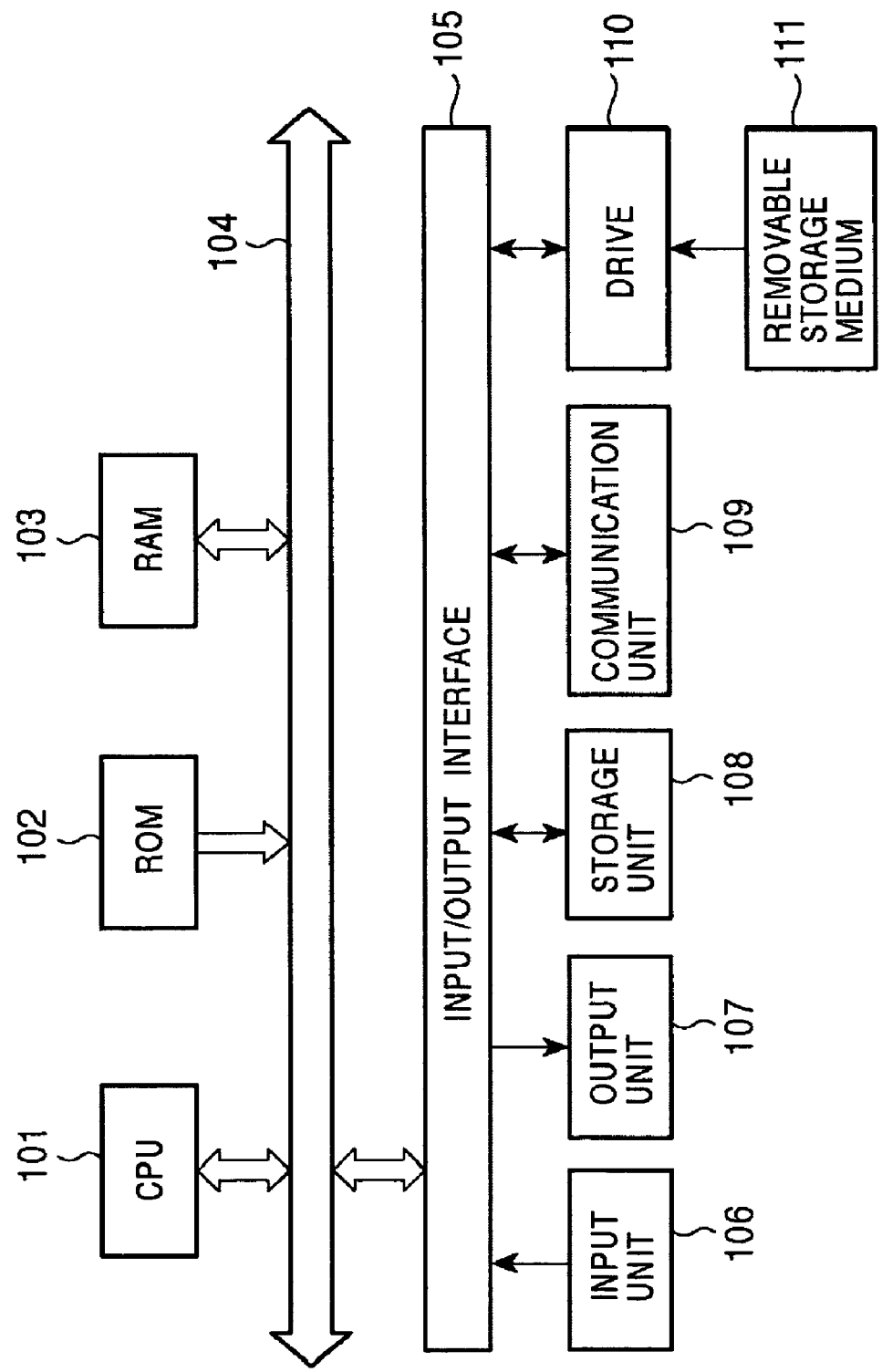

VIDEO PROCESSING APPARATUS, VIDEO PROCESSING METHOD, AND COMPUTER PROGRAM

BACKGROUND OF THE INVENTION

1. Field of the Invention

The present invention relates to a video processing apparatus, a video processing method, and a computer program and, in particular, to a video processing apparatus, a video processing method, and a computer program for controlling motion blur of a moving picture in a holding type display device such as a liquid-crystal display device.

2. Description of the Related Art

Cathode-ray tubes (CRTs) are in widespread use as a display for displaying a moving picture. Liquid-crystal displays working in a display method different from the CRT are also widely used (see Japanese Patent Application No. 2001-118396, for example).

When a predetermined one of a plurality of frames or fields forming a moving picture is addressed on a CRT, a built-in electron gun successively scans each of horizontal lines (scanning lines) forming the screen of the CRT. The addressed frame or field is thus displayed on the screen of the CRT.

Each of a plurality of pixels forming the addressed frame or field is displayed in an impulsive manner along time axis. In other words, a pixel is displayed at the corresponding location thereof only at the moment the electron gun scans and hits. Display devices adopting the same display method as the CRT are generally referred to as an impulsive type display.

In contrast, liquid-crystal displays hold the display of all liquid crystals forming the entire screen from when a predetermined one of a plurality of frames or fields forming a moving picture is addressed until when the displaying of a next frame or field is addressed. The addressed frame or field is thus displayed on the screen.

It is assumed that one pixel corresponds to a respective liquid crystal. A frame or a field is addressed, and the pixel value of each pixel forming the addressed frame or the addressed field is addressed in the liquid-crystal display device. The liquid-crystal display device applies a voltage, at a level corresponding to the addressed pixel value, to a respective liquid crystal (corresponding to the respective pixel), each pixel forming the screen of the liquid-crystal display device. In response, each liquid crystal emits light at intensity responsive to the level of the applied voltage. Each liquid crystal is continuously supplied with the voltage of the same level and emits light at the same level at least until a next frame or a next field is addressed for displaying. In other words, a pixel having an addressed pixel value is continuously displayed in a respective liquid crystal.

When the pixel value of a predetermined pixel needs to be updated with the next frame or the next field addressed for displaying, the liquid crystal corresponding to the pixel is supplied with the voltage at the level responsive to the updated pixel value (in other words, the applied voltage changes in level). The output level (light intensity) of the corresponding liquid crystal also changes.

The liquid-crystal display device, adopting the display method different from the impulsive type display device such as the CRT, has advantages such as small mounting space requirement, low power consumption, and display relatively free from distortion.

However, the liquid-crystal display device has a drawback that the occurrence of motion blur is more frequent than in the impulsive type display device when a moving picture is displayed.

It has been considered that the generation of motion blur in the liquid-crystal display device is caused by a slow response of the liquid crystal. Image blurring has been considered to take place in the liquid-crystal display device, because it takes time for each liquid crystal to reach an addressed target level (namely, to a level corresponding to the addressed pixel value if one liquid crystal corresponds to a respective pixel).

To overcome this drawback, namely, to control the generation of motion blur, Japanese Patent Application No. 2001-118396 discloses the following technique. In accordance with the disclosed technique, a voltage at a level higher than the level responsive to a target level (namely, to a level corresponding to the addressed pixel value if one liquid crystal corresponds to a respective pixel) is applied. This technique is referred to as an overdrive method, hereinafter. The overdrive method sets, as a target level, a level higher than a normal level, in other words, corrects a target level.

FIG. 1 illustrates the principle of the overdrive method and more specifically, illustrates waveforms in time response of the output level of the liquid crystal with the overdrive method used and unused (normal operation).

As shown, the horizontal axis is time axis, and the vertical axis is an output level of the liquid crystal (intensity of light). A curve 1 represents the waveform of the time response of the output level of the liquid crystal with the overdrive method unused (the normal operation mode). A curve 2 represents the waveform of the time response of the output level of the liquid crystal with the overdrive method used. Here, T represents display time of one frame or one field, namely, time from when one frame or one field is addressed for displaying to when a next frame or a next field is addressed for displaying. Hereinafter, time T is referred to as frame time T or field time T. In the liquid-crystal display device, the frame time T or the field time T is typically 16.6 ms.

As shown in FIG. 1, an output level of a liquid pixel of interest (hereinafter referred to as a target pixel) from among pixels forming the screen of the liquid-crystal display device is a level Yb immediately prior to time zero. When a given frame or field is addressed at time zero, it is assumed that the addressed level of the target liquid crystal (a target level) is a level Ye.

In the ordinary liquid-crystal display device with the overdrive method used, the target liquid crystal is supplied with the voltage at the level corresponding to the target level Ye at time zero. If the target liquid crystal is an ideal one (with response speed at infinity), the output level thereof immediately changes to the target level Ye from the level Yb at the moment the voltage at the level corresponding to the target level Ye is applied. In practice, however, the output level of the target liquid crystal gradually changes from the level Yb to the target level Ye as represented by the curve 1. The response waveform (the waveform of the curve 1) of the output level of the target liquid crystal becomes a delayed waveform.

More specifically, the output level of the target liquid crystal reaches a level Yt1 lower than the target level Ye even at time t1 which is the frame time or the field time T later than time zero (even when the next frame or the next field is addressed for displaying).

It is now assumed that the target level of the target liquid crystal is still the level Ye when the next frame or the next field is addressed at time t1.

In the curve 1 of FIG. 1, the output level of the target liquid crystal gradually rises toward the target level Ye from the level Yt1. Even at time t2 that is the frame time T or the field time T later than time t1 (namely, even when another next frame or another next field is addressed), the output level of the target liquid crystal reaches only a level Yt2 lower than the target level Ye.

In the overdrive method, the target liquid crystal is supplied with a voltage at a level higher than the target level Ye (a level corresponding to a level Ylck as shown in FIG. 1) during a period of time from when one frame or one field is addressed (at time zero in FIG. 1) to when a next frame or a next field is addressed (at time t1 in FIG. 1) so that the output level reaches the target level Ye.

As represented by the curve 2, the output level of the target liquid crystal reaches the target level Ye at time t1 that is the one frame time T or the one field time T later than time zero.

In other words, the target level is modified from the level Ye to the level Ylck higher than the level Ye at time zero in the overdrive method of FIG. 1. The target liquid crystal is supplied with a voltage at the modified target level Ylck. As a result, the output level of the target liquid crystal reaches the unmodified target level Ye (namely, the actually desired level Ye) at time t1 that is one frame time T or one field time T later than application of the voltage.

When the next frame or the next field is addressed at time t1, the target level of the target pixel remains the level Ye in that addressing. Since the output level of the target liquid crystal already reaches the level Ye at time, t1, the target level remains unmodified at the level Ye, and the voltage at the level corresponding to the level Ye is continuously supplied to the target liquid crystal. In this way, the output level of the target liquid crystal is maintained at the target level Ye from time t1 to time t2.

FIG. 2 illustrates a visual change in the output level of the liquid crystal (light intensity) corresponding to the curves of FIG. 1 with the overdrive method in operation and not in operation.

As shown in FIG. 2, the left-hand vertical axis is time axis corresponding to the time axis of FIG. 1. The change in the output level of the liquid crystal with time (the change in the curve 1 of FIG. 1) is shown on the right of the time axis with the overdrive method not in operation. The change in the output level of the liquid crystal with time (the change in the curve 2) is shown on the right hand side FIG. 2 with the overdrive method in operation. As shown in FIG. 2, the output level of the liquid crystal is shown in density of gray tone. The densest gray tone represents the level Yb in FIG. 1, and the lightest gray tone represents the level Ye in FIG. 1.

Even with the overdrive method in operation, the generation of motion blur is not controlled. Currently, no effective method for controlling the motion blur is available in the liquid-crystal display device. The liquid-crystal display device is not free from the above drawback.

The motion blur has been discussed in connection with the liquid-crystal display device. However, this drawback affects not only the liquid-crystal display device, but also any type of display device that includes a plurality of display elements, each of which takes a predetermined time to-reach an output target level from the addressing of the target level, and is associated with at least a portion of a predetermined one of pixels forming a frame or a field.

Many of such display devices adopt a display method in which at least part of display elements forming the screen holds display for a predetermined period of time from the addressing of a predetermined frame or field to the addressing of a next frame or field. Hereinafter, the liquid-crystal display device and the display device adopting such a display method are collectively referred to as a holding type display device. A display state of a display element (a liquid crystal in the liquid-crystal display device) forming the screen of the holding type display device is referred to as a hold display. The above-referenced drawback is a common problem of the holding type display device.

SUMMARY OF THE INVENTION

Accordingly, it is an object of the present invention to provide a video processing apparatus that controls the generation of motion blur in a moving image.

A first video processing apparatus of the present invention includes a unit for detecting motion in a video based on input video data and reference video data immediately prior to the input video data, a video processing unit for processing a pixel value in the video data based on the result of the motion detection of the motion detecting unit, and a display unit for displaying the result of the process of the pixel value provided by the video processing unit. The video processing unit includes a step edge detector for detecting an edge portion in response to the result of the motion detection of the motion detecting unit, and a corrector for correcting the result of the step edge detection of the step edge detector.

Preferably, the motion detecting unit detects the motion in the video by comparing an object moving in the video data with an object moving in the reference video data.

Preferably, the corrector performs correction by changing the edge height in the edge portion detected by the step edge detector depending on the motion detected by the motion detecting unit.

Preferably, the corrector performs correction by changing the edge height in the edge portion of the step edge detected by the step edge detector depending on the display characteristics of the display unit.

A first video processing method of the present invention includes the steps of detecting motion in a video based on input video data and reference video data immediately prior to the input video data, processing a pixel value in the video data based on the result of the motion detection in the motion detecting step, and displaying the result of the process of the pixel value provided in the video processing step. The video processing step includes detecting an edge portion of a step edge in response to the result of the motion detection in the motion detecting step, and correcting the result of the step edge detection.

A first computer program of the present invention for causing a computer to perform a video processing method, includes program code for performing the steps of detecting motion in a video based on input video data and reference video data immediately prior to the input video data, processing a pixel value in the video data based on the result of the motion detection in the motion detecting step, and displaying the result of the process of the pixel value provided in the video processing step. The video processing step includes detecting an edge portion of a step edge in response to the result of the motion detection in the motion detecting step, and correcting the result of the step edge detection.

In accordance with the first video processing apparatus, the first video processing method, and the first computer program, the motion in the video data is detected from the input video data and the reference video data immediately prior to the input video data. The pixel value of at least one portion of the video data is processed in response to the result of motion detection. The result of the process of the pixel value is displayed. The edge portion in the video data is detected and is then corrected based on the result of the motion detection.

A second video processing apparatus of the present invention commands a display device to display each of a plurality of access units constituting a moving picture. The display device includes a plurality of display elements that take a predetermined period of time to reach an output target level from the moment the target level is addressed, each of the plurality of display elements corresponding to at least a portion of a predetermined one of pixels forming the access unit. The video processing apparatus includes a motion detecting unit for detecting an object that has moved to a spatial location in a first access unit from a spatial location in a second access unit prior to the first access unit and a spatial amount of motion of the object, an edge detecting unit for detecting an edge portion of the object detected by the motion detecting unit, a correcting unit for correcting a pixel value of a pixel, positioned at the edge portion of the object detected by the edge detecting unit, from among a plurality of pixels forming the first access unit, based on the spatial amount of motion of the object detected by the motion detecting unit, and a display commanding unit for commanding the display device to display the first access unit by addressing the pixel values of the plurality of pixels forming the first access unit, containing the pixel value corrected by the correcting unit, as the target levels of the corresponding display elements to the display device.

Preferably, the object includes pixels which, having a first pixel value, are consecutively aligned in the direction of motion, and beyond a predetermined pixel thereof as a border, pixels which, having a second pixel value different from the first pixel value, are consecutively aligned in the direction of motion, and the edge detecting unit detects, as a pixel corresponding to the edge portion of the object, a pixel having the first pixel value bordering the pixel having the second pixel value.

Preferably, the edge detecting unit further calculates the difference value between the first pixel value of the first pixel detected as the edge portion of the object and the second pixel value of a second pixel adjacent to the first pixel in the direction of motion. The correcting unit determines, regarding the first pixel detected by the edge detecting unit, a first gain depending on the amount of motion detected by the motion detecting unit, calculates the product between the determined first gain and the difference value detected by the edge detecting unit so as to determine a correction value, and adds the determined correction value to the pixel value of the first pixel so as to determine a corrected pixel value of the first pixel.

Preferably, the correcting unit further determines, regarding the first pixel, a second gain depending on the time response characteristics of the display element corresponding to the first pixel of the display device, and calculates the product of the first gain, the determined second gain, and the difference value so as to determine the correction value.

Preferably, the correcting unit further sets, as a target pixel to be corrected, two or more pixels including the first pixel, of pixels consecutively lined in the direction opposite to the direction of motion of the object, beginning at the first pixel, distributes the correction value to the two or more pixels to be corrected, adds the distributed correction value to the pixel values corresponding to the two or more pixels to be corrected so as to determine the corrected pixel value of the two or more pixels to be corrected.

A second video processing method of the present invention commands a display device to display each of a plurality of access units constituting a moving picture. The display device includes a plurality of display elements that take a predetermined period of time to reach an output target level from the moment the target level is addressed, each of the plurality of display elements corresponding to at least a portion of a predetermined one of pixels forming the access unit. The video processing method includes a motion detecting step for detecting an object that has moved to a spatial location in a first access unit from a spatial location in a second access unit prior to the first access unit and a spatial amount of motion of the object, an edge detecting step for detecting an edge portion of the object detected in the motion detecting step, a correcting step for correcting the pixel value of a pixel, positioned at the edge portion of the object detected in the edge detecting step, from among a plurality of pixels forming the first access unit, based on the spatial amount of motion of the object detected in the motion detecting step, and a display commanding step for commanding the display device to display the first access unit by addressing the pixel values of the plurality of pixels forming the first access unit, containing the pixel value corrected in the correcting step, as the target levels of the corresponding display elements to the display device.

A second computer program of the present invention causes a computer to perform a video processing method for commanding a display device to display each of a plurality of access units constituting a moving picture. The display device includes a plurality of display elements that take a predetermined period of time to reach an output target level from the moment the target level is addressed, each of the plurality of display elements corresponding to at least a portion of a predetermined one of pixels forming the access unit. The computer program includes program code for performing a motion detecting step for detecting an object that has moved to a spatial location in a first access unit from a spatial location in a second access unit prior to the first access unit and a spatial amount of motion of the object, an edge detecting step for detecting an edge portion of the object detected in the motion detecting step, a correcting step for correcting the pixel value of a pixel, positioned at the edge portion of the object detected in the edge detecting step, from among a plurality of pixels forming the first access unit, based on the spatial amount of motion of the object detected in the motion detecting step, and a display commanding step for commanding the display device to display the first access unit by addressing the pixel values of the plurality of pixels forming the first access unit, containing the pixel value corrected in the correcting step, as the target levels of the corresponding display elements to the display device.

In accordance with the second video processing apparatus, the second video processing method, and the second computer program, the display device is commanded to display each of a plurality of access units constituting a moving picture, wherein the display device includes a plurality of display elements that take a predetermined period of time to reach an output target level from the moment the target level is addressed, each of the plurality of display elements corresponding to at least a portion of a predetermined one of pixels forming the access unit. More specifically, the object that has moved to a spatial location in the first access unit to a spatial location in the second access unit prior to the first access unit is detected. The amount of motion of the object and the edge portion of the object are detected. The pixel value of the pixel, positioned at the edge portion of the detected object, from among the plurality of pixels forming the first access unit, is corrected based on the spatial amount of motion of the detected object. The display device is commanded to display the first access unit by addressing the pixel values of the plurality of pixels forming the first access unit, containing the pixel value corrected in the correcting step, as the target levels of the corresponding display elements to the display device.

A third video processing apparatus of the present invention includes a motion detecting unit for detecting motion in a video based on input video data and reference video data immediately prior to the input video data, a first video processing unit for performing a first video process on the video data based on the result of the motion detection of the motion detecting unit, a second video processing unit for performing a second video process other than the first video process on the video data based on the result of the motion detection of the motion detecting unit, and a display unit for displaying at least one of the results of the first and second video processes of the first and second video processing units based on the result of the motion detection of the motion detecting unit.

Preferably, the motion detecting unit detects the motion in the video by comparing an object moving in the video data with an object moving in the reference video data.

Preferably, the second video processing unit includes a step edge detector for detecting an edge portion in accordance with the result of the motion detection of the motion detecting unit, and a corrector for correcting the result of the step edge detection of the step edge detector.

Preferably, the display unit includes a switch for switching between the result of the video process of the first processing unit and the result of the video process of the second video processing unit, based on the result of motion detection of the motion detecting unit, a display controller for converting the result selected by the switch to a signal having a predetermined format responsive to the target level of a display element of each pixel, and a hold unit for holding the result of the conversion of the display controller for each of all display elements.

Preferably, the corrector performs correction by changing the edge height in the edge portion detected by the step edge detector depending on the motion detected by the motion detecting unit.

Preferably, the corrector performs correction by changing the edge height in the edge portion detected by the step edge detector depending on the display characteristics of the display unit.

A third video processing method of the present invention includes a motion detecting step for detecting motion in a video based on input video data and reference video data immediately prior to the input video data, a first video processing step for performing a first video process on the video data based on the result of the motion detection in the motion detecting step, a second video processing step for performing a second video process other than the first video process on the video data based on the result of the motion detection in the motion detecting step, and a display step for displaying at least one of the results of the first and second video processes of the first and second video processing steps based on the result of the motion detection in the motion detecting step.

A third computer program of the present invention causes a computer to perform a video processing method, and includes program code for performing a motion detecting step for detecting motion in a video based on input video data and reference video data immediately prior to the input video data, a first video processing step for performing a first video process on the video data based on the result of the motion detection in the motion detecting step, a second video processing step for performing a second video process other than the first video process on the video data based on the result of the motion detection in the motion detecting step, and a display step for displaying at least one of the results of the first and second video processes of the first and second video processing steps based on the result of the motion detection in the motion detecting step.

In accordance with the third video processing apparatus, the third video processing method, and the third computer program, the motion in a video is detected based on the input video data and the reference video data immediately prior to the video data. The first video process and the second video process are performed in accordance with the results of the motion detection. Depending on the result of the motion detection, at least one of the results of the first video process and the second video process is displayed.

A fourth video processing apparatus of the present invention includes a motion detecting unit for detecting motion in a video based on input video data and reference video data immediately prior to the input video data, a video processing unit for performing a video process on pixel values in the video data based on the result of the motion detection of the motion detecting unit, and a display controlling unit for controlling a predetermined display device to display the result of the video processing unit. The video processing unit includes a correcting unit for subjecting a block formed of two pixels values corresponding to two pixels to be disposed consecutively in a predetermined direction of the video data to an asymmetric high-pass filter process, taking advantage of the result of the motion detecting unit, thereby correcting one of the pixel values included in the block.

A fourth video processing method of the present invention includes the steps of detecting motion in a video based on input video data and reference video data immediately prior to the input video data, processing a pixel value in the video data based on the result of the motion detection in the motion detecting step, and controlling a predetermined display device to display the result of the process of the pixel value provided in the video processing step. The video processing step includes a correcting step for subjecting a block formed of two pixels values corresponding to two pixels to be disposed consecutively in a predetermined direction of the video data to an asymmetric high-pass filter process, taking advantage of the result of the motion detecting step, thereby correcting one of the pixel values included in the block.

A fourth computer program of the present invention includes program code for performing the steps of detecting motion in a video based on input video data and reference video data immediately prior to the input video data, processing a pixel value in the video data based on the result of the motion detection in the motion detecting step, and controlling a predetermined display device to display the result of the process of the pixel value provided in the video processing step. The video processing step includes a correcting step for subjecting a block formed of two pixels values corresponding to two pixels to be disposed consecutively in a predetermined direction of the video data to an asymmetric high-pass filter process, taking advantage of the result of the motion detecting step, thereby correcting one of the pixel values included in the block.

In accordance with the fourth video processing apparatus, the fourth video processing method, and the fourth computer program, the motion in a video is detected based on the input video data and the reference video data immediately prior to the video data. The pixel values in the video data are processed in accordance with the detected motion, and the video of which the pixel values are processed is displayed on a predetermined display device. More specifically, the process of pixel values includes at least a process for subjecting a block formed of two pixels values corresponding to two pixels to be disposed consecutively in a predetermined direction of the video data to an asymmetric high-pass filter process, taking advantage of the detected motion, thereby correcting one of the pixel values included in the block.

The video processing apparatus may be a standalone apparatus separate from a display device, or may contain the display device as an element. Alternatively, the video processing apparatus may be contained as a unit in the display device.

The present invention is applicable to a recording medium that stores the computer program of the present invention.

The present invention thus controls the holding type display device such as the liquid-crystal display device in the display function thereof. The present invention controls the motion blur of a moving picture in the holding type display device such as the liquid-crystal display device.

BRIEF DESCRIPTION OF THE DRAWINGS

FIG. 29 is a block diagram illustrating the structure of yet another video processing apparatus in accordance with the preferred embodiment of the present invention.

DESCRIPTION OF THE PREFERRED EMBODIMENTS

Figure 1:
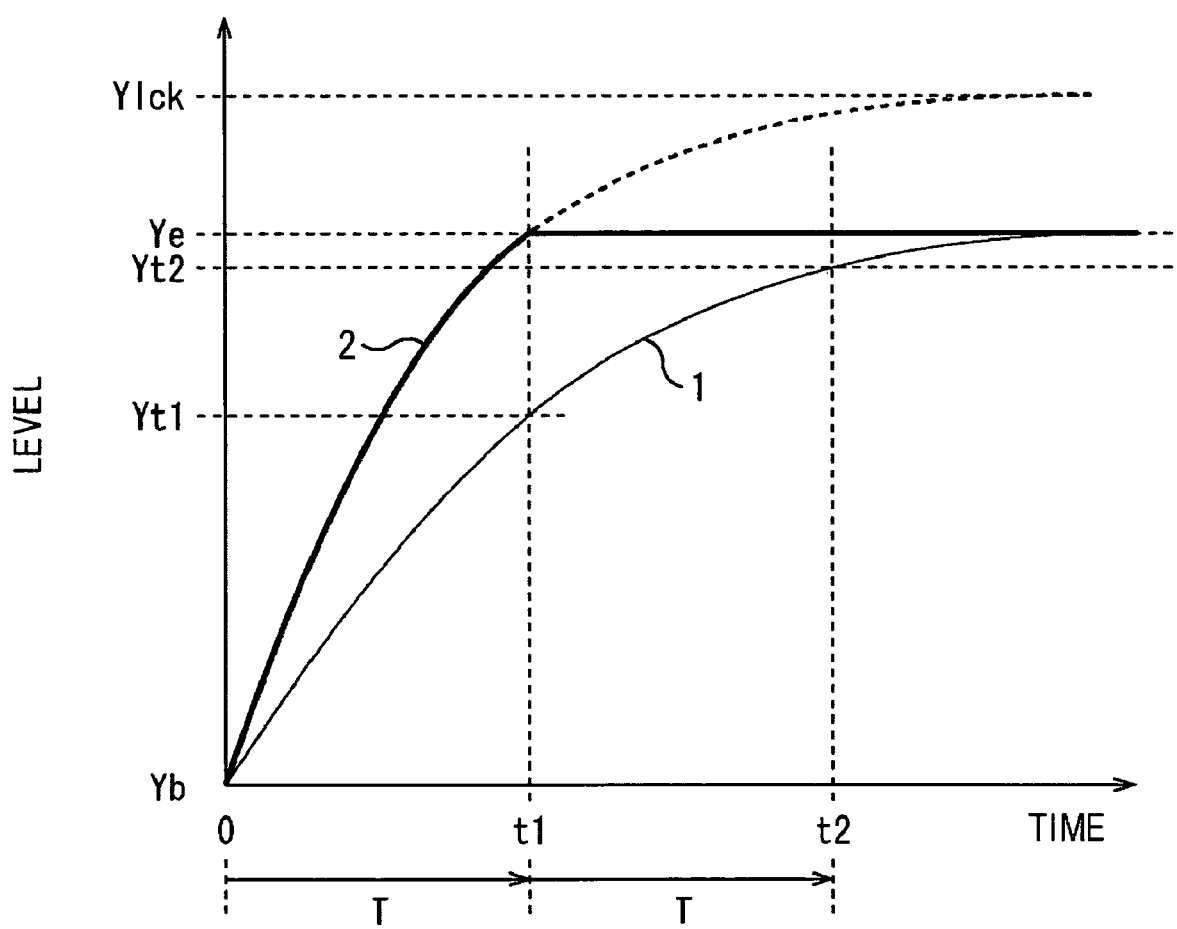
FIG. 1 plots output level versus time response waveform of a liquid crystal of a liquid-crystal display device.

According to the present invention, a first video processing apparatus is provided. This first video processing apparatus includes a unit (for example, a motion detector 24 of FIG. 7) for detecting motion in a video based on input video data (for example, video data currently input to a video processing apparatus 11 of FIG. 7) and reference video data (for example, video data output from a reference video storage unit 23 of FIG. 7) immediately prior to the input video data, a video processing unit (for example, a video processor 22 of FIG. 7) for processing a pixel value in the video data based on the result of the motion detection of the motion detecting unit, and a display unit (a holding type display unit 12 of FIG. 7) for displaying the result of the process of the pixel value provided by the video processing unit. The video processing unit includes a step edge detector (for example, a step edge detector 31 of FIG. 7) for detecting an edge portion in response to the result of the motion detection of the motion detecting unit, and a corrector (for example, a corrector 32 of FIG. 7) for correcting the result of the step edge detection of the step edge detector.

According to the present invention, a second video processing apparatus is provided. This second video processing apparatus (for example, the video processing apparatus 11 of FIG. 7) commands a display device (for example, the holding type display unit 12 of FIG. 7) to display each of a plurality of access units constituting a moving picture. The display device includes a plurality of display elements (for example, display elements providing the response waveform like the curve 1 of FIG. 1) that take a predetermined period of time (for example, twice as long as the frame time T or field time T as shown in FIG. 1) to reach an output target level (for example, the level Ye of FIG. 1) from the moment the target level is addressed, each of the plurality of display elements corresponding to at least a portion of a predetermined one of pixels forming the access unit. The video processing apparatus includes a motion detecting unit (for example, a motion detector 24 of FIG. 7) for detecting an object (for example, a step edge moving as shown from FIG. 3 to FIG. 4) that has moved to a spatial location in a first access unit from a spatial location in a second access unit prior to the first access unit and a spatial amount of motion of the object, an edge detecting unit (for example, a step edge detector 31 of a video processor 22 of FIG. 7, or a difference value computing unit 81 of the video processor 22 of FIG. 23) for detecting an edge portion of the object detected by the motion detecting unit, a correcting unit (for example, a corrector 32 of FIG. 7, or a difference value-dependent gain Ge decision unit 82 through an adder 87) for correcting (in a manner shown in FIG. 11 through FIG. 13, for example) the pixel value of a pixel (for example, a pixel n+4 at the edge portion of the step edge of FIG. 4 and FIG. 12, or a pixel n+5 of FIG. 13), positioned at the edge portion of the object detected by the edge detecting unit, from among a plurality of pixels forming the first access unit, based on the spatial amount of motion of the object detected by the motion detecting unit, and a display commanding unit (for example, a display controller 26 of FIG. 7) for commanding the display device to display the first access unit by addressing the pixel values of the plurality of pixels forming the first access unit, containing the pixel value corrected by the correcting unit, as the target levels of the corresponding display elements to the display device.

In this second video processing apparatus, the object includes pixels (for example, pixels n–8 through n+4 of FIG. 4) which, having a first pixel value (for example, a pixel value E of FIG. 4), are consecutively aligned in the direction of motion (for example, the direction X represented by the arrow of FIG. 4), and beyond a predetermined pixel (for example, the pixel n+4 of FIG. 4) thereof as a border, pixels (for example, the pixel n+5 and more rightward pixels of FIG. 4) which, having a second pixel value (for example, a pixel value B of FIG. 4) different from the first pixel value, are consecutively aligned in the direction of motion, and the edge detecting unit detects, as the edge portion of the object, a pixel (for example, the pixel n+4 of FIG. 4) having the first pixel value bordering the pixel having the second pixel value.

In this second video processing apparatus, the edge detecting unit further calculates the difference value between the first pixel value of the first pixel detected as a pixel corresponding to the edge portion of the object, and the second pixel value of the second pixel adjacent to the first pixel in the direction of motion of the object. The correcting unit determines a first gain (for example, a motion speed-dependent gain Gv of FIG. 17) depending on the amount of motion detected by the motion detecting unit with regard to the first pixel detected by the edge detecting unit, calculates the product between the determined first gain and the difference value detected by the edge detecting unit so as to determine a correction value (for example, a correction value decision unit 86 of FIG. 23 determines a later-described correction value R=Gv×(Nr−Nrn)), and adds the determined correction value to the pixel value of the first pixel so as to determine a corrected pixel value of the first pixel (for example, and an adder 87 of FIG. 23 outputs an added value Nr+R between a correction value R and the pixel value Nr of a target pixel).

Figure 20:
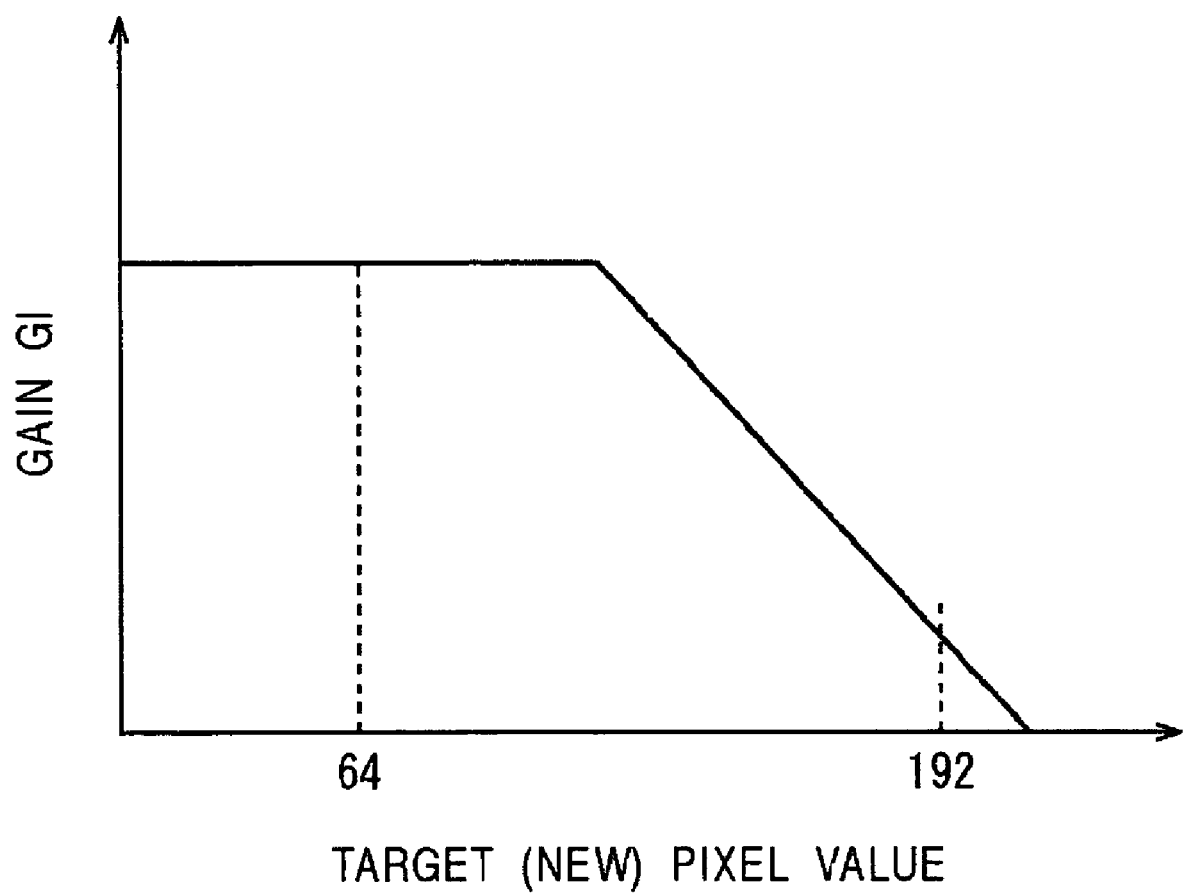
FIG. 20 illustrates the relationship between a target (new) pixel value and the amount of correction, which is used by the video processor of FIG. 14.
Figure 22:
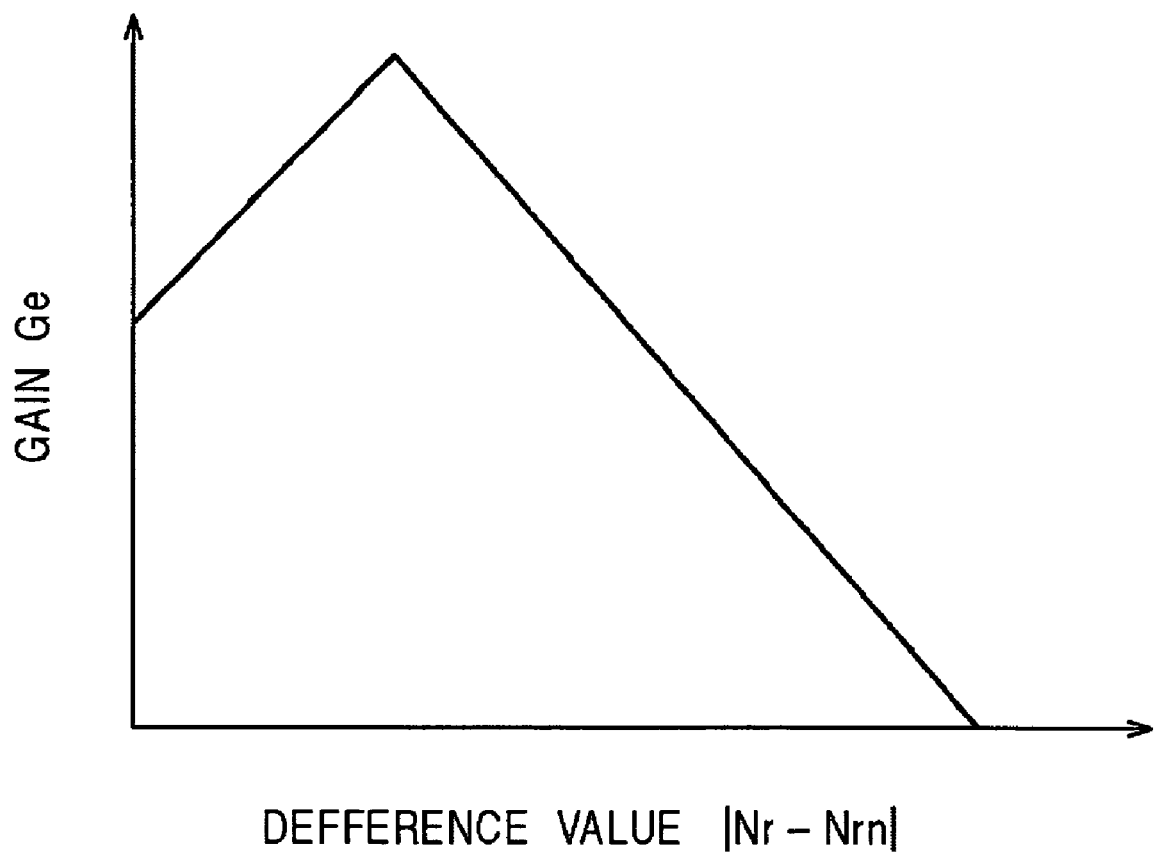
FIG. 22 illustrates the relationship between the amount of correction and the difference value between a target (new) pixel value and a old pixel value, which is used by the video processor of FIG. 14.
Figure 23:
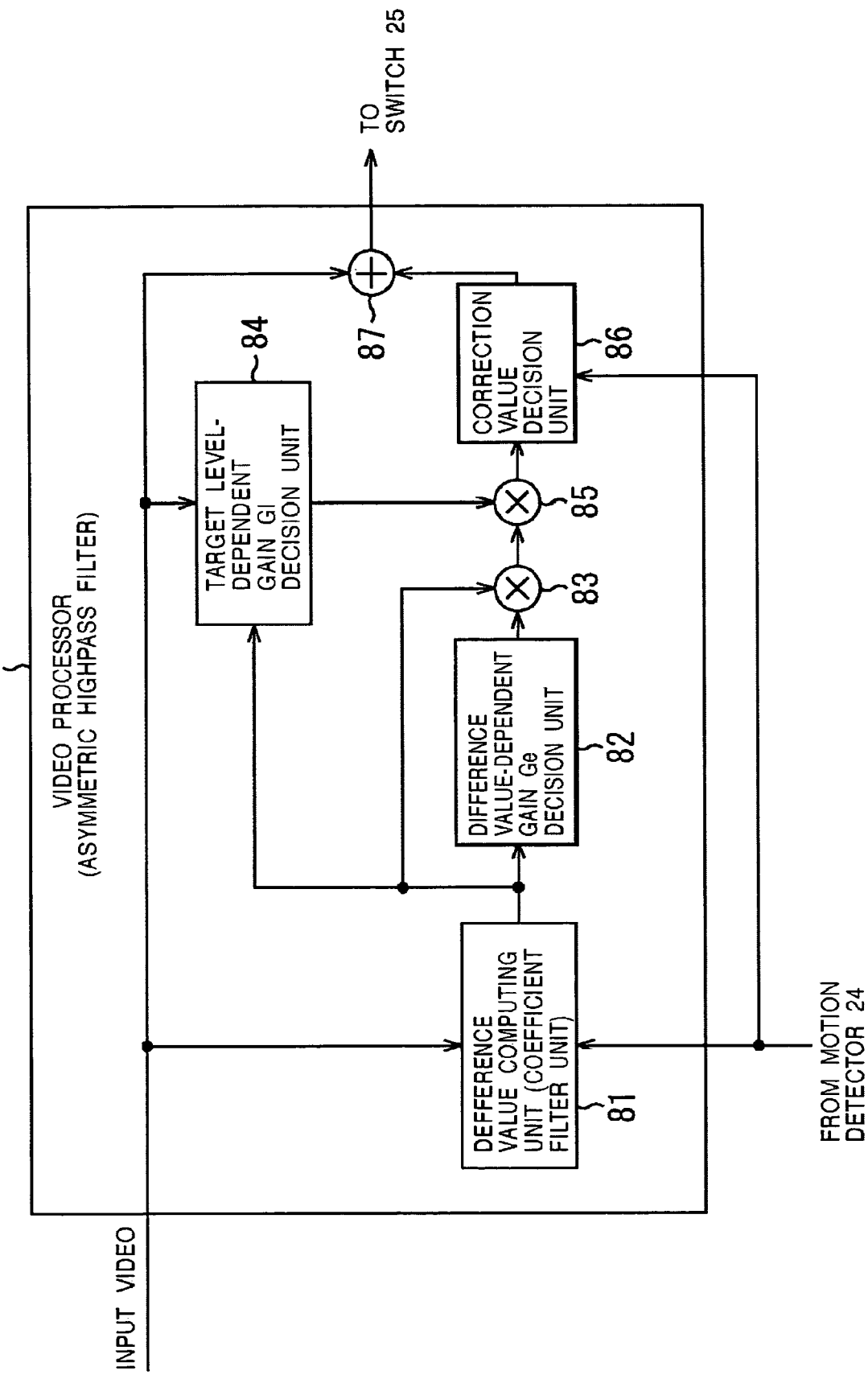
FIG. 23 is a block diagram illustrating the structure of yet another video processor of the video processing apparatus of FIG. 7.

In this second video processing apparatus, the correcting unit determines a second gain depending on the time response characteristics of the display element corresponding to the first pixel of the display device (for example, a difference value-dependent gain Ge decision unit 82 of FIG. 23 determines a difference value-dependent gain Ge of FIG. 22, and also a target level-dependent gain Gl decision unit 84 determines a target level-dependent gain Gl of FIG. 20), and calculates the product between the first gain, the determined second gain, and the difference value so as to determine the correction value (multipliers 83 and 85 calculate Ge×Gl×(Nr−Nrn), further, a correction value decision unit 86 calculates Gv×Ge×Gl×(Nr−Nrn), and then the calculated result is determined as a correction value R).

Figure 25:
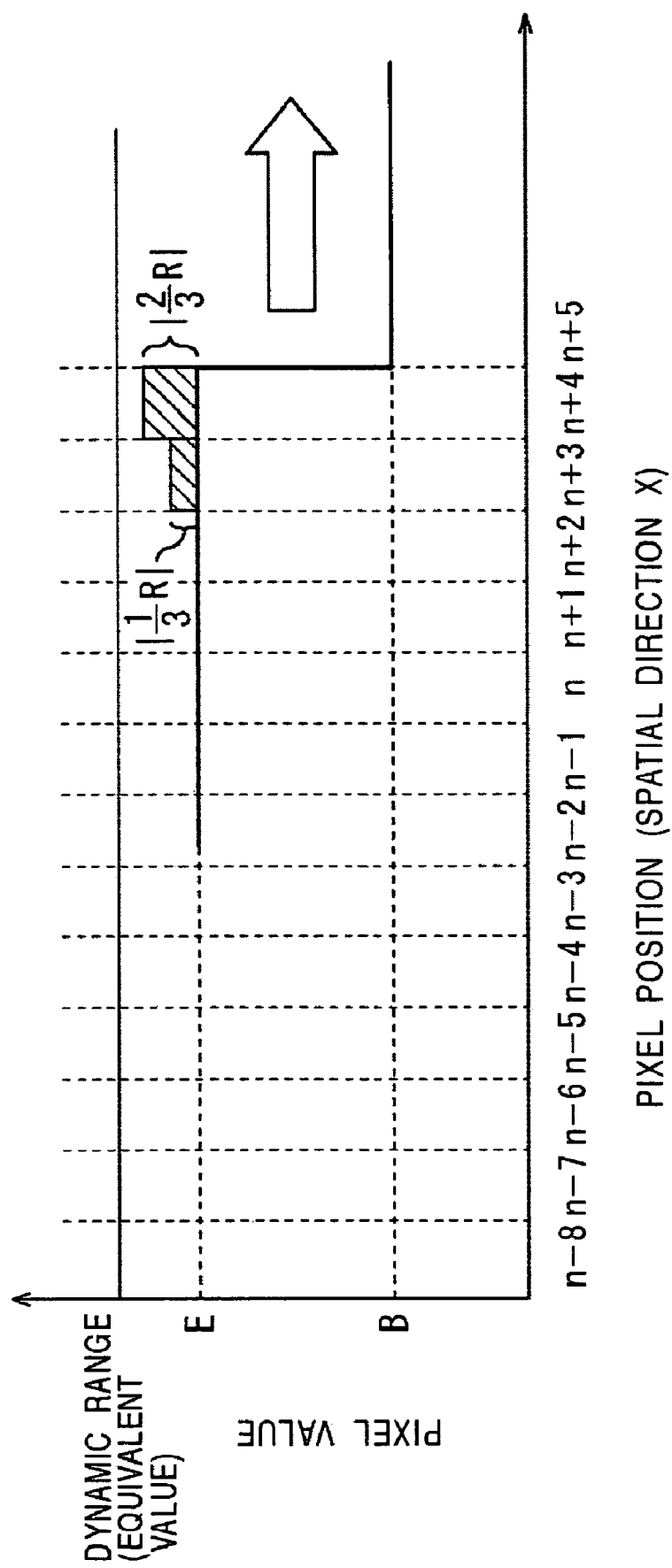
FIG. 25 illustrates a correction method of a pixel value when the amount of correction exceeds the dynamic range.

The correcting unit further sets, as a target pixel to be corrected, two or more pixels including the first pixel of pixels consecutively lined in the direction opposite to the direction of motion of the object, beginning at the first pixel (for example, a pixel n+4 and a pixel n+3 of FIG. 25 are set as a target pixel), distributes the correction value to the two or more target pixels thus set (for example, as shown in FIG. 25, a correction value R is distributed in the proportion of 2:1), and adds the distributed correction value to the pixel values corresponding to the two or more target pixels so as to determine the corrected pixel values of the corresponding target pixels (for example, as shown in FIG. 25, the correction value of the pixel n+4 is determined as 2/3R, and the correction value of the pixel n+3 is determined as R/3).

According to the present invention, a third video processing apparatus is provided. This third video processing apparatus includes a motion detecting unit (for example, the motion detector 24 of FIG. 7) for detecting motion in a video based on input video data (for example, video data currently input to the video processing apparatus 11 of FIG. 7)*and* reference video data (for example, the video data output from the reference video storage unit 23 of FIG. 7) immediately prior to the input video data, a first video processing unit (for example, a video processor 21 of FIG. 7) for performing a first video process on the video data based on the result of the motion detection of the motion detecting unit, a second video processing unit (for example, a video processor 22 of FIG. 7) for performing a second video process other than the first video process on the video data based on the result of the motion detection of the motion detecting unit, and a display unit (as will be discussed later, a switch 25, the display controller 26, and the holding type display unit 12, shown in FIG. 7, may be considered as a single display unit) for displaying at least one of the results of the first and second video processes of the first and second video processing units based on the result of the motion detection in the motion detecting unit.

In the third video processing apparatus, the second video processing unit includes a step edge detector (for example, the step edge detector 31 of FIG. 7) for detecting an edge portion in accordance with the result of the motion detection of the motion detecting unit, and a corrector (for example, the corrector 32 of FIG. 7) for correcting the result of the step edge detection of the step edge detector.

In the third video processing apparatus, the display unit includes a switch (for example, the switch 25 of FIG. 7) for switching between the result of the video process of the first processing unit and the result of the video process of the second video processing unit, based on the result of the motion detection of the motion detecting unit, a display controller (for example, the display controller 26 of FIG. 7) for converting the result selected by the switch to a signal (for example, a voltage signal at a voltage level corresponding to the target level) having a predetermined format responsive to the target level of a display element of each pixel, and a hold unit (for example, the holding type display unit 12 of FIG. 7) for holding the result of the conversion of the display controller for each of all display elements.

Figure 14:
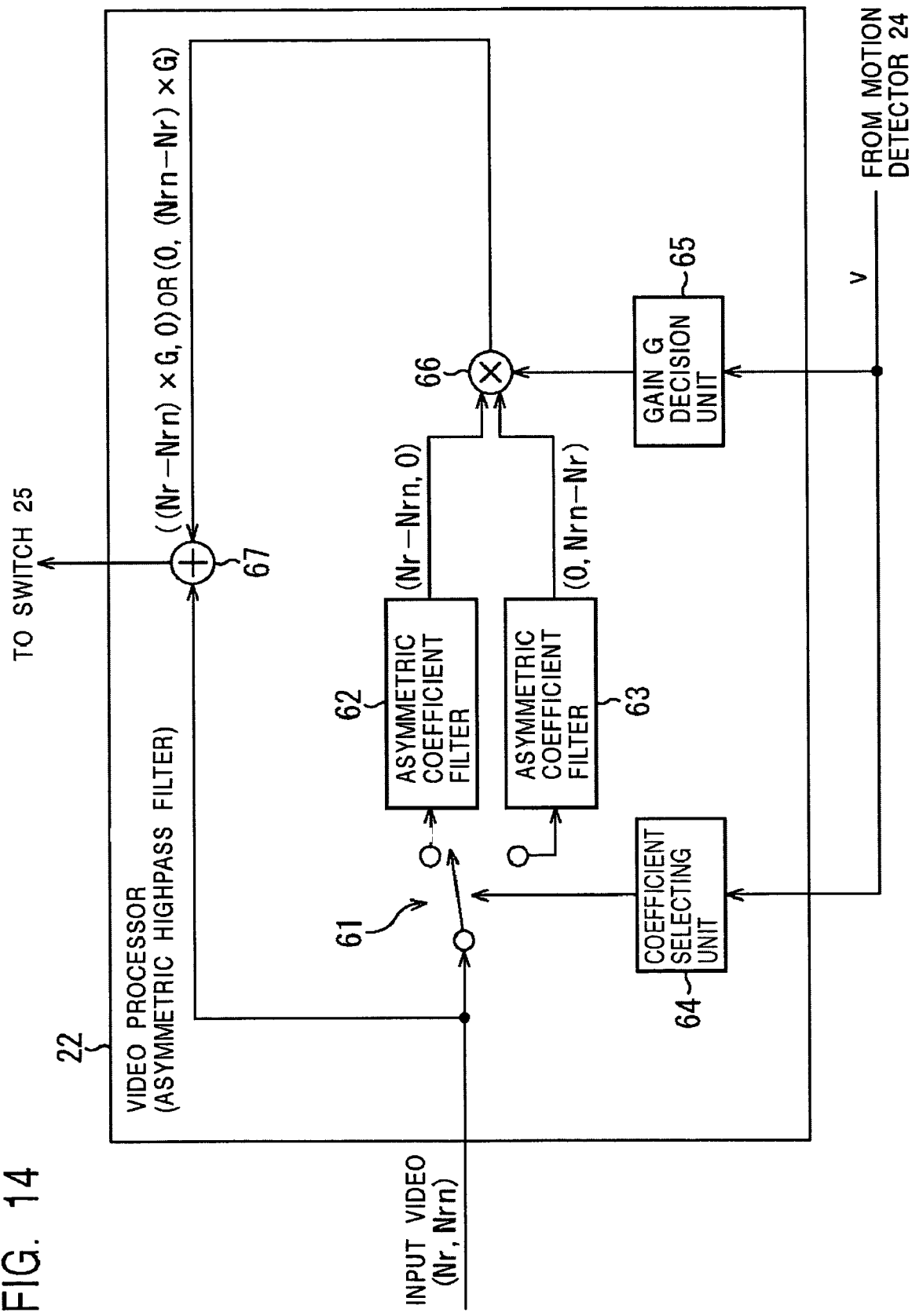
FIG. 14 is a block diagram illustrating the structure of another video processor of the video processing apparatus of FIG. 7.

According to the present invention, a fourth video processing apparatus is provided. This fourth video processing apparatus includes a motion detecting unit (for example, a motion detector 24 of FIG. 7) for detecting motion in a video based on input video data and reference video data immediately prior to the input video data, a video processing unit (for example, a video processor 22 of FIG. 14 provided instead of a video processor 22 of FIG. 7) for performing a video process on pixel values in the video data based on the result of the motion detection of the motion detecting unit, and a display controlling unit (for example, a display controller 26 of FIG. 7) for controlling a predetermined display device to display the result of the video processing unit. The video processing unit includes a correcting unit (for example, an asymmetric coefficient filter 62 through a multiplier 66 of the video processor 22 of FIG. 14) for subjecting a block formed of two pixels values corresponding to two pixels to be disposed consecutively in a predetermined direction of the video data to an asymmetric high-pass filter process, taking advantage of the result of the motion detecting unit, thereby correcting one of the pixel values included in the block.

The inventors of this invention have analyzed the cause why the overdrive method is still unable to overcome the conventional drawback, namely, the cause why the motion blur is not controlled in the holding type display device, and have developed a video processing apparatus free from the drawback based on the results of analysis.

The results of analysis is now discussed before the discussion of the video processing apparatus of the preferred embodiments of the present invention free from the drawback.

One of the causes for the generation of motion blur is slow response speed of the liquid crystal (pixel) in the liquid-crystal display device. The overdrive method is a solution taking into consideration the slow response.

The slow response of the liquid crystal is not the only cause for the motion blur in the liquid crystal. The retinal after-image of the human who views the liquid-crystal display device is also one of the causes. The inventors of this invention have considered that the overdrive method fails to take into consideration the retinal-after image, and that for this reason, the motion blur is not effectively eliminated. The retinal after-image refers to the phenomenon that the eyes of the human unconsciously track an object if the object is moving.

The retinal after-image and the motion blur in the liquid-crystal display device will now be discussed in detail with reference to FIGS. 3 through 6.

It is assumed in the following discussion that each display element (a liquid crystal in the liquid-crystal display device) forming the screen of the holding type display device corresponds to a predetermined one of a plurality pixels forming one frame or one field.

Figure 3:
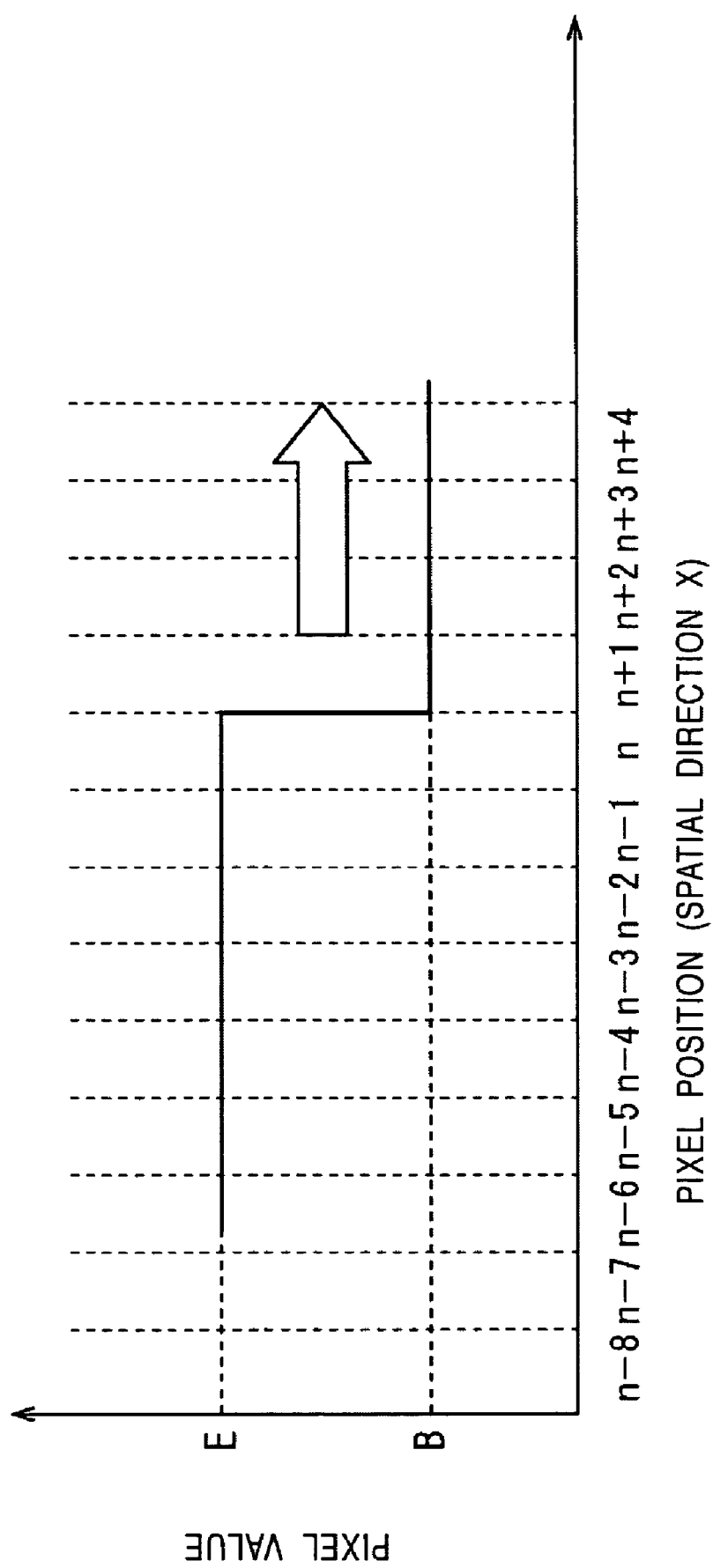
FIG. 3 illustrates a step edge contained in a predetermined frame or field.

FIG. 3 illustrates a step edge contained in a predetermined frame or a predetermined field.

As shown, the horizontal axis represents a position of each pixel (in a spatial direction X), and the vertical axis represents a pixel value. Located at positions n−8 through n+4 are respective pixels associated with the respective numbers. Hereinafter, a pixel numbered k is referred to as a pixel k (k is any integer number).

One spatial direction in which pixels forming a frame or a field are consecutively lined is referred to as a spatial X direction, and a spatial direction perpendicular to the spatial direction X is referred to a spatial direction Y. As shown in FIG. 3, the pixels n−8 through n+4 are consecutively lined in the spatial direction X.

Pixels having a first pixel value (a pixel value E in FIG. 3) are consecutively lined in a predetermined direction (the spatial direction X in FIG. 3), and beyond a predetermined pixel (the pixel n in FIG. 3), pixels having a second pixel value (a pixel value B in FIG. 3) different from the first pixel value are consecutively lined in the spatial direction X. A set of these pixels is referred to as a step edge.

An object having a constant pixel value E is displayed on a background having a constant pixel value B in a predetermined frame or a predetermined field. From among a plurality of pixels forming the frame or the field, a set of pixels consecutively lined in a predetermined direction in the vicinity of a border (edge) between the object and the background is a step edge. If the step edge moves in a predetermined direction, the object must move in the same direction. In other words, as will be discussed later, the object is decomposed into step edges, and a step edge itself may be regarded as an object.

For example, it is assumed that the step edge is now moving at a constant velocity in the spatial direction X as shown in FIG. 3, and the amount of motion across frames or fields is 4 pixels/frame or 4 pixels/field. The step edge reaches the position in the next frame or the next field as shown in FIG. 4.

Figure 4:
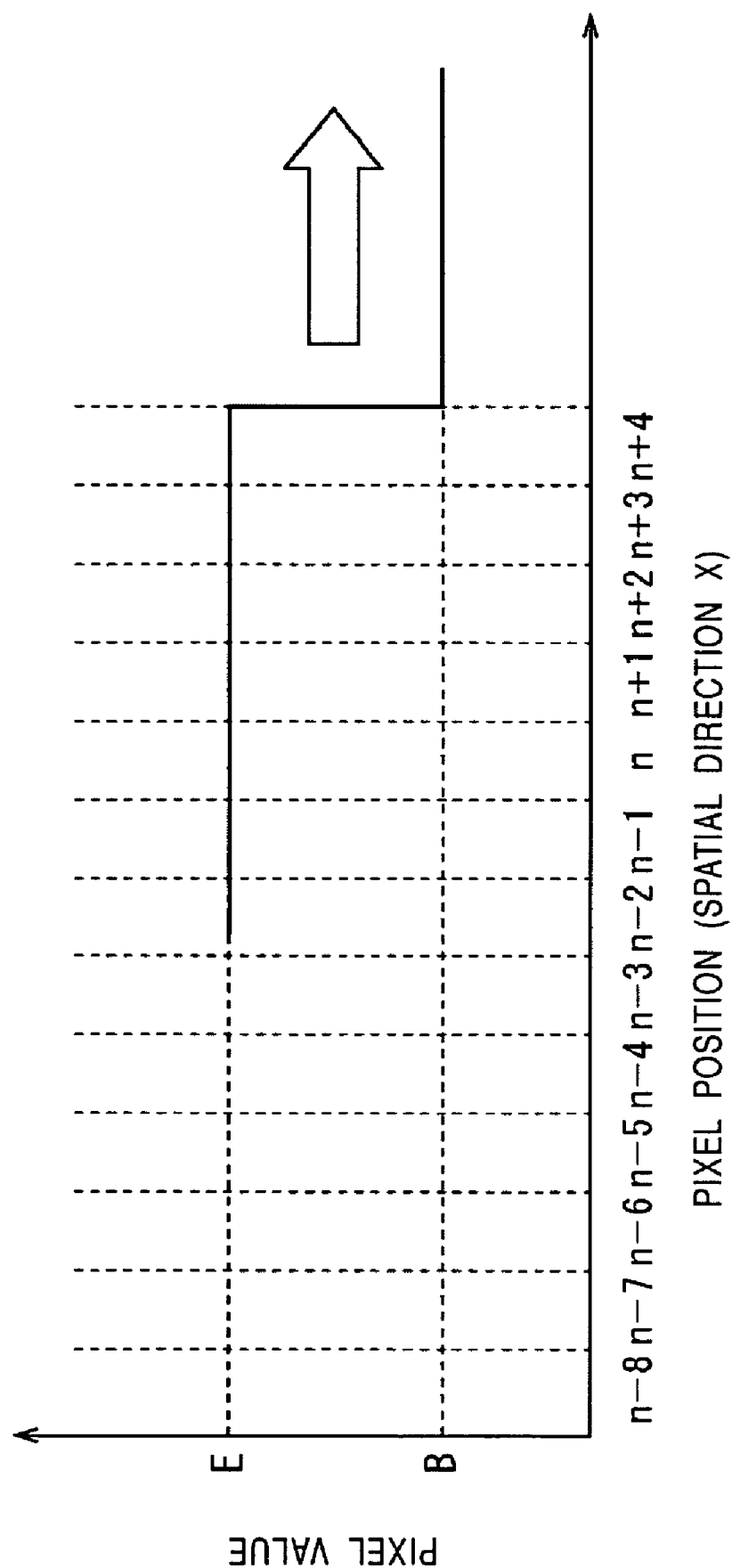
FIG. 4 illustrates a step edge contained in a frame or a field subsequent to the frame or the field of FIG. 3.

If the frame or the field containing the step edge of FIG. 4 is a frame of interest or a field of interest to be displayed (hereinafter referred to as a display target frame or a display target field), FIG. 3 shows the step edge contained in the frame or the field immediately prior to the display target frame or the display target field. If the step edge is moving at a constant velocity of 4 pixels/frame or 4 pixels/field, FIG. 4 shows the step edge contained in the display target frame or the display target field.

Figure 5:
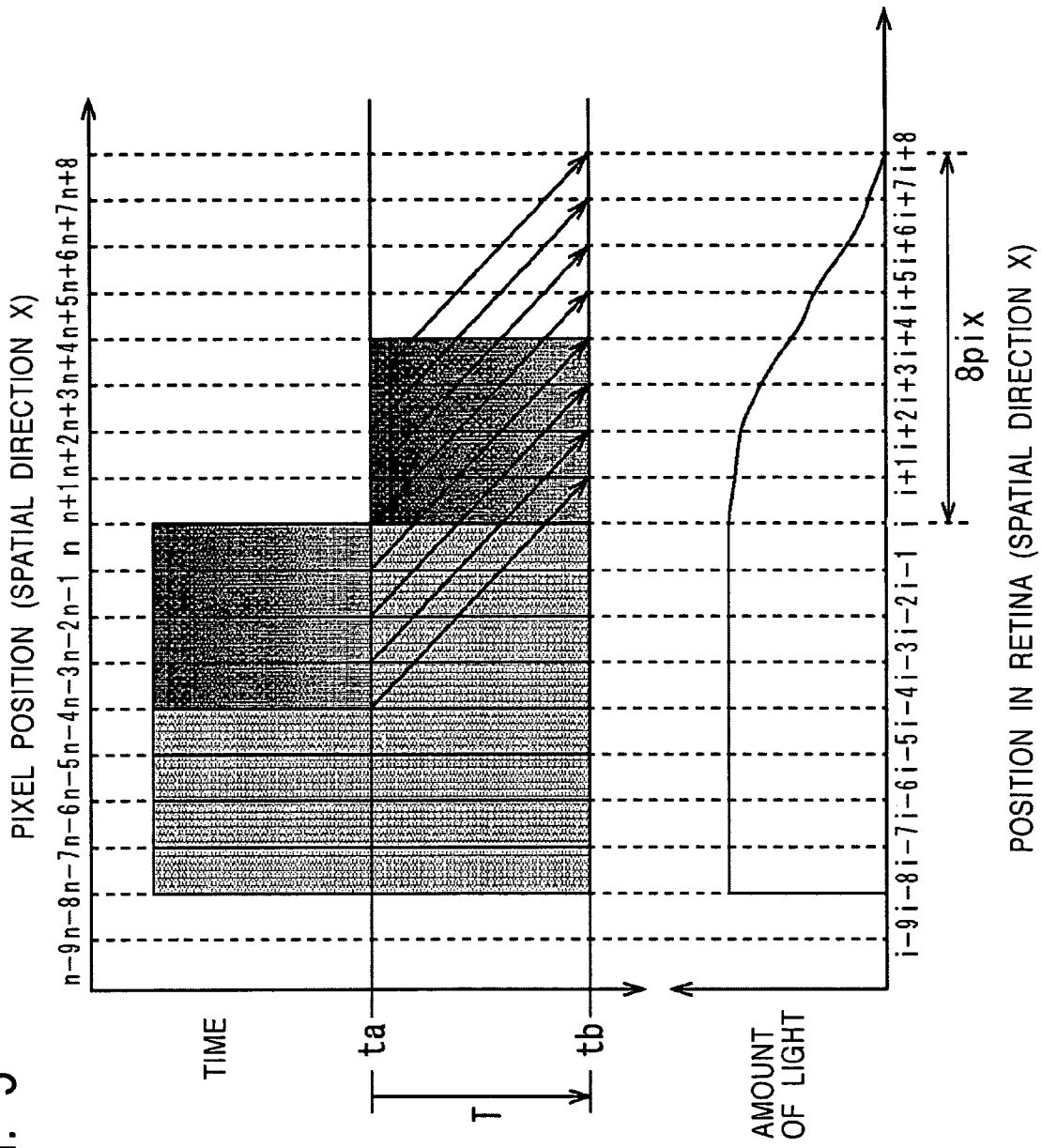
FIG. 5 illustrates the relationship between a retinal after-image and a motion blur in the liquid-crystal display device that displays the step edge of FIG. 4 with the overdrive method in operation.

FIG. 5 illustrates the relationship between a hold display of each liquid crystal (each pixel) forming the screen of the liquid-crystal display device and the retinal after-image with the previously discussed overdrive method in operation.

The output level of the liquid crystal changes with time as shown when the liquid-crystal display device displays the step edge of FIG. 4.

Figure 6:
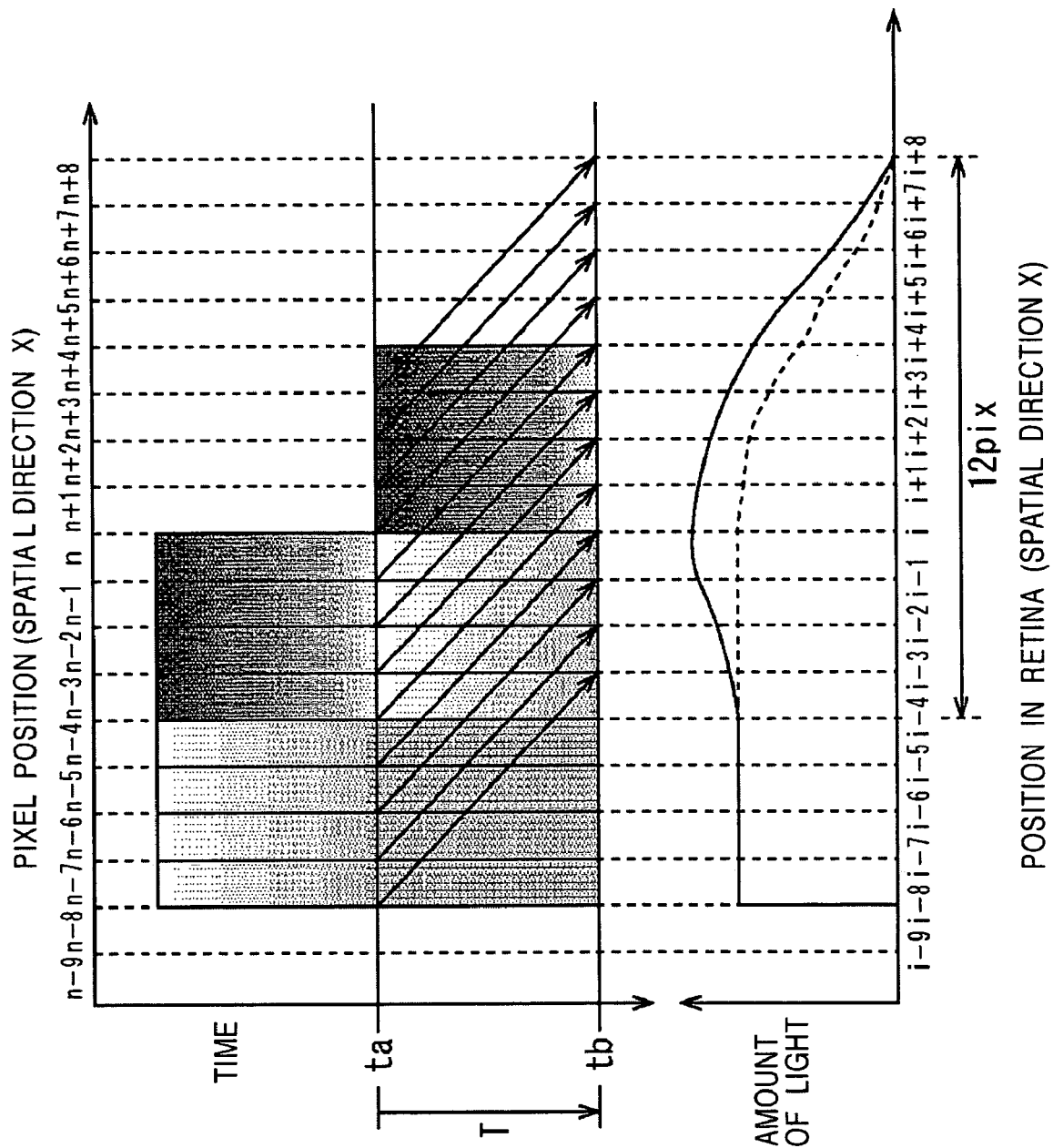
FIG. 6 illustrates the relationship between a retinal after-image and a motion blur in the liquid-crystal display device that displays the step edge of FIG. 4 with the overdrive method in operation.
Figure 11:
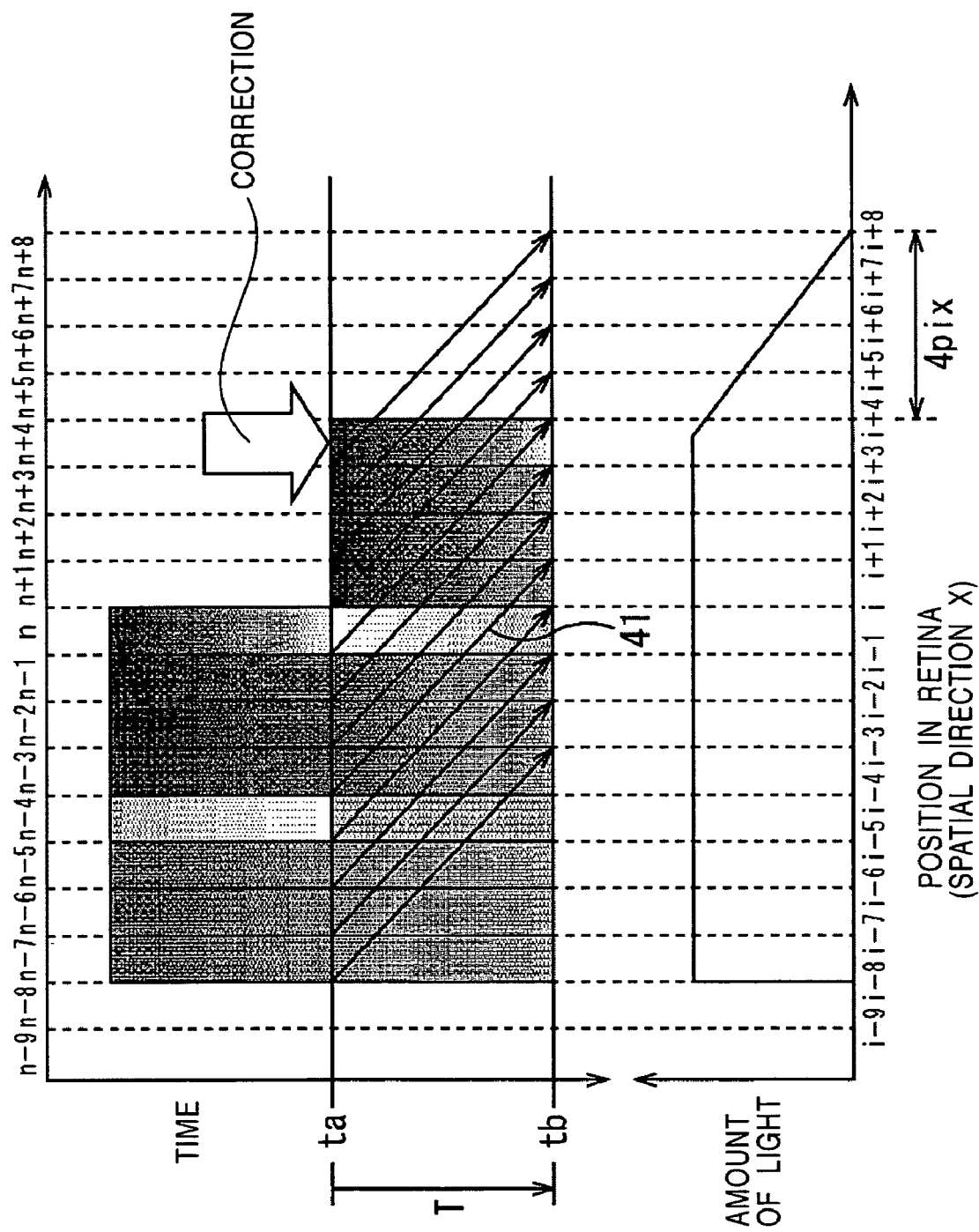
FIG. 11 illustrates the relationship between a retinal after-image and a motion blur in the holding type display device that displays the step edge of FIG. 4 under the control of the video processing apparatus of FIG. 7.

The top horizontal axis of FIG. 5 represents a pixel position (the spatial direction X) and the vertical axis represents time axis. As previously discussed, one pixel corresponds to one liquid crystal, and the horizontal axis represents the position of each of the pixels n−9 thought n+8. A liquid crystal corresponding to a pixel k is referred to as a liquid crystal k. In the upper portion of FIG. 5, the density of gray tone represents the output level of the liquid crystals (liquid crystals n−7 through n+4). The densest tone of gray represents a level corresponding to the pixel value B of FIG. 4, and the lightest tone of gray represents a level corresponding to the pixel value E of FIG. 4. With reference to FIGS. 6 and 11, as will be discussed later, a lighter tone of gray is shown, and represents a level corresponding to a pixel value higher than the pixel value E of FIG. 4.

Shown in the lower portion of FIG. 5 is the amount of light picked up by the retina of a human user when the human user views the step edge of FIG. 4 appearing on the screen of the liquid-crystal display device. More specifically, the vertical axis represents the amount of light picked up by the retina of the user. The horizontal axis represents the position of the retina of the user (in the spatial direction X) at time point tb on the upper portion of FIG. 5.

As shown in the upper portion of FIG. 5, immediately prior to time ta, the liquid-crystal display device displays the frame or the field containing the step edge of FIG. 3 (respectively immediately prior to the display target frame or the display target field), and the liquid-crystal display device is commanded to display the display target frame or the display target field containing the step edge of FIG. 4 at time ta.

Each of the liquid crystals (pixels) n−7 through n outputs light at a level corresponding to the pixel value E at time ta. The liquid-crystal display device applies a voltage at a level corresponding to the pixel value E to each of the liquid crystals (pixels) n−7 through n at time ta thereafter. Each of the liquid crystals (pixels) n−7 through n continuously emits light at a level corresponding to the pixel value E (presenting a hold display).

In contrast, each of the liquid crystals (pixels) n+1 through n+4 outputs light at a level corresponding to the pixel value B at time ta. The liquid-crystal display device supplies each of the liquid crystals (pixels) n+1 through n+4 with a voltage at a level (corresponding to the level Ylck of FIG. 1) higher than the level of the pixel E immediately subsequent to time ta. From a period of time immediately subsequent to time ta to time tb at which the liquid-crystal display device is commanded to display a next frame or a next field (during the frame time T of the display target frame or frame field T of the display target field), the output level of each of the liquid crystals n+1 through n+4 gradually approaches to the level corresponding to the pixel value E from the level corresponding to the pixel level B.

Since the user continuously views the step edge displayed on the liquid-crystal display device with the retinal afterimage from before time ta, the user continuously views the step edge in accordance with the arrow in shown in the upper portion of FIG. 5 (in step with the movement of the step edge) even during the period of time from time ta at which the liquid-crystal display device is commanded to display the display target frame or the display target field to time tb at which the liquid-crystal display device is commanded to display the next frame or the next field (namely, during the frame time T of the display target frame or the field time T of the display target field).

More specifically, a point i+1 on the retina of the human user, looking at a border between the liquid crystal n+1 and the liquid crystal n+2 at time tb, moves along a left-most arrow-headed line as shown. The left-most arrow-headed line extending from time ta to time tb represents a trajectory of the point i+1 of the retina.

At each time point between time ta and time tb, the point i+1 of the retina receives light at a predetermined level emitted from the liquid crystal at a position where the leftmost arrow-headed line passes. As a result, light incident at successive points of time is accumulated on the point i+1 of the retina. At time tb, the storage amount of light (integral of incident light), namely, the amount light accumulated along the left-most arrow-headed line on the upper portion of FIG. 5 is picked up. An image responsive to the amount of light is thus focused on the point i+1 of the retina.

Likewise, at each time point between time ta and tb, each remaining point k (k is any value among i−8 through i+8 except i+1) of the retina receives light at a predetermined level output from the liquid crystal at a position corresponding to the point k, and successively accumulates received light. At time tb, the amount of light shown on the lower portion of FIG. 5 (the integral of the incident light) is captured at each point k of the retina. An image responsive to the amount of captured light is thus focused on each point k of the retina.

As shown in the lower portion of FIG. 5, at time tb, the amount of captured light is not constant but is gradually reduced within a range of points i through i+8 in response to locations of eight pixels from liquid crystals n+1 through n+8. In response to the amount of light, the image formed within the range of the retina from points i through i+8 becomes blurred as if the image gradually varies from the pixel value E to the pixel value B. A motion blur occurs within the range of the retina from points i through i+8.

To compensate for a lack of amount of light captured within the retinal range of points i through i+4 in response to the output from the location of four pixels of liquid crystals n+1 through n+4 (where the actual step edge of FIG. 4 is present) at time tb, the voltage level applied to each liquid crystal may be heightened (the target level of each liquid crystal is further heightened). In contrast to FIG. 5, FIG. 6 illustrates a resulting image in such a case.

Referring to FIG. 6, the overdrive method is also in operation as in FIG. 5. However, FIG. 6 illustrates the relationship between a hold display and an after-image in the liquid-crystal display device that displays the step edge with a voltage higher in level than in FIG. 5 (with the target level corrected to be even higher).

As shown in the upper portion of FIG. 6, the frame or the field (immediately prior to the display target frame or the display target field) containing the step edge of FIG. 3 is displayed on the liquid-crystal display device immediately prior to time ta. At time ta, the liquid-crystal display device is commanded to display the display target frame or the display target field containing the edge frame or field of FIG. 4.

Each of the liquid crystals (pixels) n−7 through n−4 outputs light at a level corresponding to the pixel value E at time ta. The liquid-crystal display device applies a voltage at a level corresponding to the pixel value E to each of the liquid crystals n−7 through n−4 at time ta thereafter. Each of the liquid crystals n−7 through n−4 continuously holds the output level thereof at a level corresponding to the pixel value E.

Each of the liquid crystals (pixels) n−3 through n outputs light at a level higher than a level corresponding to the pixel value E at time ta. The liquid-crystal display device applies a voltage at a level corresponding to the pixel value E to each of the liquid crystals n−3 through n at time ta thereafter. The output of each of the liquid crystals n−3 through n gradually drops. Each of the liquid crystals n−3 through n drops down to the level corresponding to the pixel value E, and maintains the same level.

In contrast, each of the liquid crystals (pixels) n+1 through n+4 outputs light at a level corresponding to the pixel value B at time ta. The liquid-crystal display device supplies each of the liquid crystals n+1 through n+4 with a voltage at a level higher than the level of the pixel E (at a level even higher than in FIG. 5) at time immediately subsequent to time ta. From a period of time immediately subsequent to time ta to time tb at which the liquid-crystal display device is commanded to display a next frame or a next field (during the frame time T of the display target frame or frame field T of the display target field), the output level of each of the liquid crystals n+1 through n+4 approaches the level corresponding to the pixel value E from the level corresponding to the pixel level B (at a rate faster than in FIG. 5), reaches a level corresponding to the pixel E prior to time tb, and then further continuously rises until time tb.

Since the user continuously views the step edge displayed on the liquid-crystal display device with the retinal afterimage from before time ta, the user continuously views the step edge in accordance with the arrow in the upper portion of FIG. 6 (in step with the movement of the step edge) even during the period of time from time ta at which the liquid-crystal display device is commanded to display the display target frame or the display target field to time tb at which the liquid-crystal display device is commanded to display the next frame or the next field (namely, during the frame time T of the display target frame or the field time T of the display target field).

At each time point between time ta and time tb, each of the points i−8 through i+8 of the retina of the human user successively accumulates light at a predetermined level output from the corresponding location of the liquid crystal. As a result, at time tb, the storage amount of light (integral of incident light) shown in the lower portion of FIG. 6 is captured at each of the points i−8 through i+8 of the retina. An image responsive to the amount of captured light is focused on each of the points i−8 through i+8 of the retina.

A comparison of the lower portion of FIG. 5 with the lower portion of FIG. 6 shows that the slope of the curve representing the amount of light shown in FIG. 6 is steeper than in FIG. 5 within a range of points i through i+8 on the retina corresponding to locations of eight pixels of n+1 through n+8. The step edge becomes more sharply focused on the retina of the human than in FIG. 5.

As already discussed with reference to FIG. 6, the output level of each liquid crystal is sometimes higher than the level corresponding to the pixel value E of the step edge. As a result, at points i−4 through i+4 corresponding to the liquid crystals n−3 through n+4, the amount of actually captured light becomes larger than the amount of light (equal to the amount of light captured at the points i−8 through i−4 of the retina corresponding to the locations of liquid crystals n−7 through n−4) that should be captured.

More specifically, an image responsive to a pixel value higher than the pixel value E is formed within a range of points i−4 through i+4 of the retina (a whitened image is displayed). Such an image is far from a solution to the motion blur. The image formed within the range of points i−4 through i+4 of the retina may be considered a sort of blurred image. If considered so, the range of motion blur extends to the range of points i−4 through i+8 of the retina corresponding to the locations of 12 pixels of liquid crystals n−3 through n+8.

Since the human eyes have the retinal after-image characteristic, the motion blur is not eliminated even if all pixel values of the liquid crystals (pixels) corresponding to the moving object (namely, the level of the voltage applied to each of the liquid crystals) are corrected, in other words, even if only the response speed of the output level of the liquid crystal is improved.

The inventors of this invention have developed a video processing apparatus that processes video taking into consideration not only the slow response of the liquid crystal but also the after-image that has not been accounted for in the known overdrive method. Such a video processing apparatus may be carried out in various embodiments, a specific example being the structure shown in FIG. 7.

Figure 7:
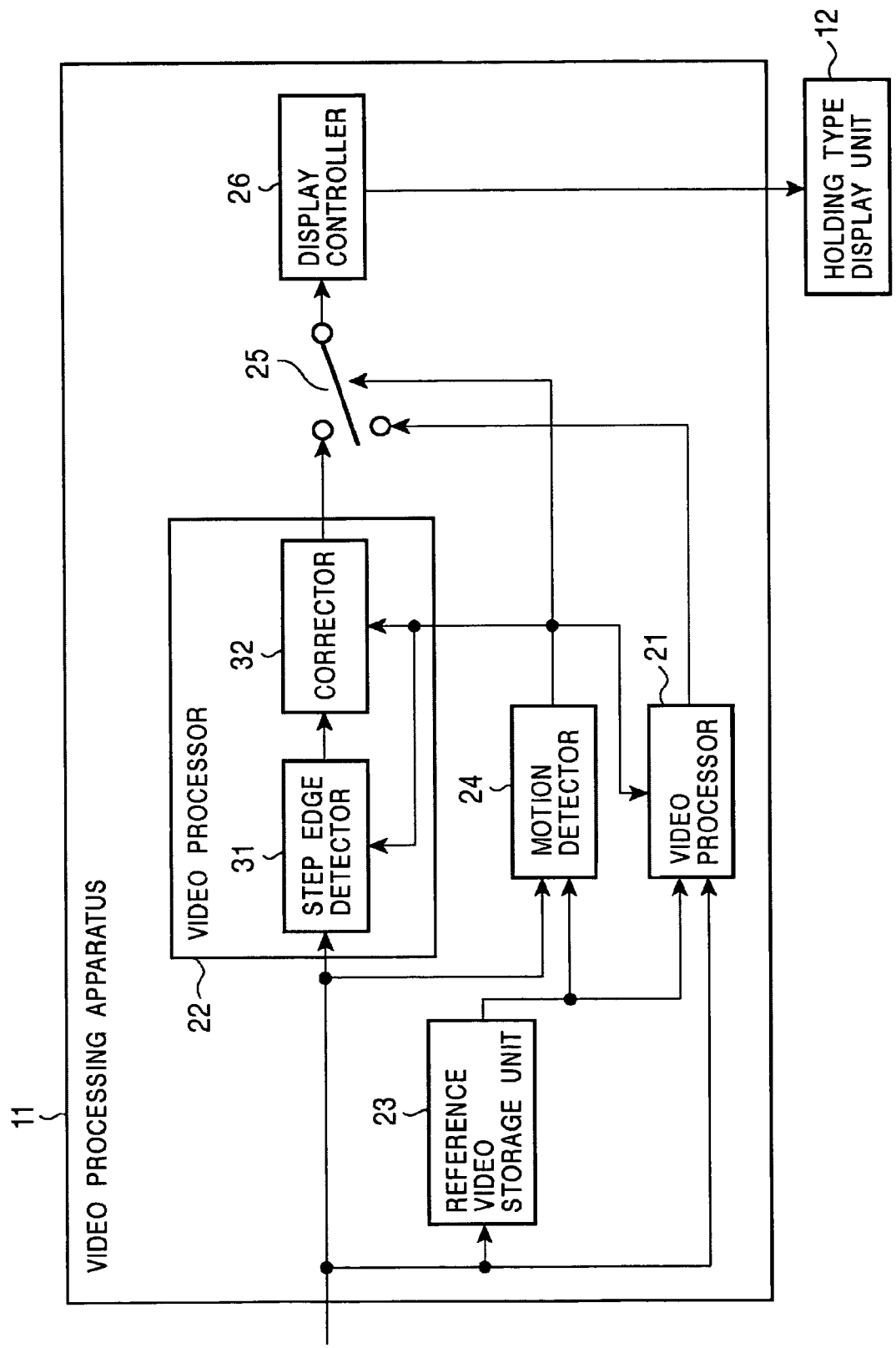
FIG. 7 is a block diagram illustrating the structure of a video processing apparatus in accordance with one preferred embodiment of the present invention.

FIG. 7 illustrates the structure of the video processing apparatus in accordance with one preferred embodiment of the present invention.

As shown, a video processing apparatus 11 controls a holding type display unit 12 as a liquid-crystal display device in the displaying of a moving picture. The video processing apparatus 11 commands the holding type display unit 12 to successively display a plurality of frames or fields forming a moving picture. As previously discussed, the holding type display unit 12 displays display elements (not shown) corresponding to a plurality of pixels forming a first frame or field for a predetermined period of time from when the holding type display unit 12 is commanded to display the first frame or field. The holding type display unit 12 holds display on at least part of the display elements. In other words, at least part of the display elements maintains a hold display for a predetermined period of time.

The holding type display unit 12 causes the display elements (not shown) corresponding to all pixels forming the first frame or field to display a video from when the holding type display unit 12 is commanded to display the first frame or field until when the holding type display unit 12 is commanded to display the second frame or field. All display elements thus hold display.

More specifically, the video processing apparatus 11 successively receives video data of a plurality of frames or fields forming a moving picture. In other words, the video processing apparatus 11 receives the video data of the display target frame or field (for example, pixel values of all pixels forming the display target frame or field). The video data of the display target frame or field is input to each of a video processor 21, a video processor 22, a reference video storage unit 23, and a motion detector 24.

The video processor 21 performs a predetermined video process on the video data of the input display target frame or field on a per pixel basis, and outputs the processed video data to a switch 25. More specifically, the video processor 21 corrects the pixel values of the pixels by performing the predetermined video process on each of a plurality of pixels forming the display target frame or field, and successively outputs the corrected pixel values to the switch 25 in a predetermined order.

The video process performed by the video processor 21 is not limited to any particular one. As shown in FIG. 7, the video processor 21 receives a reference video (a frame or field immediately prior to the display target frame or field) output from the reference video storage unit 23, and results of motion detection provided by the motion detector 24 to be discussed later. The video processor 21 may use both the reference video and the motion detection result, one of both, or neither of both. For example, the video processor 21 may have a predetermined rule table (not shown), and may perform the video process to correct the pixel values of the pixels forming the display target frame or field.

The video processor 21 is not an element essential to the video processing apparatus 11, and may be dispensed with. Without the video processor 21, the video data of the display target frame or field is input to each of the video processor 22, the reference video storage unit 23, the motion detector 24, and the switch 25.

The video processor 22 corrects the pixel values of the pixels at the edge portion of a moving object (the moving object is the one shifted from the location thereof in the frame or field immediately prior to the display target frame or field) detected by the motion detector 24 from the input display target frame or field, and outputs the corrected pixel values to the switch 25.

As will be discussed later, the video processor 22 may capture an image corresponding to a real thing as an object, and may perform the video process on the captured object. The video processor 22 here captures the step edge of FIG. 3 or FIG. 4 as one object, and performs the above video process on a per step edge basis.

In FIG. 7, the video processor 22 is made up of a step edge detector 31 and a corrector 32. However, the embodiment is not restricted to the arrangement shown in FIG. 7; rather, various embodiments may be made. More specifically, for example, the video processor 22 may be configured such as shown in FIG. 14 or FIG. 23 described later.

However, these preferred embodiments of the video processor 22 (description of the preferred embodiments shown in FIG. 7, FIG. 14, and FIG. 23) will be discussed in detail later.

The reference video storage unit 23 stores the video data of the input display target frame or field as the video data of the reference video for a frame or field subsequent to the display target frame or field. When the video data of a new frame or field is input as the video data of the display target frame or field, the reference video storage unit 23 thus stores the new video data. The reference video storage unit 23 continuously stores the video data of the frame or field (which was the display target frame or field immediately before the newly entered display target frame or field) as the video data of the reference video for the newly entered display target frame or field.

When the video data of the display target frame or field is input, the motion detector 24 acquires the video data of the reference video (of the frame or field immediately prior to the display target frame or field) stored in the reference video storage unit 23. The motion detector 24 detects, on a per pixel basis, a moving object (with the location thereof shifted from the location thereof in the reference video) by comparing the video data of the display target frame or field with the video data of the reference video frame. The motion detector 24 further detects, on a per pixel basis, the spatial amount of motion of the object. Here, the amount of motion contains information relating to the direction of motion, and may be represented by plus or minus information.

The motion detector 24 detects motion in the video by comparing the moving object in the input video data with the moving object in the reference video output from the reference video storage unit 23.

The motion detector 24 can separately detect an object moving in a spatial direction X and a spatial direction Y. In the discussion that follows, the object moving in the spatial direction X only is detected.

The motion detector 24 detects, by pixel, the object that has moved in the spatial direction X. The motion detector 24 determines whether a pixel of interest to be processed (hereinafter referred to as a target pixel) from among a plurality of pixels forming the display target frame or field is a pixel of the object that has moved in the spatial direction X.

If the motion detector 24 determines that the target pixel is not the pixel of the object that has moved in the spatial direction X, the motion detector 24 notifies the switch 25 (and the video processor 21 as necessary) of the result of determination. As will be discussed later, the switch 25 switches the input thereof to the video processor 21.

If the motion detector 24 determines that the target pixel is the pixel of the object that has moved in the spatial direction X, the motion detector 24 notifies the step edge detector 31, the corrector 32, and the switch 25 (and the video processor 21 as necessary) of the result of determination. The switch 25 switches the input thereof to the video processor 22 (the corrector 32), as will be discussed later. The motion detector 24 further detects the spatial amount of motion of the object corresponding to the target pixel (between frames or fields), and supplies the step edge detector 31 and the corrector 32 with the spatial amount of motion.

As previously discussed, the switch 25 switches the input thereof in response to the determination result of the motion detector 24.

If the motion detector 24 determines that the target pixel is not a pixel corresponding to the moving object (here, a step edge), the switch 25 switches the input thereof to the video processor 21 to supply the display controller 26 with data (pixel value) of the target pixel from the video processor 21.

If the motion detector 24 determines that the target pixel is a pixel corresponding to the moving object (here, a step edge), the switch 25 switches the input thereof to the corrector 32 in the video processor 22 to supply the display controller 26 with data (pixel value) of the target pixel from the corrector 32.

The display controller 26 converts the data (pixel value) of each pixel forming the display target frame or field successively supplied from the switch 25 to a signal in a predetermined format as a target level of corresponding element, and outputs the signal to the holding type display unit 12. By performing this process, the display controller 26 commands the holding type display unit 12 to display the display target frame or field.

The video processor 22 in FIG. 7 will now be discussed in detail.

The video processor 22 includes the step edge detector 31 and the corrector 32 in FIG. 7.

The step edge detector 31 detects the edge portion from the moving object detected by the motion detector 24, from the video data of the input display target frame or field, and supplies the corrector 32 with the results of detection.

More specifically, if an image of a real thing with color or density thereof changing in gradation is present in the display target frame or field, the step edge detector 31 captures the image of the real thing as an object, and detects the edge of the captured object.

The step edge detector 31 generates a function representing a change in the pixel value in the direction of motion of the object (in the spatial direction X), and calculates the first derivative of the function at each pixel. The first derivative of a predetermined pixel thus calculated shows the degree of difference between the pixel value of one pixel and the pixel value of another pixel adjacent to the one pixel. The step edge detector 31 thus detects a pixel having a first derivative (not zero) as a pixel corresponding to the edge portion of the object.

The generation of the function and the calculation of the first derivative of the function are too heavy for the step edge detector 31 to perform. As previously discussed, the step edge detector 31 captures the step edge as an object, and decomposes the video data of the input display target frame or field into a set of video data of a plurality of step edges formed in the spatial direction X, detects the edge portion of each of the plurality of step edges, and supplies the corrector 32 with the results of detection.

Figure 8:
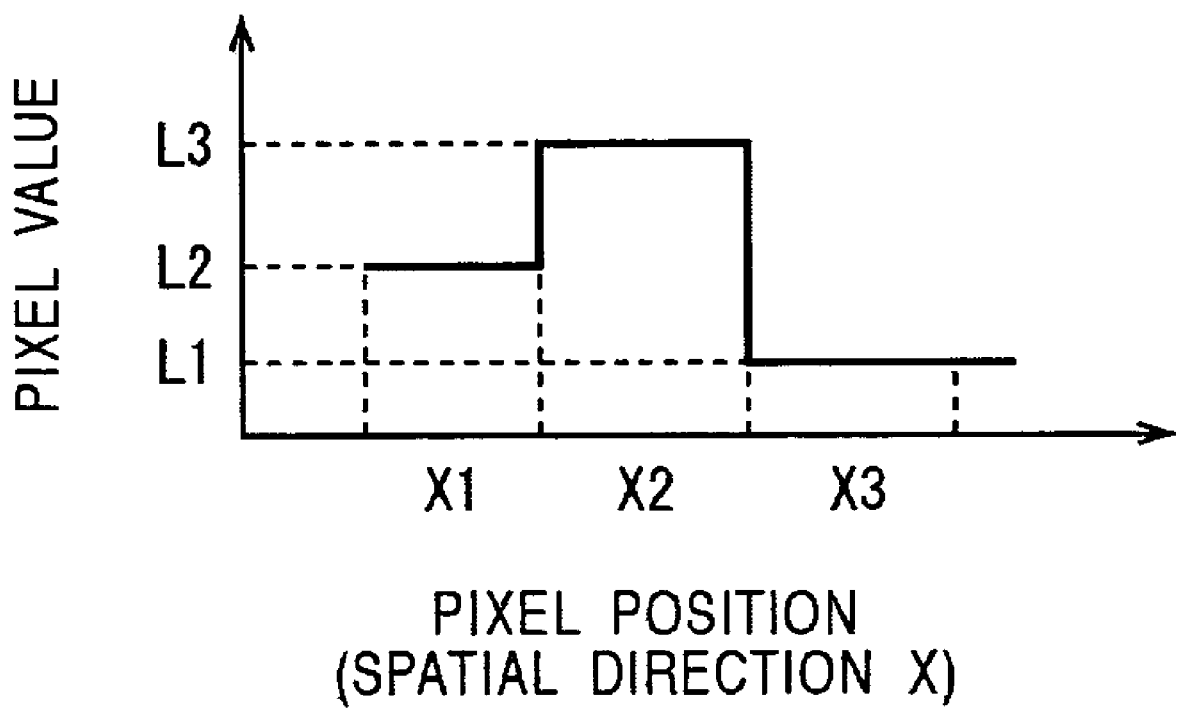
FIG. 8 illustrates a predetermined portion of video data input to the video processing apparatus of FIG. 7.

It is now assumed that the video data of FIG. 8 is contained in the display target frame or field. As shown in FIG. 8, the horizontal axis represents a pixel position (in the spatial direction X), and the vertical axis represents a pixel value. The video data of FIG. 8 thus contains a pixel value L2 at a pixel X1, a pixel value L3 at a pixel X2, and a pixel value L1 at a pixel X3.

Figure 9:
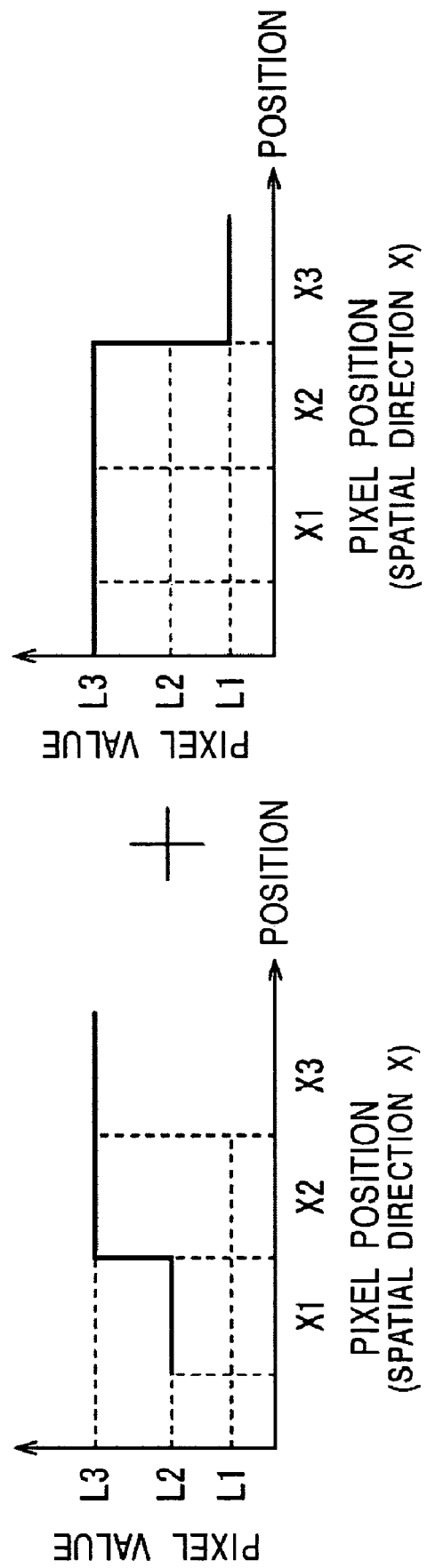
FIG. 9 illustrates video data containing two step edges decomposed from the video data of FIG. 8.

The step edge detector 31 decomposes the video data of FIG. 8 into two step edges, namely, a step edge in the left portion of FIG. 9 (present between the pixel value L2 at the pixel X1 and the pixel value L3 at the pixel X2 thereafter) and a step edge in the right portion of FIG. 9 (present between the pixel value L3 through to the pixel X2 and the pixel value L1 at the pixel X3 thereafter). The step edge detector 31 thus detects each of the two step edges of FIG. 9.

The step edge is composed of a group of pixels having a first pixel value (a first pixel group lined in the spatial direction X) and a group of pixels having a second pixel value (a second pixel group lined in the spatial direction X). The step edge detector 31 finds a pixel different in pixel value from a pixel adjacent thereto, and detects the edge portion of the step edge by determining that the location of that pixel corresponds to the edge portion of the step edge.

Like the motion detector 24, the step edge detector 31 regards, as a target pixel, a predetermined one of a plurality of pixels forming the display target frame or field, and detects the step edge by target pixel by target pixel. The step edge detector 31 detects the edge portion of the step edge by calculating a difference between the pixel value of a target pixel and the pixel value of a predetermined pixel adjacent to the target pixel (in the spatial direction X).

The step edge detector 31 calculates the difference between the pixel value of the target pixel and the pixel value of the adjacent pixel. If a difference results, in other words, if the result (difference) is not zero, the target pixel is detected as being a pixel corresponding to the edge portion of the step edge.

Returning to FIG. 7, the step edge detector 31 supplies the corrector 32 with the pixel value of the target pixel and the calculated value (the difference between the pixel value of the target pixel and the pixel value of the adjacent pixel).

The pixel with respect to which the difference is calculated may be any one of the two pixels adjacent to the target pixel (in the spatial direction X). Since the motion detector 24 supplies the step edge detector 31 with the amount of motion of the object in the spatial direction X (the amount of motion information containing the direction of motion represented in plus or minus information), the pixel with respect to which the difference is calculated may be a pixel present in the direction of movement of the step edge or in the opposite direction of movement of the step edge.

The corrector 32 corrects the pixel value of the target pixel corresponding to the edge portion of the step edge detected by the step edge detector 31, based on the spatial amount of motion of the step edge of the target pixel (in the spatial direction X), and the height of the step edge (the difference at the edge portion of the step edge between the pixel value of the target pixel and the pixel value of the pixel adjacent to the target pixel).

The corrector 32 receives the pixel value of the target pixel and the difference thereof from the step edge detector 31, and the spatial amount of motion of the step edge of the target pixel (in the spatial direction X) from the motion detector 24. If the supplied difference is not zero, and the supplied amount of motion is not zero, the corrector 32 determines that the target pixel is the pixel corresponding to the edge portion of the moving step edge. Based on the supplied difference and amount of motion, the corrector 32 corrects the pixel value of the target pixel.

The present invention is not limited to any particular correction method. It is important that the pixel value is corrected based on the amount of motion of the step edge. The following correction method may be used.

Figure 10:
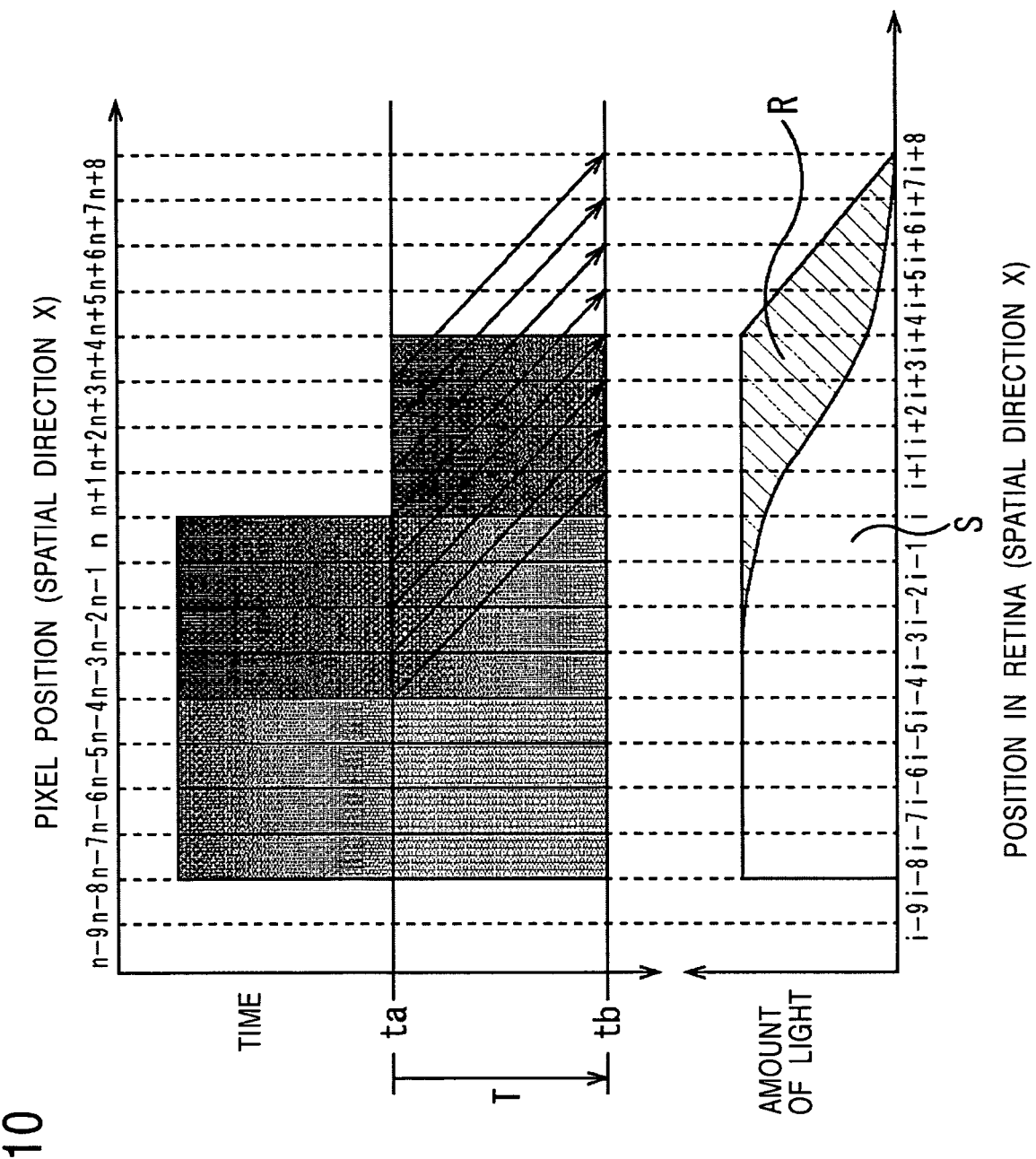
FIG. 10 explains a correction method of a corrector in the video processing apparatus and illustrates the relationship between a retinal after-image and a motion blur in a holding type display device of FIG. 7 with the step edge of FIG. 4 displayed.

FIG. 10 illustrates a correction method of the pixel value in accordance with one preferred embodiment of the present invention. FIG. 10 illustrates the relationship between a hold display of liquid crystals (pixels) forming the screen of a liquid-crystal display device (one embodiment of the holding type display unit 12 of FIG. 7) and the after-image in the normal operation (such as in the known overdrive method or in the operation not using any of techniques of the preferred embodiments of the present invention to be discussed later).

As shown in the upper portion of FIG. 10, a change occurs in the output level of the liquid crystal corresponding to the location of the step edge with respect to time with the step edge of FIG. 4 appearing on the liquid-crystal display device as FIGS. 5 and 6. Like in FIGS. 5 and 6, the amount of light picked up by the retina of the user is shown in the lower portion of FIG. 10 when the user views the step edge of FIG. 4 displayed on the liquid-crystal display device.

For example, the frame or field (namely, the frame or field immediately prior to the display target frame or field) containing the step edge of FIG. 3 was displayed on the liquid-crystal display device immediately prior to time ta as shown in the upper portion of FIG. 10, and at time ta, the liquid-crystal display device is commanded to display the display target frame or field containing the step edge of FIG. 4.

The liquid-crystal display device supplies each of the liquid crystals (pixels) n−7 through n+4 with a voltage at a level corresponding to the pixel value E from time ta thereafter. The output level of the liquid crystals n−7 through n+4 changes as shown in the upper portion of FIG. 10.

The user has tracked the step edge, viewing the step edge displayed on the liquid-crystal display device as the after-image from before time ta. The user thus continuously views the step edge in accordance with the arrow-headed lines shown on the upper portion of FIG. 10 (in step with the motion of the step edge) during a period of time from time ta at which the liquid-crystal display device is commanded to display the display target frame or the display target field to time tb at which the liquid-crystal display device is commanded to display the next frame or the next field (namely, during the frame time T of the display target frame or the field time T of the display target field).

The amount S of light shown in the lower portion of FIG. 10 is accumulated within a range of the retina from points i−8 through i+8 corresponding to an area of liquid crystals n−7 through n+8 (the actual location of the step edge of FIG. 4 and the area surrounding the step edge) is accumulated, and an image corresponding to the accumulated light thus develops. Motion blur is thus generated.

In contrast, if the amount of light S and the amount of light R are accumulated within the range of the retina from points i−8 through i+8 as shown in the lower portion of FIG. 10, the generation of the motion blur is controlled. The lacking amount of light is here designated R.

The corrector 32 corrects the amount of light, compensating for the amount R of light in the preferred embodiment of the present invention. However, if the corrector 32 uniformly corrects the amount of light for each of the pixels n+1 through n+4, the liquid-crystal display device presents the same result as the known overdrive method, thereby still suffering from motion blur. In accordance with the preferred embodiment of the present invention, the corrector 32 corrects only the pixel value of a pixel (the pixel n+4 in FIG. 10) corresponding to the edge portion of the step edge taking into consideration the after-image.

More specifically, if a command to change the pixel in level from the pixel value B to the pixel value E is issued on the assumption that time response of each of the liquid crystals is a primary delay factor of a predetermined time constant τ (in other words, the time response of all liquid crystals is always the same), the output level (in pixel value) Y(t) is represented by equation 1. Here, t represents time with the command provided to the liquid crystal being at time zero.

Equation 1

$$Y(t) = E - (E - B) \times e^{\frac{-t}{\tau}} \tag{1}$$

The lacking amount R of light shown in FIG. 10, if converted into a pixel value, is expressed by equation 2.

Equation 2

$$R = \frac{(E - B) \times e^{\frac{-T}{4 \times \tau}}}{1 - e^{\frac{-T}{4 \times \tau}}} \tag{2}$$

The corrector 32 thus corrects the pixel value of the pixel (the pixel n+4 of FIG. 10) corresponding to the edge portion of the step edge by adding the (pixel value converted) lacking amount R of light represented by equation (2), as a correction value, to the pixel value.

FIG. 11 illustrates the relationship between the hold display of each liquid crystal (pixel) forming the screen of the liquid-crystal display device and the after-image with only the pixel value of the pixel corresponding to the edge portion of the step edge corrected (namely, the preferred embodiment of the present invention applied). FIG. 11 illustrates the result of the preferred embodiment of the present invention in contrast with the results of the known techniques illustrated in FIGS. 5, 6, and 10.

As shown in the upper portion of FIG. 11, the pixel value is corrected by adding the (pixel value converted) lacking amount R of light represented by equation 2 to the pixel value of the pixel corresponding to the edge portion of the step edge. More specifically, at time point earlier than time ta by T (at time point the liquid-crystal display device is commanded to display the frame or field containing the step edge of FIG. 3), the pixel value of the pixel (liquid crystal) n is corrected. At time ta (at the moment the liquid-crystal display device is commanded to display the frame or field containing the step edge of FIG. 4), the pixel value of the pixel (liquid crystal) n+4 is corrected.

From time ta thereafter, the liquid-crystal display device (the holding type display unit 12) supplies each of the liquid crystals n−7 through n+3 with a voltage corresponding to the pixel value E as a target level. The target level for the liquid crystal n+4 is a corrected pixel value (namely, a sum of the pixel value E and the correction value R represented by equation 2). The liquid-crystal display device supplies only the liquid crystal n+4 with the corrected pixel value. The output level of the liquid crystals n−7 through n+4 changes as shown in the upper portion of FIG. 11.

The user has tracked the step edge, viewing the step edge displayed on the liquid-crystal display device as the after-image. The user thus continuously views the step edge in accordance with the arrow-headed lines shown on the upper portion of FIG. 11 (in step with the motion of the step edge) during a period of time from time ta at which the liquid-crystal display device is commanded to display the display target frame or the display target field to time tb at which the liquid-crystal display device is commanded to display the next frame or the next field (namely, during the frame time T of the display target frame or the field time T of the display target field).

More specifically, the point i+1 of the retina of the user continuously views the step edge along an arrow-headed line 41 from time ta to time tb. In the meantime, the retina point i+1 passes the liquid crystal (pixel) n that was to be corrected previous time (in the correction performed at time point earlier than time ta by period T). When passing the liquid crystal n, the lacking amount of light is picked up, and as a result, the target amount of pixel is captured at time tb.

During the period of time from ta to tb, another point k of the retina (any one of points i−8 through i+8 except i+1) similarly passes at least one of the liquid crystals to be corrected (the liquid crystals respectively corresponding to the pixels n−4, n, and n+4). When the liquid crystal is passed by the point k, a lacking amount of light (for correction) is picked up. As a result, a target amount of light is captured at time tb.

An ideal amount of light (the sum of the amount S of light and the lacking amount R of light as shown in FIG. 10) is captured within the range of the point i−8 through the point i+8 of the retina of the user as shown in the lower portion of FIG. 11. An image responsive to the amount of light is thus formed.

Referring to the lower portion of FIG. 11, the image responsive to a substantially uniform amount of light free from an overshoot is generated within range of the point i−8 through the point i+8 of the retina of the user, and the range of motion blur is limited to the point i+4 through the point i+8 of the retina corresponding to the location of the pixel n+5 to the pixel n+8. The preferred embodiment of the present invention thus controls the motion blur more than any of the known cases (shown in FIGS. 5, 6, and 10).

In the above discussion, the pixel value is corrected when the step edge moves at a rate of 4 pixels/frame or 4 pixels/field in the spatial direction X. Even if the step edge moves at a different rate, the corrector 32 corrects the pixel value of the pixel corresponding to the edge portion of the step edge in the same way as discussed above, thereby controlling the motion blur.

If the amount of motion is changed from 4 pixels/frame or 4 pixels/field to an amount of motion of v pixels/frame or v pixels/field in equation 2, the correction value R is expressed by equation 3.

Equation 3

$$R = \frac{(E-B) \times e^{\frac{-T}{v \times \tau}}}{1 - e^{\frac{-T}{v \times \tau}}} \quad (3)$$

If the step edge moves at a uniform velocity, the amount of motion v between frames or fields expresses a motion speed. If the step edge moves at a uniform velocity between frames or fields, the amount of motion v of the step edge between frames or fields is a motion velocity v of the step edge between frames or fields.

In the above example, description has been made regarding the step edge in FIG. 4 as an example, and accordingly, the target pixel is a pixel n+4, and consequently, the pixel value of the target pixel n+4 is E; on the other hand, the pixel value of the pixel (a pixel n+5 not shown in FIG. 4) adjacent to the target pixel in the spatial direction X is B. However, the pixel values of the target pixel and the pixel adjacent to the target pixel are not restricted to these values, rather, various values may be adopted. Accordingly, if it is assumed that the pixel value of the target pixel is Nr, and the pixel value of the pixel adjacent to the target pixel in the spatial direction X is Nrn, the above equation 3 becomes a further generalized equation such as the following equation 4.

Equation 4

$$R = (Nr - Nrn) \frac{e^{\frac{-T}{v \times \tau}}}{1 - e^{\frac{-T}{v \times \tau}}} \quad (4)$$

In equation 4, if the target pixel is not a pixel at the edge portion of the step edge, the difference value Nr−Nrn becomes zero, and consequently, the correction value R also becomes zero. For example, in equation 4, if the target pixel is a pixel n, both Nr−Nrn and E−E become zero. Thus, equation 4 is conceived as a generalized correction equation that can be applied to all pixels, including zero correction (prohibition of correction).

Returning to FIG. 7, the motion detector 24 supplies the corrector 32 with the amount of motion v of the step edge corresponding to the target pixel, as described above. The step edge detector 31 supplies the corrector 32 with the pixel value Nr of the target pixel (the pixel value E in a case that the target pixel is the pixel n+4 in FIG. 4) and the difference value Nr−Nrn (the difference value E−B in a case that the target pixel is the pixel n+4 in FIG. 4). Accordingly, for example, the corrector 32 substitutes the supplied amount of motion v, the pixel value Nr of the target pixel, and the difference value Nr−Nrn for in equation 4 (equation 3 in a case that the target pixel is the pixel n+4 in FIG. 4), and determines the correction value R by calculating the right-hand side of equation 4. The corrector 32 updates the pixel value of the target pixel with the pixel value Nr+R (the pixel value E+R in a case that the target pixel is the pixel n+4 in FIG. 4), and supplies the display controller 26 with the pixel value Nr+R through the switch 25.

As described above, the display controller 26 addresses the pixel values of a plurality of pixels forming a display target frame or field to the holding type display unit 12, including the corrected pixel value Nr+R (the pixel value E+R in a case that the target pixel is the pixel n+4 in FIG. 4), serving as target levels corresponding to display elements of the holding type display unit 12. The display controller 26 thus commands the holding type display unit 12 to display the display target frame or field.

Note that it has been assumed here that the time constant τ in the above equations 1 through 4 is uniform for facilitation of explanation, however, in practice, the time constant τ differs.

More specifically, as a command toward the target liquid crystal corresponding to the target pixel (the target display element of the holding type display unit 12 of FIG. 7), if a command for changing from the original pixel value Nrn (hereafter, this is referred to as the old pixel value Nrn as well) to the pixel value Nr (hereafter, this is referred to as the target pixel value Nr or the new pixel value Nr as well) is given, i.e., if the input voltage of the target liquid crystal changes from the voltage level corresponding to the old pixel value Nrn to the voltage level corresponding to the new pixel value Nr, the time required for the intensity of output light of the target liquid crystal to change from the intensity of light corresponding to the old pixel value Nrn to the intensity of light corresponding to the new pixel value Nr, i.e., the response time (response speed) of the target liquid crystal differs depending on the values of the old pixel value Nr−1 and the new pixel value Nr. Accordingly, it is needless to say that the time constant τ of the target liquid crystal differs depending on the values of the old pixel value Nr−1 and the new pixel value Nr.

Figure 18:
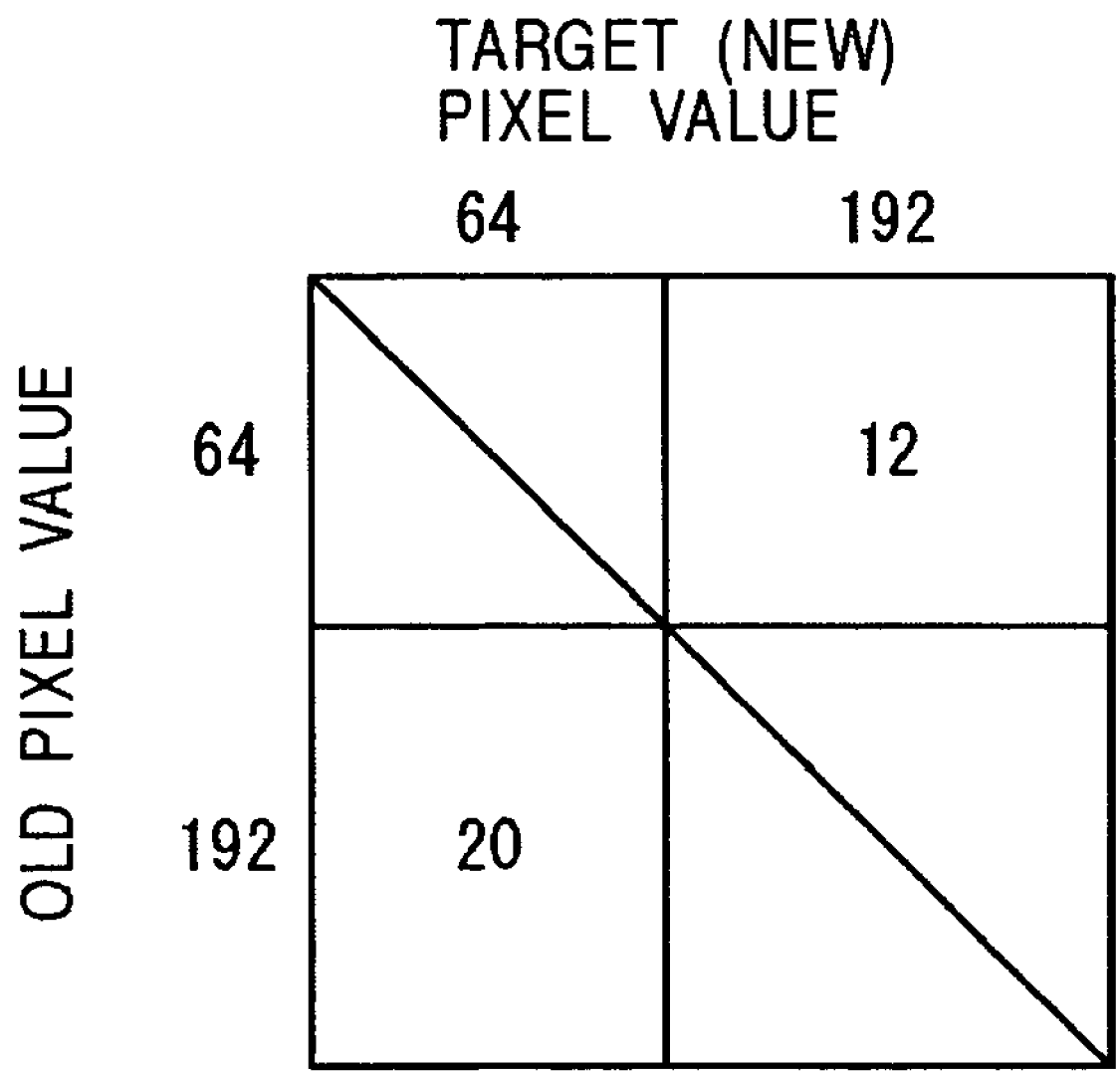
FIG. 18 illustrates a panel table of the holding type display device of FIG. 7.

Accordingly, in the event that it is necessary to perform more precise correction, taking the difference of the time constant τ into consideration, a table (for example, a later-described table such as shown in FIG. 18, hereafter, referred to as a panel table) on which the response speed of liquid crystal corresponding to the values of the old pixel value Nr−1 and the new pixel value Nr is described should be retained by the corrector 32, and the like. Thus, the corrector 32 identifies the time constant τ with reference to the panel table, substitutes the above-described amount of motion v, pixel value Nr of the target pixel, and difference value Nr−Nrn as well as the time constant τ in equation 4 so as to calculate the right-hand side of equation 4, whereby the correction value R can be calculated more precisely. The corrector 32 then updates the pixel value of the target pixel with the pixel value Nr+R, and supplies the display controller 26 with the updated pixel value through the switch 25.

Description has been made regarding an example of the correction method of the pixel value of the target pixel.

Note that the correction method of the pixel value of the target pixel is not restricted to the above-described example, rather, various methods may be adopted.

Hereafter, description will be made regarding other examples of the correction method of the pixel of the target pixel.

Assuming that the time constant τ is uniform as with the above example, the correction value R of equation 4 is expressed such as in the following equation 5.

Equation 5

$$R = (Nr - Nrn) \times C \times v \qquad (5)$$

Note that C represents a predetermined fixed value (the proportional coefficient of v) in equation 5.

Regarding the portion C×v in the right-hand side of equation 5 as a gain depending on (proportionate to) the amount of motion (speed) v, represented by G, equation 6 is expressed as the following equation 7.

Equation 7

$$R = (Nr - Nrn) \times G \qquad (6)$$

Accordingly, instead of the video processor 22 in FIG. 7, the video processor 22 which provides a high-pass filter process equivalent to calculating the following equation 7, i.e., the video processor 22 configured as an asymmetric high-pass filter may be adopted.

Equation 7

$$Nr' = Nr + R = Nr + (Nr - Nrn) \times G \qquad (7)$$

Nr' represents the output value of this asymmetric high-pass filter, i.e., the corrected pixel value of the target pixel in equation 7.

Note that the asymmetric high-pass filter means such as the following filter.

In the video process, if a block (hereafter, referred to as the target block (Nr, Nrn)) made up of the pixel value Nr of the target pixel and the pixel value Nrn of the pixel adjacent to the target pixel (in this case, in the spatial direction X) is subjected to generalized high-pass filtering, this target block (Nr, Nrn) is updated such as a block (Nr+ΔN, Nrn−ΔN). Note that ΔN represents the amount of correction (value). Such a filter for subjecting the two pixel values Nr and Nrn to a high-pass filtering process, i.e., a generalized high-pass filter for subjecting the two pixel values Nr and Nrn to a filtering process such that the amount of correction ΔN is line-symmetric over the border between the two pixels is referred to as a symmetric high-pass filter in the present specification. Examples of the symmetric high-pass filter include a filter (hereafter, referred to simply as sharpness) for adding so-called sharpness effects to a video (so-called picture formation).

On the other hand, a filter for outputting a block (Nr+ΔN, Nrn) or a block (Nr, Nrn−ΔN) as the result of a filtering process if the target block (Nr, Nrn) is input, i.e., a filter for subjecting only one of the two pixel values Nr and Nrn to a high-pass filtering process is referred to as an asymmetric high-pass filter in the present specification.

Figure 12:
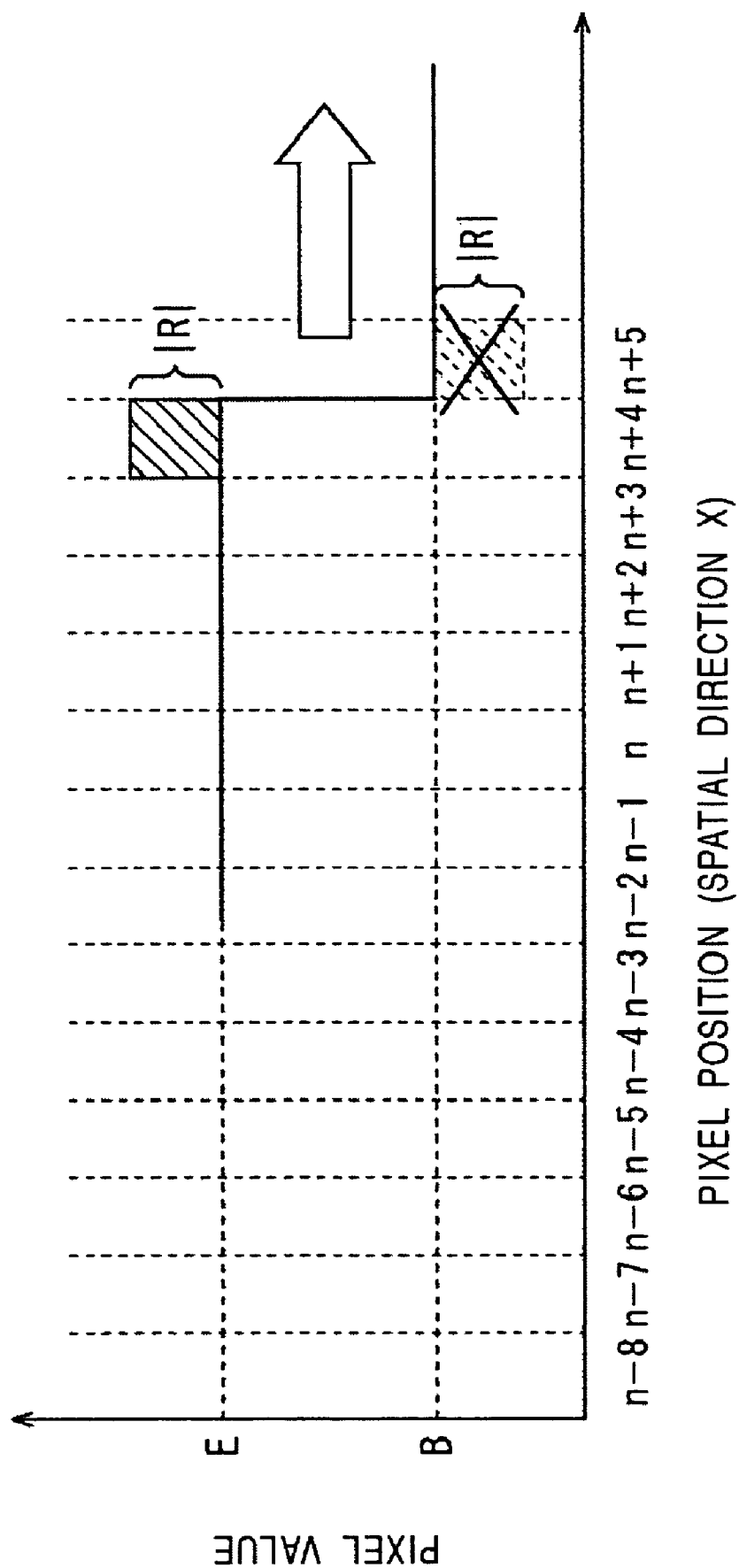
FIG. 12 illustrates the relationship between the direction of motion of a step edge and a pixel to be corrected.

More specifically, for example, it is assumed that a pixel n+4 is the target pixel in FIG. 12 on which the same step edge as that in FIG. 4 is drawn. In this case, the pixel value Nr of the target pixel n+4 is equal to E, the pixel value Nrn of the pixel n+5 adjacent to the target pixel n+4 in the spatial direction X is equal to B.

In this case, if the two pixel values Nr and Nrn are subjected to sharpness that is a symmetric high-pass filtering such that the amount of correction ΔN becomes a value R equivalent to the result of the above equation 6, the pixel value Nr of the target pixel n+4 is updated (corrected) from the pixel value E to the pixel value E+R, and the pixel value Nrn of the pixel n+5 adjacent to the target pixel n+4 is updated from the pixel value B to the pixel value B−R. As mentioned above, if so-called picture formation is an object, there is no problem even if sharpness is used, whereby the object can be achieved.

However, if the object of the present invention, i.e., correction for suppressing motion blur is an object, there is no need to correct the pixel value Nrn of the pixel n+5 adjacent to the target pixel n+4 (the pixel value B does not need to be changed), and the object cannot be achieved even if sharpness is used.

To achieve the object of the present invention, i.e., correction for suppressing motion blur, as shown in FIG. 12, it is preferable to use an asymmetric high-pass filter such that only the pixel value Nr of the target pixel can be updated from the pixel value E to the pixel value E+R (namely, the pixel value Nr' following correction of the left-hand side of equation 7).

As shown in FIG. 12, description has been made wherein the direction of motion of the step edge is the spatial direction X, and accordingly, the pixel to be corrected is the pixel n+4 of the two pixels n+4 and n+5 forming the edge portion of the step edge.

Figure 13:
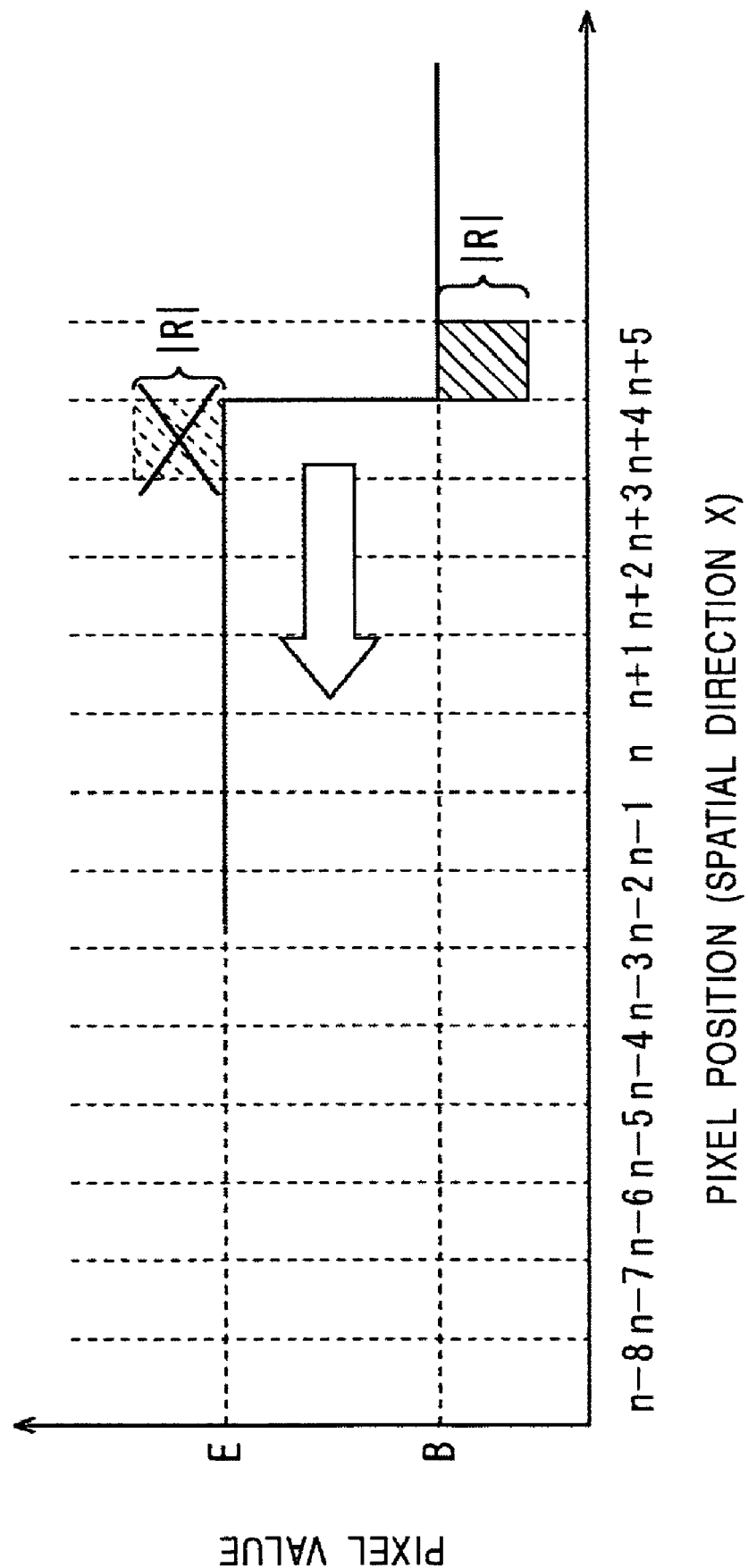
FIG. 13 illustrates the relationship between the direction of motion of a step edge and a pixel to be corrected.

In contrast, as shown in FIG. 13, if the direction of motion of the step edge is the direction opposite to the spatial direction X, the pixel to be corrected needs to be the pixel n+5 of the two pixels n+4 and n+5 forming the edge portion of the step edge.

In this case, the pixel value B of the pixel n+5 is updated to a pixel value B' such as shown in the following equation 8.

Equation 8

$$B'=B-R=B-(E-B)\times G \quad (8)$$

Generalizing the above description, consequently, if the direction of motion of the step edge corresponding to the target block (Nr, Nrn) is positive, i.e., the spatial direction X, only the pixel value Nr of the target pixel is updated to a pixel value Nr' in accordance with equation 7.

In contrast, if the direction of motion of the step edge corresponding to the target block (Nr, Nrn) is negative, i.e., the direction opposite to the spatial direction X, only the pixel value Nrn of the pixel adjacent to the target pixel in the spatial direction X is updated to a pixel value Nrn' in accordance with the following equation 9.

Equation 9

$$Nrn'=Nrn-(Nr-Nrn)\times G \quad (9)$$

As mentioned above, one of the pixel values of the target pixel and the pixel adjacent to the target pixel in the spatial direction X at the edge portion of the step edge is updated depending on the direction of motion of the step edge. Therefore, the following description will be made on the assumption that the edge portion of the step edge formed in the spatial direction X expresses not a single target pixel as mentioned above but a pair (block) of two pixels consecutively lined in the spatial direction X each of which has a different pixel value.

More specifically, in the following description, not the single pixel value Nr of the target pixel but a pair of the pixel value Nr and the pixel value Nrn of the pixel adjacent to the target pixel in the spatial direction X (or in the direction opposite to the spatial direction X), i.e., the above-mentioned target block (Nr, Nrn) will be treated as a unit. In this case, it is necessary to determine whether the input target block (Nr, Nrn) is output as an updated target block (Nr', Nrn) or as an updated target block (Nr, Nrn') depending on the direction of motion of the step edge. Namely, it is necessary to switch which of the target block (Nr, Nrn) is corrected, the pixel value Nr or the pixel value Nrn. In the present embodiment, as shown in later discussed FIGS. 15 and 16, a filter coefficient is used to be switched depending on the direction of motion of the step edge. Description will be made later regarding the switching of this filter coefficient in detail, and so forth.

As is evident from the above description, the video processor 22 for performing a high-pass filtering process equivalent to calculating equation 7 or equation 9, i.e., the video processor 22 configured as an asymmetric high-pass filter may be adopted instead of the video processor 22 having the configuration in FIG. 7.

For example, the video processor 22 may be configured as an asymmetric high-pass filter such as shown in FIG. 14. FIG. 14 illustrates a configuration example of the video processor 22 which is configured as an asymmetric high-pass filter.

More specifically, the video processor (asymmetric high-pass filter) 22 in FIG. 14 is made up of a switch 61, an asymmetric coefficient filter 62, an asymmetric coefficient filter 63, a coefficient selecting unit 64, a gain G decision unit 65, a multiplier 66, and an adder 67.

As shown in FIG. 14, the video data of an input video is input to the video processor 22 on a per the target block (Nr, Nrn) basis. More specifically, the target block (Nr, Nrn) is supplied to the switch 61 and the adder 67.

The switch 61 switches the output destination to one of the asymmetric coefficient filter 62 side and the asymmetric coefficient filter 63 side under control of the coefficient selecting unit 64.

Figure 15:
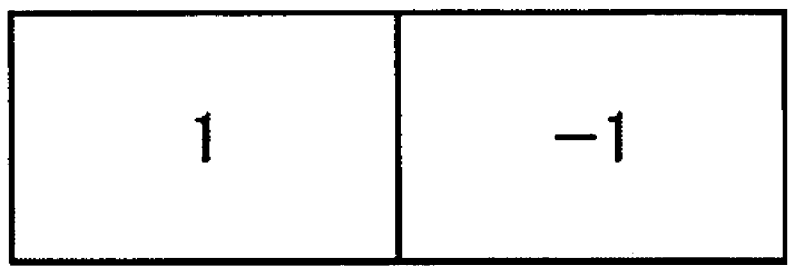
FIG. 15 illustrates a filter coefficient used by the video processor of FIG. 14.

The asymmetric coefficient filter 62 retains a filter coefficient (weighted value) such as shown in FIG. 15 for example, and subjects the input target block (Nr, Nrn) to an asymmetric filtering process, using this filter coefficient.

Note that in FIG. 15, the "1" within the square to the left indicates a filter coefficient corresponding to the pixel value Nr, and "−1" within the square to the right indicates a filter coefficient corresponding to the pixel value Nr−1. Of the filter coefficients 1 and −1, it is assumed that the pixel value side (namely, the pixel value Nr in FIG. 15, and the pixel value Nr−1 in FIG. 16 mentioned later) corresponding to the filter coefficient 1 is subjected to a filtering process.

More specifically, for example, the asymmetric coefficient filter 62 calculates the following equations 10 and 11, and supplies a pair of the results Nr62 and Nrn 62, i.e., (Nr62, Nrn62)=(Nr−Nrn, 0) to the multiplier 66.

Equation 10

$$Nr62=Nr\times 1+Nrn\times (-1)=Nr Nrn \quad (10)$$

Equation 11

$$Nrn62=0 \quad (11)$$

Figure 16:
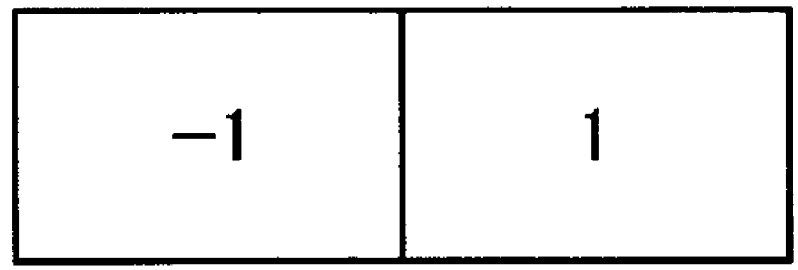
FIG. 16 illustrates a filter coefficient used by the video processor of FIG. 14.

In contrast, the asymmetric coefficient filter 63 retains a filter coefficient (weighted value) such as shown in FIG. 16 for example, and subjects the input target block (Nr, Nrn) to an asymmetric filtering process, using this filter coefficient.

Note that in FIG. 16, "−1" within the square to the left side indicates a filter coefficient corresponding to the pixel value Nr, and "1" within the square to the right indicates a filter coefficient corresponding to the pixel value Nr−1.

More specifically, for example, the asymmetric coefficient filter 63 calculates the following equations 12 and 13, and supplies a pair of the results Nr63 and Nrn 63, i.e., (Nr63, Nrn63)=(0, Nrn−Nr) to the multiplier 66.

Equation 12

$$Nr63=0 \tag{12}$$

Equation 13

$$Nrn63=Nr\times(-1)+Nrn\times1=Nrn-Nr \tag{13}$$

The coefficient selecting unit 64 detects the direction of motion of the target pixel based on the amount of motion (vector) v of the target pixel (the pixel having the pixel value Nr) supplied from the motion detector 24.

The coefficient selecting unit 64, in a case that the detected direction of motion is positive, i.e., in a case that the direction of motion of the step edge is the spatial direction X as shown in FIG. 12, switches the output destination of the switch 61 to the asymmetric coefficient filter 62 side.

Thus, while the target block (Nr, Nrn) is supplied to the asymmetric coefficient filter 62, the target block (Nr, Nrn) is prohibited from being supplied to the asymmetric coefficient filter 63.

Therefore, the asymmetric coefficient filter 62 may be referred to as a filter used in a case that the direction of motion of the target pixel (step edge) is positive (spatial direction X), i.e., a filter for correcting the pixel value Nr (the pixel value E of the pixel n+4 in FIG. 12) of the target pixel.

In contrast, in a case that the detected direction of motion is negative, i.e., in a case that the direction of motion of the step edge is the direction opposite to the spatial direction X as shown in FIG. 13, the coefficient selecting unit 64 switches the output destination of the switch 61 to the asymmetric coefficient filter 63 side.

Thus, while the target block (Nr, Nrn) is supplied to the asymmetric coefficient filter 63, the target block (Nr, Nrn) is prohibited from being supplied to the asymmetric coefficient filter 62.

Therefore, the asymmetric coefficient filter 63 may be referred to as a filter used in a case that the direction of motion of the target pixel (step edge) is negative (the direction opposite to the spatial direction X), i.e., a filter for correcting the pixel value Nrn (the pixel value B of the pixel n+5 in FIG. 13) of the pixel adjacent to the target pixel in the spatial direction X.

The gain G decision unit 65 determines the gain G used in equations 7 and 9 based on the amount of motion v (absolute value) of the target pixel (step edge) supplied from the motion detector 24, and supplies the gain G to the multiplier 66.

More specifically, the gain G, as described in equation 5, is a variable gain changing the value thereof in proportion to the amount of motion v (absolute value). The gain G decision unit 65 may retain a proportionality constant C such as shown in equation 5, substitute the amount of motion v supplied from the motion detector 24 in the following equation 14, calculate equation 14, determine the obtained result as the gain G, and output the determined gain G to the multiplier 66.

Equation 14

$$G=C\times v \tag{14}$$

Figure 17:
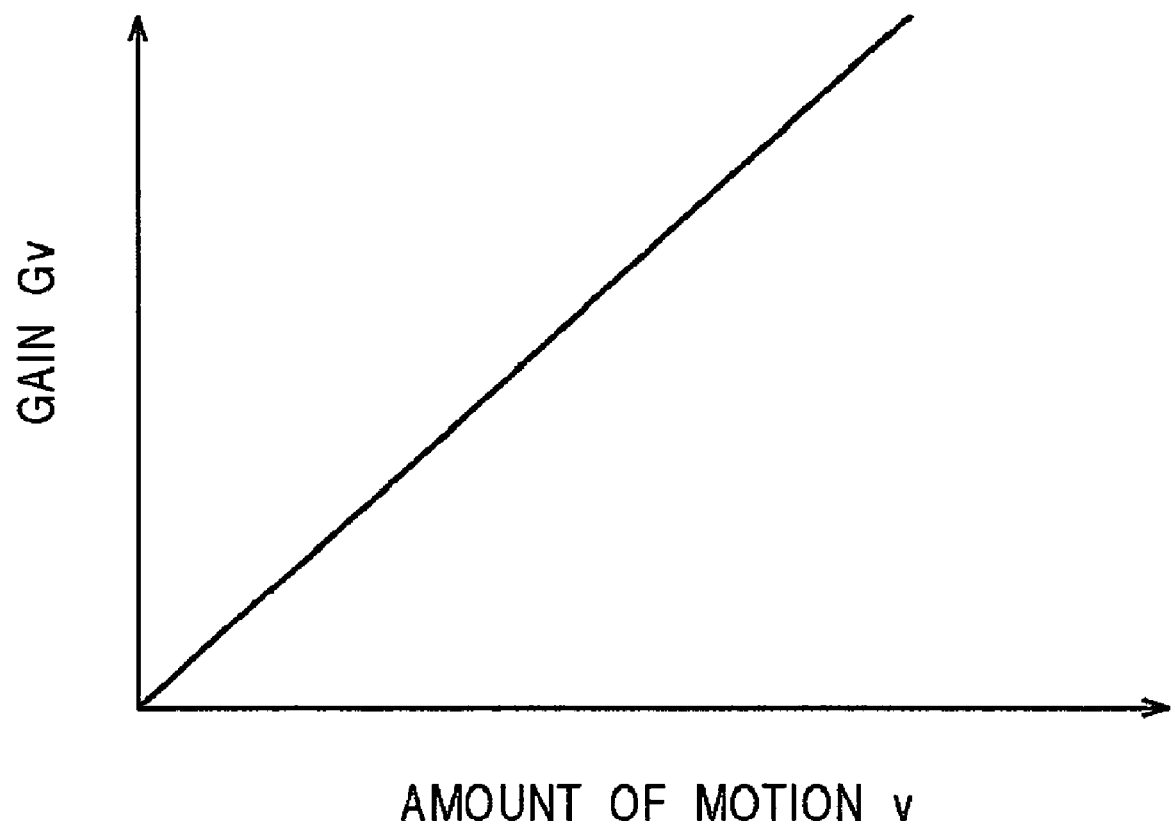
FIG. 17 illustrates the relationship between the amount of motion of a step edge and the amount of correction, which is used by the video processor of FIG. 14.

Alternatively, the gain G decision unit 65 may retain a table such as shown in FIG. 17, i.e., a table expressing the relationship between the amount of motion v and the gain G (a gain Gv in the example in FIG. 17 instead of the gain G, which will be explained later), determine the gain G with reference to this table, and output the determined gain G to the multiplier 66.

As mentioned above, in a case that the direction of motion of the target pixel (step edge) is positive (spatial direction X), a block (Nr−Nrn, 0) that is output of the filtering process by the asymmetric coefficient filter 62 is supplied to the multiplier 66, and also the gain G determined by the gain G decision unit 65 are supplied to the multiplier 66. The multiplier 66 calculates the following equations 15 and 16, and a pair of the calculated results Nr66+ and Nrn66+, i.e., (Nr66+, Nrn66+)=(R, 0) is supplied to the adder 67.

Equation 15

$$Nr66+=(Nr-Nrn)\times G=R \tag{15}$$

Equation 16

$$Nrn66+=0\times G=0 \tag{16}$$

In contrast, in a case that the direction of motion of the target pixel (step edge) is negative (the direction opposite to the spatial direction X), a block (0, Nrn−Nr) that is output of the filtering process by the asymmetric coefficient filter 63 is supplied to the multiplier 66, and also the gain G determined by the gain G decision unit 65 are supplied to the multiplier 66. The multiplier 66 calculates the following equations 17 and 18, and a pair of the calculated results Nr66− and Nrn66−, i.e., (Nr66−, Nrn66−)=(0, −R) is supplied to the adder 67.

Equation 17

$$Nr66-=0\times G=0 \tag{17}$$

Equation 18

$$Nrn66-=-(Nr-Nrn)\times G=-R \tag{18}$$

Summarizing the above description, consequently, the switch 61 through the multiplier 66 determine the amount of correction of the target block (Nr, Nrn), and then supply this to the adder 67 in FIG. 14.

The adder 67 adds the block expressing the amount of correction output from the multiplier 66 to the target block (Nr, Nrn), and then outputs this result to the external switch 25.

In other words, in a case that the direction of motion of the target pixel (step edge) is positive (spatial direction X), a block (R(=(Nr−Nrn)×G), 0) expressing the amount of correction is output from the multiplier 66 to the adder 67. The adder 67 adds this block (R, 0) to the target block (Nr, Nrn), and outputs this result, i.e., a block (Nr+R, Nrn) to the switch 25 as the corrected target block.

In other words, in this case, the adder 67 substitutes the pixel value Nr of the target pixel of the target block (Nr, Nrn) and the correction value R(=(Nr−Nrn)×G) of the block (R, 0) supplied from the multiplier 66 in equation 7, calculates equation 7, and then outputs the result as a corrected pixel value Nr' of the target pixel.

In contrast, in a case that the direction of motion of the target pixel (step edge) is negative (the direction opposite to the spatial direction X), a block (0, −R) expressing the amount of correction is output from the multiplier 66 to the adder 67. The adder 67 adds this block (0, −R) to the target block (Nr, Nrn), and outputs this result, i.e., a block (Nr, Nrn−R) to the switch 25 as the corrected target block.

In other words, in this case, the adder 67 substitutes the pixel value Nrn of the pixel adjacent to the target pixel of the target block (Nr, Nrn) in the spatial direction X and the correction value −R(=−(Nr−Nrn)×G) of the block (0, −R) supplied from the multiplier 66 in equation 9, calculates equation 9, and then outputs the result as a corrected pixel value Nrn' of the pixel adjacent to the target pixel in the spatial direction X.

Description has been made so far regarding a preferred embodiment of the video processor 22 based on the assumption that the response speed of the display elements (liquid crystal in a case that the holding type unit 12 in FIG. 7 is formed of a liquid crystal display device) of the holding type display unit 12 in FIG. 7 and the time constant τ are both uniform.

However, as mentioned above, the time constant τ varies depending on the old pixel value and the new pixel value (target pixel value) in reality. To identify the time constant τ, a panel table such as shown in FIG. 18 may be adopted, for example.

In the panel table in FIG. 18, in a case that a command for changing from the corresponding old pixel value to the corresponding target (new) pixel value is issued, the time (msec) required for the intensity of light of liquid crystal to reach from the intensity of light corresponding to the old pixel value to the intensity of light corresponding to the new pixel value, i.e., an example of response time (msec) is within each square.

For example, 20 is in the square of the first column of the second line, which expresses that the response time of liquid crystal required for changing from the light level corresponding to a pixel value 192 to the light level corresponding to a pixel value 64 is 20 msec.

On the other hand, 12 is in the square of the second column of the first line, which expresses that the response time of liquid crystal required for changing from the light level corresponding to a pixel value 64 to the intensity of light corresponding to a pixel value 192 is 12 msec.

Figure 2:
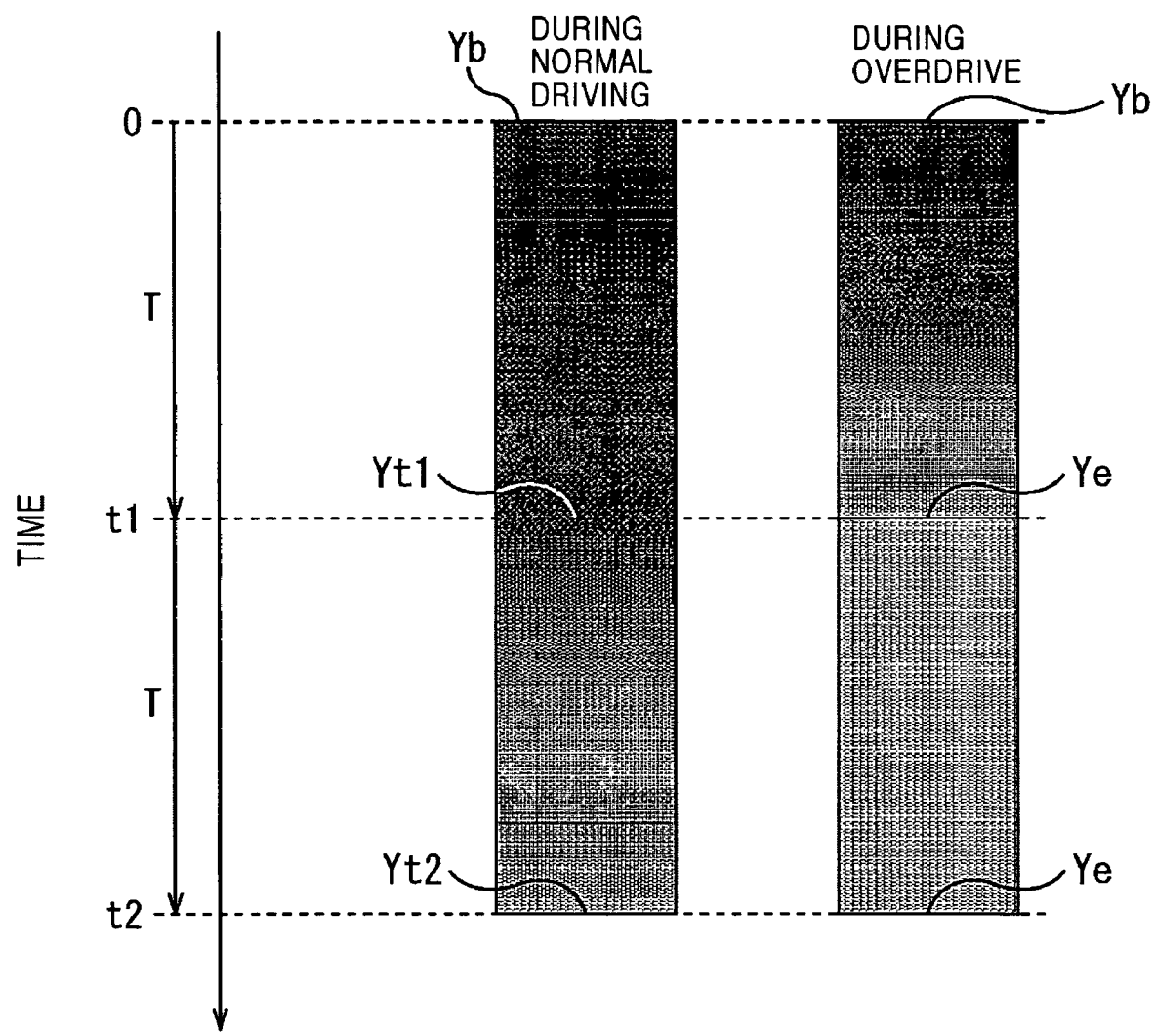
FIG. 2 illustrates a change in the output level of the liquid crystal of the liquid-crystal display device with a known overdrive method in operation and not in operation.

As mentioned above, in general, the frame time T (see FIG. 2 etc.) is 16.6 msec, in a case that a pixel value changes from 64 to 192 (corresponding to the intensity of light thereof), the response time of liquid crystal is faster than the frame time T, so that the intensity of light of liquid crystal can reach the target level (corresponding to a pixel value 192) faster than the frame time.

On the other hand, in a case that a pixel value changes from 192 to 64 (corresponding to the intensity of light thereof), the response time of liquid crystal is slower than the frame time T, so that the intensity of light of the liquid crystal cannot reach the target level (corresponding to a pixel value 64) even if the frame time elapses, i.e., even if a command for a new target pixel value corresponding to the next frame is issued.

Thus, so long as the video processor 22 retains the panel table regarding the holding type display unit 12, correction of pixel values can be performed more precisely, while taking the time τ constant into consideration.

However, while only the relationship between the two pixel values 64 and 192 is included in the panel table in FIG. 18 to facilitate explanation, a real panel table further includes relationship (information) between a great number of pixel values. Accordingly, adapting a panel table including such a great amount of information causes a drawback that the circuit scale of the video processor 22 increases in order to calculate the correction value of pixel values.

On the other hand, one of the advantages of the video processor 22 being configured of an asymmetric high-pass filter such as shown in FIG. 14 is that the circuit scale thereof can be reduced.

Accordingly, if the video processor 22 is configured of both an asymmetric high-pass filter and a calculating unit (not shown) using a panel table, the drawback caused by the panel table reduces the advantage of the asymmetric high-pass filter. Consequently, the reduction level of the circuit scale of the video processor 22 stays in a small range.

In other words, it is difficult to configure the video processor 22 capable of correcting pixel values, taking account of the influence of the response speed (time constant τ) of liquid crystal, as an asymmetric high-pass filter, simply by adapting a known panel table.

The inventors of this invention have conceived an idea wherein the relationship between the time response of liquid crystal (time constant τ), the old pixel value, and the new pixel value based on this panel table are subjected to functional approximation, the output values of these approximate functions are regarded as a variable gain, and the characteristics of the high-pass filter are changed using these variable gains, thereby enabling correction of pixel values to be performed, taking account of the response speed of liquid crystal (time constant τ).

The inventors of this invention have devised an asymmetric high-pass filter capable of correcting pixel values, taking account of the influence of the real response speed of liquid crystal (time constant τ) based on such an idea, i.e., the video processor 22 capable of markedly reducing the circuit scale thereof.

The inventors of this invention have devised the video processor 22 configured of the asymmetric high-pass filter such as shown in FIG. 14, for example. Moreover, the inventors of this invention have devised the gain G decision unit 65 having the configuration shown in FIG. 19 to correct pixel values taking account of the influence of the real response speed of liquid crystal (time constant τ).

Figure 19:
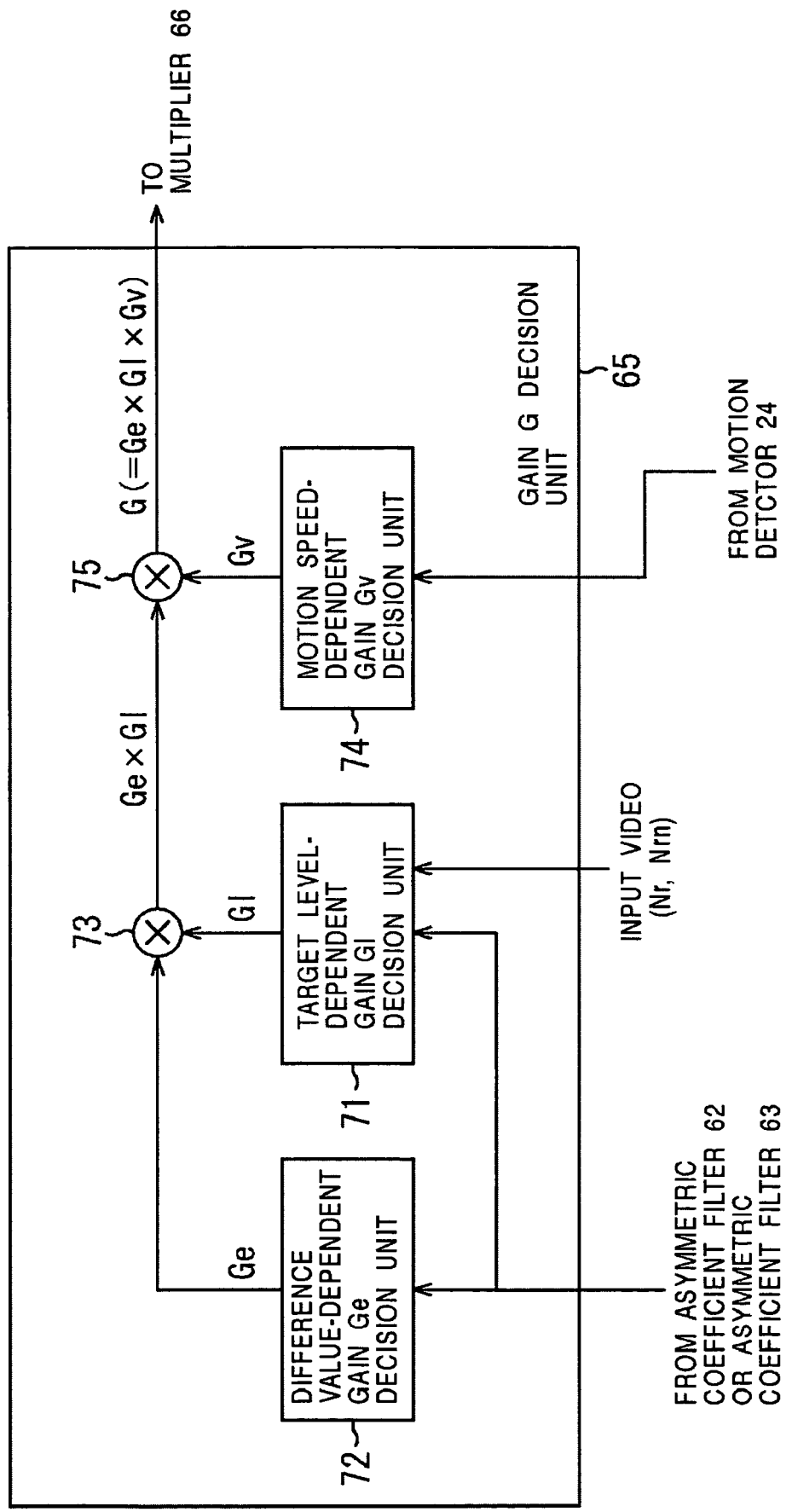
FIG. 19 is a block diagram illustrating the detailed structure of a gain G decision unit of the video processor of FIG. 14.

As shown in FIG. 19, this gain G decision unit 65 is made up of a target level-dependent gain Gl decision unit 71, a difference value-dependent gain Ge decision unit 72, a multiplier 73, a motion speed-dependent gain Gv decision unit 74, and a multiplier 75.

The target level-dependent gain Gl decision unit 71 has retained the approximate function itself expressing the relationship between the response speed of liquid crystal (time constant τ) and the target pixel value (new pixel value), and information such as the panel table expressing the approximate function beforehand, and determines a first gain based on the information.

Note that the target pixel value (new pixel value) is any one of the pixel values Nr and Nrn of the target block (Nr, Nrn) in an input video. The target block (Nr, Nrn) indicates the target levels (new pixel values) corresponding to the target liquid crystal corresponding to the target pixel (the target display element of the holding type display unit 12 in FIG. 7) and the liquid crystal adjacent to the target liquid crystal in the spatial direction X respectively.

While an input video input to the gain G decision unit 65 is not shown in FIG. 17, an input video input to the target level-dependent gain Gl decision unit 71 is shown in FIG. 19.

As can be understood from the above description, the first gain is a gain depending on the response speed of liquid crystal (time constant τ) and the target pixel value (new pixel value). Hereafter, the first gain is referred to as a target level-dependent gain Gl.

More specifically, the target level-dependent gain Gl decision unit 71 can retain a table such as shown in FIG. 20, for example. FIG. 20 is an example of the table generated based on the panel table in FIG. 18 (in practice, based on a panel table further including a great amount of information).

As shown in FIG. 20, the target level-dependent gain Gl corresponding to a new pixel value 192 expresses a lower value. This is because, in a case that a pixel value changes from 64 to 192 (in a case of changing to the intensity of light corresponding thereto) in the panel table of FIG. 18, the response time of liquid crystal is faster than the frame time T, and accordingly, there is no need to increase the amount of correction so much. In other words, the table shown in FIG.

20 approximately expresses the relationship between the response speed of liquid crystal (time constant τ) and the target pixel value (new pixel value).

The target level-dependent gain Gl decision unit 71 extracts the pixel value Nr or the pixel value Nrn of the input target block (Nr, Nrn) as a target (new) pixel value, immediately determines the target level-dependent gain Gl thereof with reference to a table such as shown in FIG. 20, and then outputs the determined gain Gl to the multiplier 73.

As shown in FIG. 12, in a case that the step edge is moving in the spatial direction X, the target pixel n+4 at the edge portion becomes a pixel to be corrected. In this case, in the pixel n+4 to be corrected, the pixel value E expresses a new pixel value (target pixel value) prior to correction, the pixel value B expresses an old pixel value (see FIG. 3). In other words, in this case, the next command for the liquid crystal (the display element of the holding type display unit 12) corresponding to the pixel n+4 addresses a shift from the small pixel value B to the large pixel value E (the input voltage of the liquid crystal corresponding to the pixel n+4 changes from the voltage level corresponding to the pixel value B to the voltage level corresponding to the pixel value E).

In contrast, as shown in FIG. 13, in a case that the step edge is moving in the direction opposite to the spatial direction X, the pixel n+5 adjacent to the target pixel n+4 in the spatial direction X at the edge portion becomes a pixel to be corrected. In this case, in the pixel n+5 to be corrected, the pixel value B expresses a new pixel value (target pixel value) prior to correction, the pixel value E expresses an old pixel value. In other words, in this case, the next command for the liquid crystal corresponding to the pixel n+5 addresses a shift from the large pixel value E to the small pixel value B (the input voltage of the liquid crystal corresponding to the pixel n+5 changes from the voltage level corresponding to the pixel value E to the voltage level corresponding to the pixel value B).

Thus, even if the new pixel value is the same as the previous one (the new input voltage level of liquid crystal is the same as the previous one), the direction of the shift from the old pixel value to the new pixel value thereof (the direction of the shift from the old input voltage level of liquid crystal to the new input voltage level) differs. In FIG. 12, the direction of the shift is the direction from the small old pixel value to the large new pixel value. In contrast, in FIG. 13, the direction of the shift is the direction from the large old pixel value to the small new pixel value.

On the other hand, even if the new pixel value is the same as the previous one, the response speed of liquid crystal (time constant τ) is not always the same depending on the direction of the shift thereof. More specifically, the response speed of liquid crystal (time constant τ) in a case of the direction of the shift from the large old pixel value to the small new pixel value (in a case of changing an input voltage from the large old voltage level to the small new voltage level), and the response speed of liquid crystal (time constant τ) in a case of the direction of the shift from the small old pixel value to the large new pixel value (in a case of changing an input voltage from the small old voltage level to the large new voltage level) are not always the same.

This is because the holding type display unit 12 configured as a liquid crystal display device in FIG. 7 has so-called γ characteristics. More specifically, the holding type display unit 12 has characteristics wherein the shift of output light (brightness) is mild when the pixel value (the voltage level of an input voltage) addressing the target pixel (target liquid crystal) of the next display target frame is small, however, the greater the pixel value (the voltage level of an input voltage) becomes, the rapidly greater the shift of output light (brightness) becomes. Also, this is because the holding type display unit 12 is sometimes subjected to γ correction due to this.

Accordingly, even if the new pixel value is the same as the previous one, a different value is preferably applied to the target level-dependent gain Gl depending on the direction of the shift from the old pixel value to the new pixel value in some cases.

Figure 21:
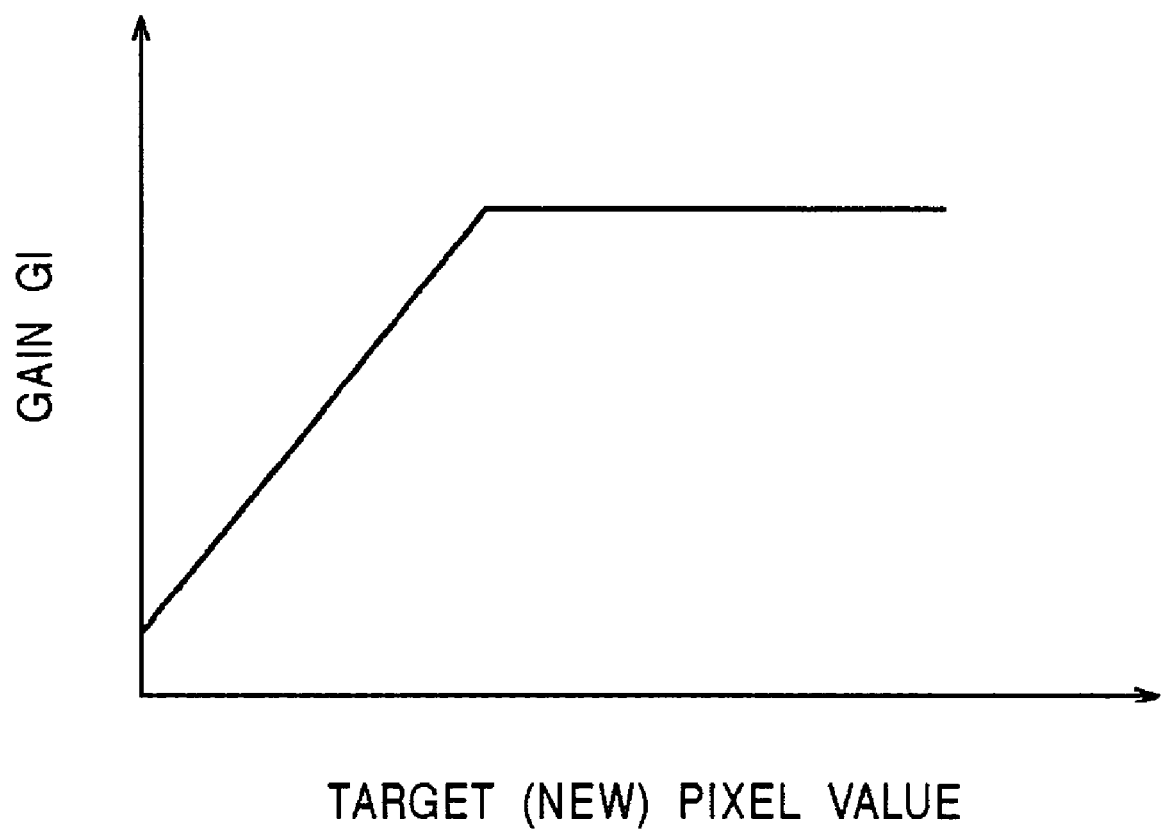
FIG. 21 illustrates the relationship between a target (new) pixel value and the amount of correction, which is used by the video processor of FIG. 14.

In this case, the target level-dependent gain Gl decision unit 71 preferably retains not a single table such as shown in FIG. 20 but two kinds of tables, for example, the table in FIG. 20 for the shift from the small old pixel value to the large new pixel value, and the table in FIG. 21 for the shift from the large old pixel value to the small new pixel value.

Note that the horizontal axes of the table in FIG. 20 and the table in FIG. 21, i.e., the axial scale (coordinates positions) of the target (new) pixel value are not matched in particular.

The target level-dependent gain Gl decision unit 71 in FIG. 19 monitors the output from the asymmetric coefficient filters 62 and 63 respectively, in a case of the output from the asymmetric coefficient filter 62, regards the pixel value Nr of the input target block (Nr, Nrn) as a target (new) pixel value, the pixel value Nrn as an old pixel value, determines the target level-dependent gain Gl with reference to the table in FIG. 20 when Nr>Nrn, or with reference to the table in FIG. 21 when Nr<Nrn, and then outputs the determined gain Gl to the multiplier 73.

In contrast, if there is output from the asymmetric coefficient filter 63, the target level-dependent gain Gl decision unit 71 regards the pixel value Nrn of the input target block (Nr, Nrn) as a target (new) pixel value, the pixel value Nr as an old pixel value, determines the target level-dependent gain Gl with reference to the table in FIG. 21 when Nr>Nrn, or with reference to the table in FIG. 20 when Nr<Nrn, and then outputs the determined gain Gl to the multiplier 73.

While an input video input to the gain G decision unit 65 from the asymmetric coefficient filter 62 or the asymmetric coefficient filter 63 is not shown in FIG. 17, an input video input to the target level-dependent gain Gl decision unit 71 from the asymmetric coefficient filter 62 or the asymmetric coefficient filter 63 is shown in FIG. 19.

Thus, the target level-dependent gain Gl, which is a variable gain expressing the relationship between the response speed of liquid crystal (time constant τ) and the new pixel value, is determined by the target level-dependent gain Gl decision unit 71. The rest is to determine a variable gain expressing the approximation of the relationship between the response speed of liquid crystal (time constant τ) and the old pixel value. In FIG. 19, the difference value-dependent gain Ge decision unit 72 is provided as a block for determining such a variable gain.

However, as mentioned above, the difference value-dependent gain Ge decision unit 72 treats not the old pixel value itself but information corresponding to the old pixel value such as the difference value (primary differential value) between the new pixel value and the old pixel value. More specifically, for example, as mentioned above, the value Nr−Nrn of a block (Nr−Nrn, 0) output from the asymmetric coefficient filter 62 expresses the difference value between the new pixel value and the old pixel value in the target pixel. In the same way, the value Nrn−Nr of a block (0, Nrn−Nr) output from the asymmetric coefficient filter 63 expresses the difference value between the new pixel value and the old pixel value in the pixel adjacent to the target pixel in the spatial direction X. The difference value-dependent gain Ge decision unit 72 uses the output from the asymmetric coefficient filter 62 or the asymmetric coefficient filter 63 as information corresponding to the old pixel value, for example.

While an input video input to the gain G decision unit 65 from the asymmetric coefficient filter 62 or the asymmetric coefficient filter 63 is not shown in FIG. 17, an input video input to the difference value-dependent gain Ge decision unit 72 from the asymmetric coefficient filter 62 or the asymmetric coefficient filter 63 is shown in FIG. 19.

In this case, the difference value-dependent gain Ge decision unit 72 has retained the approximate function itself expressing the relationship between the response speed of liquid crystal (time constant τ) and the difference value between the target pixel value (new pixel value) and the old pixel value, and information such as the panel table expressing the approximate function beforehand, and determines a second gain based on the above information, and the output from the asymmetric coefficient filter 62 or the asymmetric coefficient filter 63.

Thus, the second gain is a gain depending on the response speed of liquid crystal (time constant τ) and the difference value between the target pixel value (new pixel value) and the old pixel value. Hereafter, the second gain is referred to as a difference value level-dependent gain Ge.

More specifically, the difference value-dependent gain Ge decision unit 72 can retain a table such as shown in FIG. 22, for example.

In this case, the difference value-dependent gain Ge decision unit 72 extracts the value Nr–Nrn of a block (Nr–Nrn, 0) output from the asymmetric coefficient filter 62 or the value Nrn–Nr of a block (0, Nrn–Nr) output from the asymmetric coefficient filter 63 as a difference value, immediately determines the difference value-dependent gain Ge with reference to the extracted difference value and the panel table of FIG. 22 and so forth, and then supplies the determined gain Ge to the multiplier 73.

The multiplier 73 multiplies the target level-dependent gain Gl supplied from the target level-dependent gain Gl decision unit 71 by the difference value-dependent gain Ge supplied from the difference value-dependent gain Ge decision unit 72, and then supplies the result, i.e., a value Ge×Gl to the multiplier 75.

A motion speed-dependent gain Gv decision unit 74 determines the above-mentioned gain used in a case that the response speed of liquid crystal (time constant τ) is not taken into consideration, i.e., a gain depending on the amount of motion (speed) v of the step edge (target pixel) supplied from the motion detector 24 as a third gain, and then supplies the third gain to the multiplier 75. Thus, the third gain is a gain depending on the amount of motion (speed) v of the step edge (target pixel). Hereafter, the third gain is referred to as a motion speed-dependent gain Gv.

In other words, the motion speed-dependent gain Gv decision unit 74 retains a proportionality constant C shown in equation 14 beforehand, substitutes the amount of motion v supplied from the motion detector 24 in equation 14, calculates equation 14, determines the result as the motion speed-dependent gain Gv, and then outputs the determined gain Gv to the multiplier 75.

Alternatively, the motion speed-dependent gain Gv decision unit 74 may retain a table such as shown in FIG. 17, i.e., the table expressing the relationship between the amount of motion v and the motion speed-dependent gain Gv beforehand, determine the motion speed-dependent gain Gv with reference to this table, and then output the determined gain Gv to the multiplier 66.

The multiplier 75 multiplies the value Ge×Gl supplied from the multiplier 73 by the motion speed-dependent gain Gv supplied from the motion speed-dependent gain Gv decision unit 74, and then outputs the result to the multiplier 66 as a final gain G.

Consequently, the gain G decision unit 65 in FIG. 19 determines a value equivalent to the result of the right-hand side of the following equation 19 as a final gain G, and then outputs the final gain G to the external multiplier 66.

Equation 19

$$G = Ge \times Gl \times Gv \quad (19)$$

Thus, in a case that the response speed of liquid crystal (time constant τ) is not taken into consideration (in a case of assuming that the response speed is constant), the final gain G becomes simply the motion speed-dependent gain Gv itself; on the other hand, in a case that the response speed of liquid crystal (time constant τ) is taken into consideration, the final gain G becomes a value obtained by multiplying the motion speed-dependent gain Gv by the value Ge×Gl (the product between the target level-dependent gain Gl and the difference value-dependent gain Ge) expressing the approximation of the response speed of liquid crystal (time constant τ).

Description has been made as a preferred embodiment of the video processor 22, regarding the video processor 22 in FIG. 14 which is configured as an asymmetric high-pass filter for subjecting pixel values to high-pass filtering equivalent to calculating equation 7 or equation 9, as well as the above-mentioned video processor 22 in FIG. 7.

Furthermore, description will be made regarding an arrangement wherein the gain G decision unit 65 in FIG. 14 is configured such as shown in FIG. 19, as a preferred embodiment of the video processor 22 made up of an asymmetric high-pass filter capable of correcting pixel values taking account of the influence of the real response speed of liquid crystal (time constant τ).

However, the video processor 22 is not restricted to the preferred embodiments in FIGS. 7, 14, and 19; rather, various embodiments can be realized. In other words, as long as the video processor 22 is configured as an asymmetric high-pass filter for subjecting pixel values to high-pass filtering equivalent to calculating equation 7 or equation 9, any embodiment may be adopted as the video processor 22. However, in a case of correcting a pixel value taking account of the influence of the real response speed of liquid crystal (time constant τ), the asymmetric high-pass filter needs to determine the gain G equivalent to calculating equation 19.

More specifically, for example, the video processor 22 may be configured as an asymmetric high-pass filter such as shown in FIG. 23.

The video processor 22 in FIG. 23 is made up of a difference value computing unit (coefficient filtering unit) 81, a difference value-dependent gain Ge decision unit 82, a multiplier 83, a target level-dependent gain Gl decision unit 84, a multiplier 85, a correction value decision unit 86, and an adder 87.

The difference value computing unit (coefficient filtering unit) 81 includes each function of the switch 61, the asymmetric coefficient filter 62, the asymmetric coefficient filter 63, and the coefficient selecting unit 64 in FIG. 14. More specifically, the difference value computing unit 81 supplies the difference value-dependent gain Ge decision unit 82 and the multiplier 83 with a block (Nr–Nrn, 0) or a block (0, Nrn–Nr).

The difference value-dependent gain Ge decision unit 82 basically includes the same function as the difference value-dependent gain Ge decision unit 72 in FIG. 19. More specifically, the difference value-dependent gain Ge decision unit 82 supplies the multiplier 83 with the difference value-dependent gain Ge.

The multiplier 83 multiplies a block (Nr−Nrn, 0) or a block (0, Nrn−Nr) supplied from the difference value computing unit (coefficient filtering unit) 81 by the difference value-dependent gain Ge supplied from the difference value-dependent gain Ge decision unit 82, and then supplies the multiplier 85 with the result, i.e., a block (Ge×(Nr−Nrn), 0) or a block (0, Ge×(Nrn−Nr)).

The target level-dependent gain Gl decision unit 84 basically includes the same function as the target level-dependent gain Gl decision unit 71 in FIG. 19. More specifically, the target level-dependent gain Gl decision unit 84 supplies the multiplier 85 with the target level-dependent gain Gl.

The multiplier 85 multiplies a block (Ge×(Nr−Nrn), 0) or a block (0, Ge×(Nrn−Nr)) supplied from the multiplier 83 by the target level-dependent gain Gl supplied from the target level-dependent gain Gl decision unit 84, and then supplies the correction value decision unit 86 with the result, i.e., a block (Gl×Ge×(Nr−Nrn), 0) or a block (0, Gl×Ge×(Nrn−Nr)).

In FIG. 23, the block (Gl×Ge×(Nr−Nrn), 0) and the block (0, Gl×Ge×(Nrn−Nr)) input to the correction value decision unit 86 are blocks in which the response speed of liquid crystal (time constant $\tau$) has already been taken into consideration. In other words, the characteristics of the asymmetric high-pass filter 22 has already been changed until the process of the correction value decision unit 86 in accordance with the response speed of liquid crystal (time constant $\tau$).

Accordingly, the correction value decision unit 86 can obtain a correction value by further changing the characteristics of the asymmetric high-pass filter 22 in accordance with the motion speed v supplied from the motion detector 24.

More specifically, the correction value decision unit 86 includes each function of the motion speed-dependent gain Gv decision unit 74 and the multiplier 75 in FIG. 19, and the multiplier 66 in FIG. 14, generates a block (R(=Gv×Gl×Ge×(Nr−Nrn)), 0) or a block (0, −R(=Gv×Gl×Ge×(Nrn−Nr))), and then supplies the generated block to the adder 87.

The adder 87 basically has the same function and configuration as the adder 67 in FIG. 14. Moreover, information input to the adder 87 is the same information as the information input to the adder 67 in FIG. 14. Namely, a block (R, 0) or a block (0, −R), and the target block (Nr, Nrn) output from the correction value decision unit 86 are input to the adder 87, as mentioned above.

Accordingly, the output from the adder 87 in FIG. 23, i.e., the output from the video processor (asymmetric high-pass filter) 22 in FIG. 23 becomes a block (Nr+R, Nrn) or a block (Nr, Nrn−R), which is basically the same as the output from the adder 67 in FIG. 14, i.e., the output from the video processor (asymmetric high-pass filter) 22 in FIG. 14 (however, in a case that the gain G decision unit 65 in FIG. 14 has the configuration in FIG. 19).

Accordingly, in a case that the video processor 22 is configured as an asymmetric high-pass filter, the configuration therein is not restricted to any particular one as long as the output thereof is the same. Accordingly, various kinds of configuration may be adopted as well as the configurations shown in FIGS. 14 and 23, though not shown in the drawing.

As mentioned above, the greater the amount of motion v supplied from the motion detector 24 is, the greater the correction value R of the pixel value is. In accordance with this, the pixel value following correction is also increased. For example, in a case that the pixel value Nr of the target pixel is corrected (see equation 7), the greater the correction value R is, the greater the pixel value Nr+R of the target pixel following correction is.

On the other hand, the holding type display unit 12 configured as a liquid crystal display device or the like includes a predetermined dynamic range. Note that the term "dynamic range" means a numerical value expressing signal reproducibility, and in general, means a ratio between the maximal value and the minimal value expressed in dB, or expressed by the number of bits. However, hereinafter, a pixel value converted from the maximal value of signal reproducibility is referred to as a dynamic range for the sake of facilitating explanation (readily comparable with others).

Figure 24:
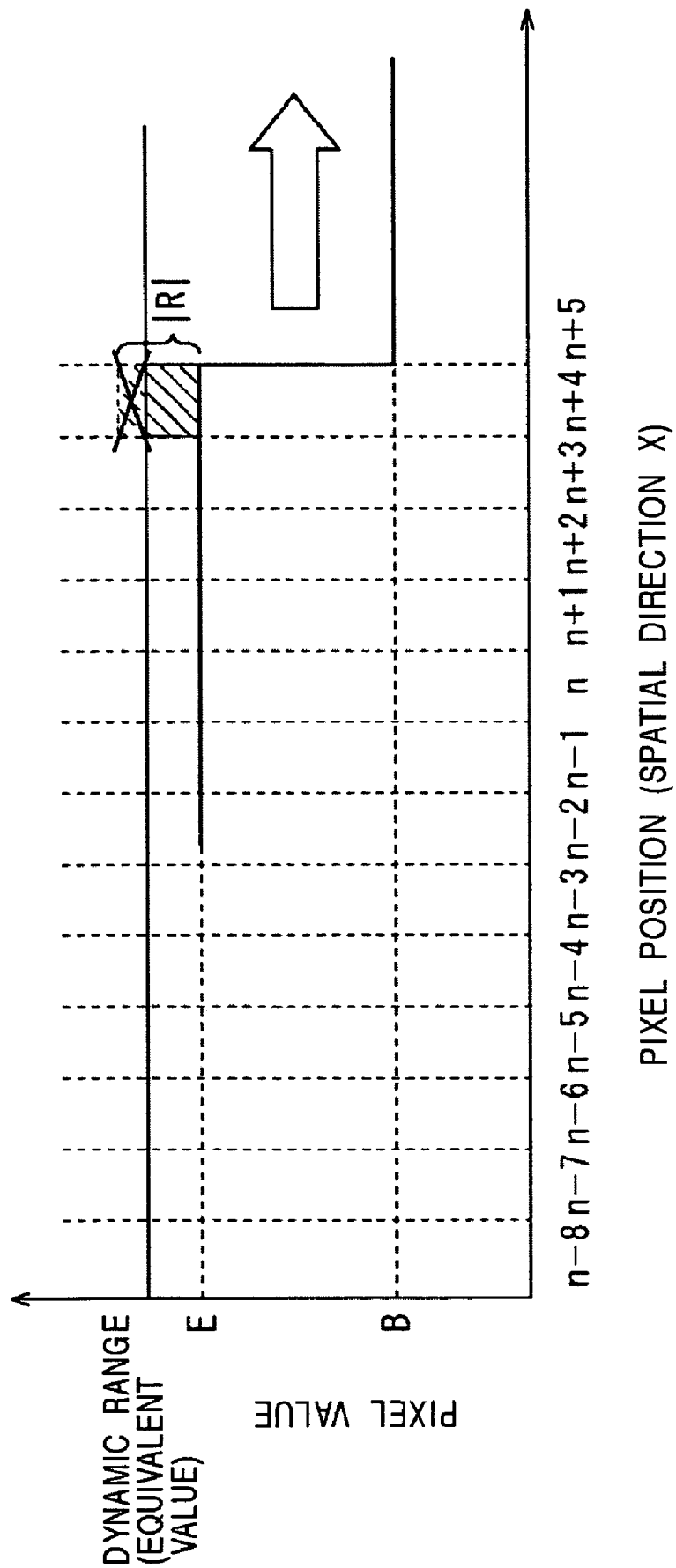
FIG. 24 illustrates the relationship between the amount of correction and the dynamic range with regard to a pixel value.

Accordingly, as shown in FIG. 24, the greater the correction value R is, the pixel value following correction (in FIG. 24, the pixel value E+R following correction of the target pixel n+4) sometimes exceeds the dynamic range.

In this case, the holding type display unit 12 cannot reproduce a pixel value beyond the dynamic range, i.e., can reproduce a pixel value up to the dynamic range (up to the intensity of light corresponding to the dynamic range). Accordingly, even if a pixel value beyond the dynamic range is commanded (for example, in FIG. 24, as a command for the pixel n+4, even if the pixel value E+R beyond the dynamic range is commanded), consequently, the result is the same in a case of commanding the pixel value corresponding to the dynamic range. In other words, as marked by an "X" in FIG. 24, the portion corresponding to (pixel value E+R)−(dynamic range) of the correction value R cannot be corrected.

As mentioned above, the correction value R is the amount of correction for eliminating motion blur caused by the retinal after-image of the human. Moreover, as mentioned in FIG. 10, the correction value R is the difference value between the original amount of light to be accumulated on the retina of the human and the real amount of light to be accumulated, i.e., the value corresponding to the lacking amount of light. Accordingly, the amount of light corresponding to (pixel value E−R)−(dynamic range) of the correction value R is not accumulated on the human retina, resulting in a problem wherein effects for eliminating motion blur is reduced.

To solve this problem, it is necessary that the number of pixels to be corrected be not one pixel at the edge portion of the step edge (in FIG. 24, pixel n+4 alone) but two or more pixels, i.e., for example, in FIG. 25, two or more pixels (pixels n+4 and n+3) of pixels (pixels n+4 through n−8) consecutively lined in the direction opposite to the direction of motion of the step edge beginning at the pixel n+4.

However, in this case, if the video processors 22 in FIGS. 7, 14, and 23 are made up of a simple filter, it is difficult to realize correction of two or more pixels to be corrected since the amount of motion v (detected by the motion detector 24) in each of two or more pixels sometimes differs.

Accordingly, for example, in a case that the video processor 22 is configured such as shown in FIG. 7, the corrector 32 should perform a process for propagating the correction value R in the direction opposite to the direction of motion of the step edge (in FIG. 25, the direction opposite to the spatial direction X) from the pixel at the edge portion of the step edge (in FIG. 25, pixel n+4). In other words, the corrector 32 should distribute and add the correction value R to two or more pixels (in FIG. 25, pixel n+4 and pixel n+3) consecutively lined in the direction opposite to the direction of motion of the step edge, beginning at one pixel (in FIG. 25, pixel n+4) at the edge portion of the step edge.

The method itself for distributing and processing the correction value R is not restricted to any particular method, for example, an arrangement may be made wherein the corrector 32 obtains the final correction value R, and then determines distribution values as respective correction values obtained by the distribution process wherein the final correction value R is distributed in a predetermined proportion to two or more pixels to be corrected, so as to add the distributed correction values to the pixel values of corresponding pixels respectively.

The correction results in a case that the corrector 32 has performed such a process are shown in FIG. 25, for example. In FIG. 25, the pixel n+4 and the pixel n+3 are regarded as a pixel to be corrected, the correction value R is distributed in the proportion of (correction value of pixel n+4: correction value of pixel n+3=2:1), and consequently, correction value of pixel n+4=2R/3 and correction value of pixel n+3=R/3 are determined respectively.

Figure 26:
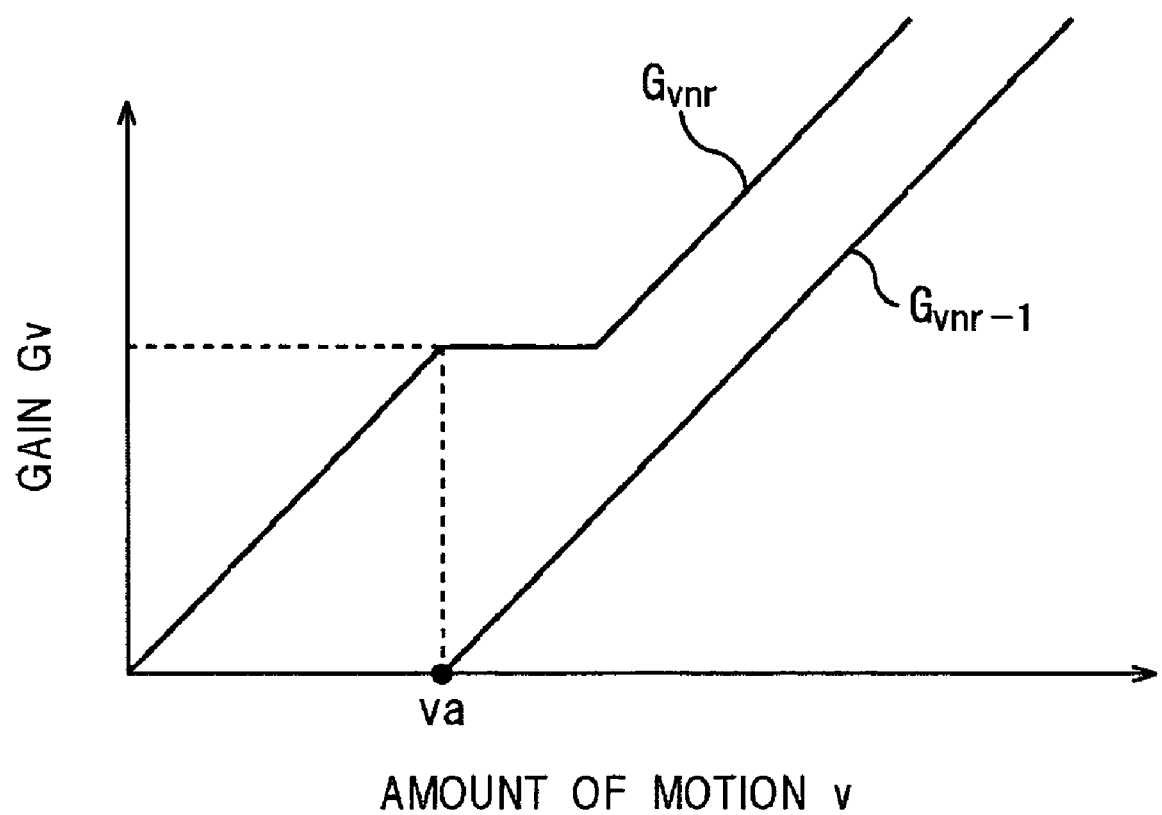
FIG. 26 illustrates the relationship between the amount of motion of a step edge and the amount of correction, which is used by the correction method when the amount of correction exceeds the dynamic range.

Alternatively, for example, in a case that the video processor 22 is configured such as shown in FIG. 23, the correction value decision unit 86 has a table for determining the motion speed-dependent gain Gv such as shown in FIG. 26, determines the motion speed-dependent gain Gv of each of two or more pixels to be corrected with reference to the table in FIG. 26, obtains each gain G of the two or more pixels to be corrected using the determined two or more motion speed-dependent gain Gvs, and then obtains each correction value of the two or more pixels to be corrected based on the obtained two or more gain Gs.

More specifically, for example, as shown in FIG. 25, in a case that the step edge moves in the spatial direction X, and the edge portion of the step edge corresponds to the pixel n+4, the correction decision unit 24 acquires the amount of motion v at the pixel n+4 from the motion detector 24, and determines the motion speed-dependent gain Gv at the pixel n+4 based on the relationship between the amount of motion v and a line Gvnr of the table in FIG. 26. In the same way, the correction value decision unit 24 determines the motion speed-dependent gain Gv at the pixel n+3 based on the relationship between the amount of motion v and a line Gvnr−1 of the table in FIG. 26.

Note that the motion speed-dependent gain Gv at the pixel n+4 is referred to as a motion speed-dependent gain Gvn+4, and the motion speed-dependent gain Gv at the pixel n+3 is referred to as a motion speed-dependent gain Gvn+3, hereinafter.

Next, the correction value decision unit 86 calculates the following equations 20 and 21, determines the correction value at the pixel n+4 (hereinafter, referred to as a correction value Rn+4) and the correction value at the pixel n+3 (hereinafter, referred to as a correction value Rn+3) respectively, and then supplies the determined correction values to the adder 87.

Equation 20

$$Rn+4=(Nr-Nrn)\times Ge\times Gl\times Gvn+4=(E-B)\times Ge\times Gl\times Gvn+4 \quad (20)$$

Equation 21

$$Rn+3=(Nr-Nrn)\times Ge\times Gl\times Gvn+3=(E-B)\times Ge\times Gl\times Gvn+3 \quad (21)$$

Thus, the correction value Rn+4 at the pixel n+4 and the correction value Rn+3 at the pixel n+3 are supplied to the adder 87. In this case, the pixel value Nr (pixel value E, in FIG. 25) of the pixel n+4 and the pixel value Nrn (pixel value E, in FIG. 25) of the pixel n+3 are also supplied to the adder 87 as an input video.

Accordingly, the adder 87 adds the pixel value E of the pixel n+4 and the correction value Rn+4 at the pixel n+4, and then supplies the result (E+Rn+4) to the switch 25 as the corrected pixel value of the pixel n+4. In the same way, the adder 87 adds the pixel value E of the pixel n+3 and the correction value Rn+3 at the pixel n+3, and then supplies the result (E+Rn+3) to the switch 25 as the corrected pixel value of the pixel n+3.

Note that in a case that the step edge moves in the direction opposite to the spatial direction X, the pixels to be corrected are the pixel n+5 and the pixel n+6, and basically the same process as mentioned above is performed except that the difference value output from the difference value computing unit 81 is difference value (Nrn−Nr)=(B−E). Accordingly, detailed description thereof will be omitted here.

Referring to the flowchart in FIG. 27, the video processing of the video processing apparatus (see FIG. 7) of the preferred embodiment of the present invention will now be discussed.

In step S1, the video processing apparatus 11 receives the video data of the display target frame or field. More specifically, the video data of the display target frame or field is input to each of the video processor 21, the video processor 22, the reference video storage unit 23, and the motion detector 24.

In step S2, the video processing apparatus 11 (including the video processor 21, the video processor 22, the motion detector 24, etc.) sets one of a plurality of pixels forming the display target frame or field as a target pixel.

In step S3, the motion detector 24 compares the video data of the display target frame or field with the video data of the reference video (of the frame or field immediately prior to the display target frame or field) stored in the reference video storage unit 23, thereby determining whether there is a motion in the target pixel.

If it is determined in step S3 that no motion is detected in the target pixel, the result of the determination is fed to the switch 25, and the switch 25 switches the input thereof to the video processor 21. In step S4, the video processor 21 performs the predetermined process on the target pixel, thereby correcting the pixel of the target pixel. The video processor 21 outputs the corrected pixel value to the display controller 26 through the switch 25.

If it is determined in step S3 that there is a motion in the target pixel, the result of the determination is supplied to the switch 25, and the switch 25 switches the input thereof to the video processor 22 (the corrector 32).

In step S5, the motion detector 24 calculates the amount of motion of the target pixel (the amount of motion of the object corresponding to the target pixel between frames or fields), thereby supplying the result of the calculation to each of the step edge detector 31 and the corrector 32.

In step S6, the step edge detector 31 calculates the difference between the pixel value of the target pixel and the pixel value of the pixel adjacent in the predetermined direction (in this case, one of the spatial directions X determined based on the amount of motion (direction of motion) supplied from the motion detector 24) The step edge detector 31 supplies the corrector 32 with the calculated difference and the pixel value of the target pixel.

In step S7, the corrector 32 corrects the pixel value of the target pixel based on the amount of motion and the difference of the target pixel, and supplies the display controller 26 with the corrected pixel value through the switch 25.

As previously discussed, the amount of motion v of the target pixel (the amount of motion v of the step edge corresponding to the target pixel) is fed from the motion detector 24 to the corrector 32 in step S5. The pixel value E of the target pixel and the difference (E−B) are fed from the step edge detector 31 to the corrector 32 in step S6. In step S7, the corrector 32 substitutes the supplied amount of motion v, the pixel value E of the target pixel, and the difference (E−B) in equation 3, and calculates the right-hand side of equation 3, thereby calculating the correction value R and updating the pixel value of the target pixel with the pixel value E+R. The updated pixel value E+R is then fed to the display controller 26 through the switch 25.

If the difference is zero, in other words, if the target pixel is not a pixel corresponding to the edge portion of the step edge, the correction value R becomes zero from equation 3. If the difference is zero, the pixel value of the target pixel is not corrected, and is fed to the display controller 26 through the switch 25 as is.

Alternatively, the video processor 22 having the configuration example in FIG. 14 or the video processor 22 having the configuration example in FIG. 23 may perform the above-described process, thereby enabling the processes in steps S6 and S7 to be performed.

In step S8, the display controller 26 outputs the pixel value of the target pixel, supplied from the video processor 21 or the video processor 22 through the switch 25, to the holding type display unit 12. Before being fed to the holding type display unit 12, the pixel value may be converted into a signal compatible with the holding type display unit 12 as necessary. In other words, the display controller 26 output the pixel of the target pixel at the target level of the display element corresponding to the target pixel, from among the display elements of the holding type display unit 12 to the holding type display unit 12.

In step S9, the video processing apparatus 11 determines whether or not the pixel values of all pixels are output.

If it is determined in step S9 that the pixel values of all pixels are not yet output, the algorithm loops to step S2 to repeat the above process. More specifically, the unprocessed pixels out of the plurality of pixels forming the display target frame or field are successively set as a target pixel and the pixel value of the target pixel is corrected. The corrected pixel value (including a zero value) is output to the holding type display unit 12.

When the holding type display unit 12 is supplied with the pixel values of all pixels forming the display target frame or field after repeating the above process, it is determined that the pixel values of all pixels are processed. The algorithm proceeds to step S10.

The holding type display unit 12 supplies each of the display elements forming the screen thereof with the voltage at the level corresponding to the supplied pixel value (the target level). The holding type display unit 12 continuously supplies the display element with the voltage at that level until the display of the next frame or field is addressed (in other words, until the pixel values of all pixels forming the next frame or field are supplied). Each display element continuously holds the display thereof.

In step S10, the video processing apparatus 11 determines whether all frames or fields forming a moving picture are processed.

If it is determined in step S10 that not all frames or fields are processed, the algorithm loops to step S1. The next frame or field is input as a display target frame or field, and subsequent steps are repeated.

If the pixel values of all pixels forming last frame or field are corrected (including a zero value) out of the plurality of frames or fields forming the moving picture, and output to the holding type display unit 12, it is determined in step S10 that all frames or fields are processed. The video processing apparatus 11 thus ends the video processing.

Figure 27:
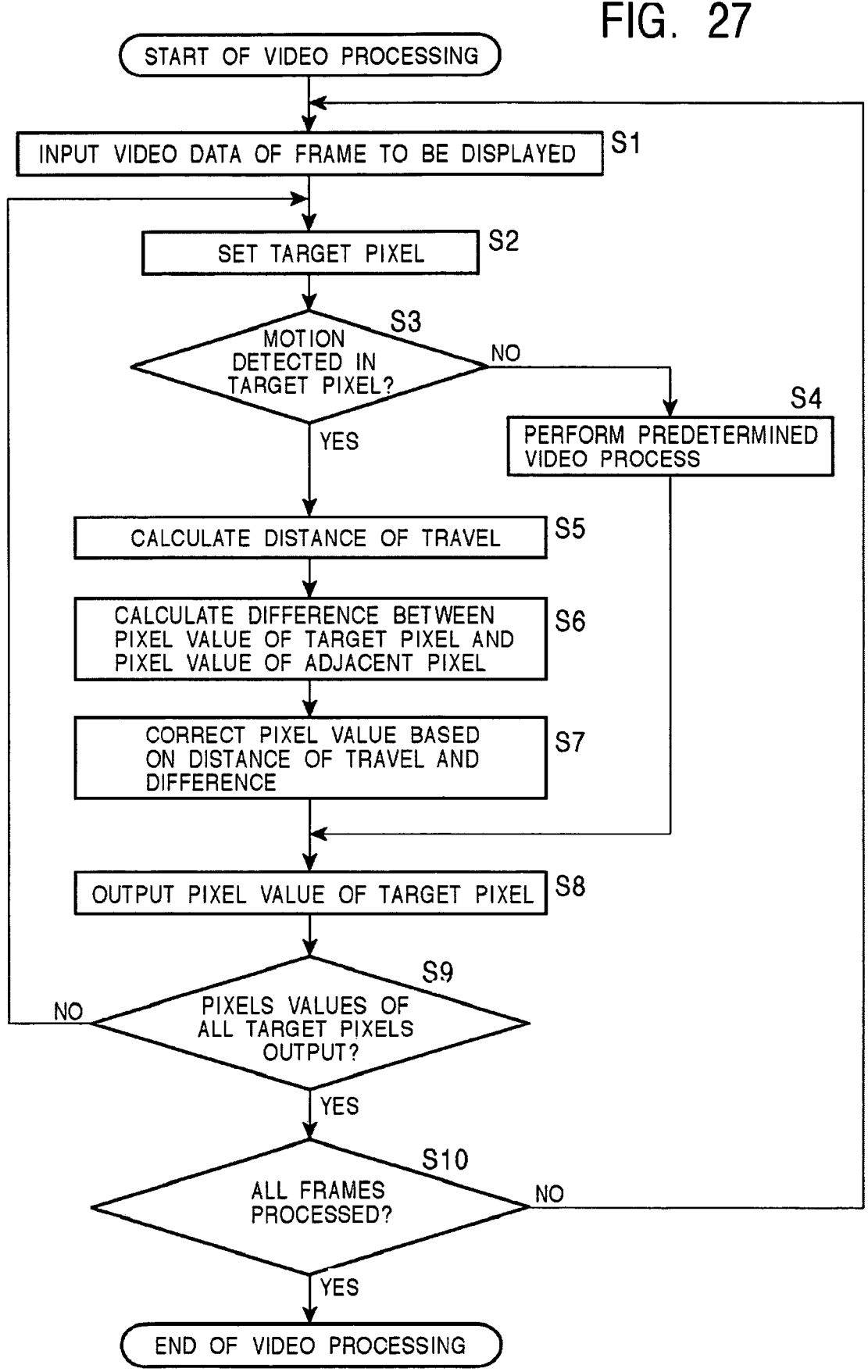
FIG. 27 is a flowchart illustrating a video processing of the video processing apparatus of FIG. 7.

The video processing apparatus 11 of FIG. 27 individually outputs the corrected pixel values of the pixels forming the display target frame or field to the holding type display unit 12. Alternatively, the video processing apparatus 11 may output the pixel values as the video data of the display target frame or field at a time after correcting the pixel values of all pixels forming the display target frame or field.

As described above, the video processing apparatus of the preferred embodiment of the present invention corrects an edge or texture, moving in space contained in a moving picture, in not only time axis such as time response characteristics of the holding type display unit 12 but also spatial direction such as the motion direction of the edge or texture. The video processing apparatus of the present invention thus provides a sharp edge without excessive correction in comparison with the known video processing apparatus, which performs the overdrive method correcting the pixel value in the time axis only. More specifically, in comparison with the known video processing apparatus, the video processing apparatus of the preferred embodiment of the present invention controls the frequency of occurrence of motion blur and the degree of motion blur of the edge or texture moving in space.

In other words, the video processing apparatus of the preferred embodiment of the present invention provides the advantages of the correction, namely, controls the frequency of occurrence of and the degree of motion blur of the edge or texture moving in space regardless of the time response characteristics of the holding type display unit 12.

The video processing apparatus of the preferred embodiment of the present invention decomposes the video data corresponding to the edge or texture moving in space into a set of video data of the step edge, and corrects each piece of the video data of the step edge. The correction is thus appropriately performed and the workload involved in the correction process is lightened.

In the above discussion, the motion direction of the step edge is in the spatial direction X. Even the motion direction of the step edge is in the spatial direction Y, the video processing apparatus 11 corrects the pixel value in the same manner as discussed above. The preferred embodiment of the present invention corrects the motion blur not only in the spatial direction X but also in the spatial direction Y.

The preferred embodiment of the present invention performs the correction in the video processing, thereby providing the above-mentioned advantages regardless of the response characteristics of a display panel.

The preferred embodiment of the present invention is not limited to the arrangement shown in FIG. 7.

The video processing apparatus 11 and the holding type display unit 12, shown in FIG. 7, may be combined as one video processing apparatus. In this case, the switch 25, the display controller 26, and the holding type display unit 12 may be combined as a display unit.

Such a video processing apparatus includes a reference video storage unit 23, a motion detector 24 for detecting a motion in a video based on input video data and reference video data (video data output from the reference video storage unit 23) immediately prior to the input video data, a video processor 21 for performing a first video process on the video data based on the result of the motion detection provided by the motion detector 24, a video processor 22 for performing, on the video data, a second video process other than the first video process based on the result of the motion detection provided by the motion detector 24, and a display device for displaying at least one of the outputs of the video processor 21 and the video processor 22 based on the result of the motion detection provided by the motion detector 24.

The display device includes a switch 25 that switches between the output from the video processor 21 and the output from the video processor 22, based on the result of the motion detection provided by the motion detector 24, a display controller 26 for converting the output provided by the switch 25 into a signal (a voltage signal at a voltage level corresponding to the target level), in accordance with the target level of the display element corresponding to each pixel, and a holding type display unit 12 for holding the result of the display controller 26 at the display elements thereof.

Figure 28:
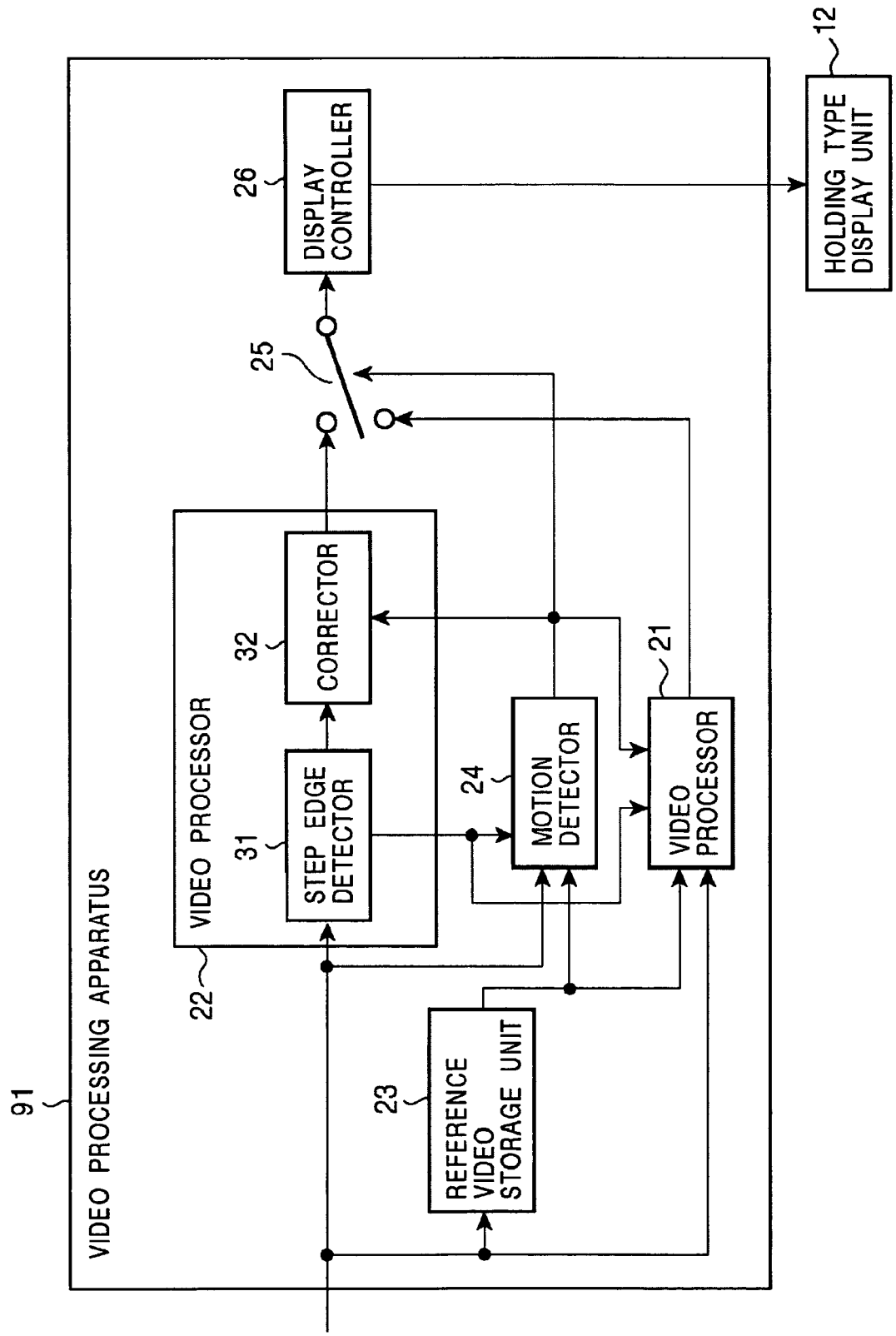
FIG. 28 is a block diagram illustrating the structure of another video processing apparatus in accordance with the preferred embodiment of the present invention.

The video processing apparatus of the present invention may be arranged as shown in FIG. 28.

FIG. 28 illustrates another structure of the video processing apparatus of the present invention. In FIG. 28, elements identical to those described with reference to FIG. 7 are designated with the same reference numerals.

A video processing apparatus 51 of FIG. 28 is substantially identical in structure and function to the video processing apparatus 11 of FIG. 7. The video processing apparatus 51 includes a video processor 21 through a display controller 26, and the interconnection of these elements is basically identical to that of the video processing apparatus 11 of FIG. 7.

In the video processing apparatus 11 of FIG. 7, the output of the motion detector 24 is fed to the step edge detector 31. In the video processing apparatus 51 of FIG. 28, the output of the motion detector 24 is not fed to the step edge detector 31. Conversely, the output of the step edge detector 31 is fed to each of the motion detector 24 and the video processor 21.

The video processing apparatus 51 thus enjoys a small amount of process in comparison with the video processing apparatus 11 (FIG. 7). The operation of the video processing apparatus 51 will now be discussed.

In the video processing apparatus 11 of FIG. 7, each of the video processor 21 and the video processor 22 performs the correction process on all pixels forming a predetermined frame or field. In other words, the video processing is performed on each frame or field twice.

In contrast, in the video processing apparatus 51 of FIG. 28, the step edge detector 31 detects a pixel corresponding to a step edge from among a plurality of pixels forming a predetermined frame or field, and supplies each of the corrector 32, the motion detector 24, and the video processor 21 with the result of the detection.

The motion detector 24 thus detects motion in only the pixel (the pixel corresponding to the step edge) detected by the step edge detector 31. In other words, the motion detector 24 determines whether or not the step edge detected by the step edge detector 31 is moving.

The video processor 21 inhibits the processing of the pixel, from which the motion detector 24 detects motion, from among the pixels (corresponding to the step edge) detected by the step edge detector 31. In other words, the video processor 21 inhibits the processing of the pixel corresponding to the moving step edge, and processes the remaining pixels.

In the video processing apparatus 51 of FIG. 28, the processing of one pixel is performed by either the video processor 21 or the video processor 22. In other words, the video processing is performed on a given frame or field, one time only. The motion detector 24 thus detects the pixel corresponding to the step edge only. The amount of process is thus smaller in the video processing apparatus 51 of FIG. 28 than in the video processing apparatus 11 of FIG. 7.

The above series of process steps may be performed using hardware or software.

The video processing apparatus 11 of FIG. 7 and the video processing apparatus 51 of FIG. 28 may be constructed of a personal computer of FIG. 29, for example.

Referring to FIG. 29, a central processing unit (CPU) 101 performs a variety of processes in accordance with a program stored in a read-only memory (ROM) 102, or the program loaded from a storage unit 108 to a random-access memory (RAM) 103. The RAM 103 stores data the CPU 101 needs to perform various processes.

The CPU 101, the RAM 102, and the RAM 103 are interconnected through an internal bus 104. The internal bus 104 is connected to an input/output interface 105.

Also connected to an input/output interface 105 are an input unit 106 including a keyboard, a mouse, etc., an output unit 107 including a display, the storage unit 108 including a hard disk, and a communication unit 109 including a modem, a terminal adapter, etc. The communication unit 109 performs a communication process with another information processing apparatus through a variety of networks including the Internet.

The output unit 107 may be a holding type display unit. Alternatively, an external holding type display unit may be connected to a junction unit (not shown) which is connected to the input/output interface 105, as necessary.

Also connected to the input/output interface 105 is a drive 110 as necessary. A removable medium 111, such as a magnetic disk, an optical disk, a magneto-optical disk or a semiconductor memory, is loaded onto the drive 110, as necessary. A computer program read from one of such media is installed to the storage unit 108 as necessary.

If the series of process steps is performed using software, a computer program of the software may be installed from a network or a recording medium to a memory of a computer assembled into dedicated hardware, or into a general-purpose computer that performs a variety of functions by installing various programs thereon.

As shown in FIG. 29, the recording medium may be not only a package medium such as removable storage media (package medium) 11 including a magnetic disk (including a floppy disk), optical disks (including a compact-disk read-only memory (CD-ROM), digital versatile disk (DVD), electro-optical disks (including Mini-Disk (MD)), or a semiconductor memory storing the program and supplied separately from the computer to a user to provide the program, but also the ROM 102 and a hard disk such as the storage unit 108, each storing the program.

The process steps discussed in this specification are sequentially performed in the time series order as stated. Alternatively, the steps may be performed in parallel or separately.

The moving picture handled by the video processing apparatus of the preferred embodiment of the present invention may be processed on a per frame basis or on a per field basis. The unit of process is also referred to as an access unit in this specification.

In the above discussion, each display element forming the screen of the holding type display unit 12 (the display element is a liquid crystal in this liquid-crystal display device) corresponds to a respective one of a plurality of pixels forming the frame or field. A plurality of display elements may correspond to a single pixel. In other words, a plurality of elements may display a single pixel.

What is claimed is:

1. A video processing apparatus for a display device comprising:
    edge detection means for receiving input video data and for detecting a subset of pixels in the input video data corresponding to an edge of an object, the object being associated with pixels in the input video data, and the object being included in both reference video data corresponding to a previous frame or field, and the input video data, the input video data corresponding to a current frame or field, the reference video data being for display before the input video data;

motion detection means for receiving a detection result from the edge detection means and for detecting motion of the edge of the object by comparing the input video data with the reference video data, and for detecting a speed of the object, the motion detection being limited to the detected subset of pixels corresponding to the edge of the object;

display means for displaying the input video data, the display means comprising a plurality of display units;

first video processing means for processing the subset of pixel values for the motion detected subset of pixels corresponding to the edge of the object based on a combination of the detected motion of the object and time response characteristics of the display units comprising the display means; and second video processing means for processing pixel values for pixels in the input video data other than the motion detected subset of pixels corresponding to the edge of the object and processed by the first video processing means, thereby limiting the pixel values processed by the second video processing means to non-motion detected pixels in the input data;

wherein the display means displays the processed input video data at pixel intensities corresponding to the pixel values processed by the first video processing means and the second video processing means, wherein the first video processing means comprises:

a correction means for receiving a value corresponding to the speed of the edge of the object and for correcting the pixel values for the motion detected subset of pixels based on a gain related to the received speed of the object, a value corresponding to the time response characteristics of the display units, and a difference value calculated by the edge detection means corresponding to the pixel intensities.

2. The video processing apparatus according to claim 1, wherein the motion detection means detects the motion of the object by comparing a position of the object in the input video data with a position of the object in the reference video data.

3. The video processing apparatus according to claim 1, wherein the correction means changes an edge height in the edge of the object based on the detected motion.

4. The video processing apparatus according to claim 3, wherein the first video processing means corrects the subset of pixel values by applying a constant representing the time response characteristics of the display units.

5. A video processing method comprising the steps of:

receiving input video data and detecting a subset of pixels in the input video data corresponding to an edge of an object, the object being associated with pixels in the input video data, and the object being included in both reference video data corresponding to a previous frame or field and the input video data, the input video data corresponding to a current frame or field, the reference video data being for display before the input video data;

receiving an edge detection result of the edge of the object, detecting motion of the edge of the object by comparing the input video data with the reference video data, and detecting a speed of the object, the motion detection being limited to the detected subset of pixels corresponding to the edge of the object;

first processing of the subset of pixel values for the motion detected subset of pixels corresponding to the edge of the object based on a combination of the detected motion of the object and time response characteristics of display units comprising a display;

second processing of pixel values for pixels in the input video data other than the motion detected subset of pixels corresponding to the edge of the object and subjected to the first processing, thereby limiting the pixel values subjected to the second processing to non-motion detected pixels in the input data;

displaying the processed input video data on the display at pixel intensities corresponding to the pixel values processed by the first processing and the second processing, and wherein the first processing of the pixel values comprises receiving a value corresponding to the speed of the edge of the object and correcting the pixel values for the motion detected subset of pixels based on a gain related to the received speed of the object, a value corresponding to the time response characteristics of the display units, and a difference value calculated along with the edge detection result corresponding to the pixel intensities.

6. A computer-readable medium containing processor readable instructions for causing a processor to execute video processing functionality on a display device, the processor performing the functions of:

receiving input video data and detecting a subset of pixels in the input video data corresponding to an edge of an object, the object being associated with pixels in the input video data, and the object being included in both reference video data corresponding to a previous frame or field and the input video data, the input video data corresponding to a current frame or field, the reference video data being for display before the input video data;

receiving an edge detection result of the edge of the object, detecting motion of the edge of the object by comparing the input video data with the reference video data, and detecting a speed of the object, the motion detection being limited to the detected subset of pixels corresponding to the edge of the object;

first processing of the subset of pixel values for the motion detected subset of pixels corresponding to the edge of the object based on a combination of the detected motion of the object and time response characteristics of display units comprising a display;

second processing of pixel values for pixels in the input video data other than the motion detected subset of pixels corresponding to the edge of the object and subjected to the first processing, thereby limiting the pixel values subjected to the second processing to non-motion detected pixels in the input data;

displaying the processed input video data on the display at pixel intensities corresponding to the pixel values processed by the first processing and the second processing, and wherein the first processing of the pixel values comprises receiving a value corresponding to the speed of the edge of the object and correcting the pixel values for the motion detected subset of pixels based on a gain related to the received speed of the object, a value corresponding to the time response characteristics of the display units, and a difference value calculated along with the edge detection result corresponding to the pixel intensities.

7. The video processing apparatus according to claim 1, wherein the gain is linearly proportional to the speed of the object.

8. The video processing apparatus according to claim 1, wherein the correcting is limited to the pixel values for the motion detected subset of pixels by providing the motion detected subset of pixels from the motion detection means as an input to the correction means.

9. The video processing apparatus according to claim 1, wherein the edge detection means comprises a step edge detector.

10. The video processing apparatus according to claim 9, wherein the step edge detector calculates the first derivative of a function representing a change of pixel values in the direction of motion of the object.

11. The video processing apparatus according to claim 1, wherein the correction means corrects a plurality of pixels consecutively lined in a direction based on the motion of the object.

12. The computer-readable medium according to claim 6, wherein the video processing further comprises a function for detecting the motion of the object by comparing a position of the object in the input video data with a position of the object in the reference video data.

13. The computer-readable medium according to claim 6, wherein the correcting comprises changing an edge height in the edge of the object based on the detected motion.

14. The computer-readable medium according to claim 13, wherein the first processing corrects the subset of pixel values by applying a constant representing the time response characteristics of the display units.

15. The computer-readable medium according to claim 6, wherein the gain is linearly proportional to the speed of the object.

16. The computer-readable medium according to claim 6, wherein the correcting is limited to the pixel values for the motion detected subset of pixels by providing the motion detected subset of pixels from the motion detection function as an input to the first processing function.

17. The computer-readable medium according to claim 6, wherein the edge detection is performed by a step edge detector.

18. The computer-readable medium according to claim 17, wherein the step edge detector calculates the first derivative of a function representing a change of pixel values in the direction of motion of the object.

19. The computer-readable medium according to claim 6, wherein a plurality of pixels consecutively lined in a direction based on the motion of the object are corrected.

\* \* \* \* \*